US012578902B2

(12) United States Patent
Harada et al.

(10) Patent No.: US 12,578,902 B2
(45) Date of Patent: Mar. 17, 2026

(54) SEMICONDUCTOR STORAGE DEVICE

(71) Applicant: Kioxia Corporation, Tokyo (JP)

(72) Inventors: Yoshikazu Harada, Kawasaki
Kanagawa (JP); Akio Sugahara,
Yokohama Kanagawa (JP)

(73) Assignee: Kioxia Corporation, Tokyo (JP)

( * ) Notice: Subject to any disclaimer, the term of this
patent is extended or adjusted under 35
U.S.C. 154(b) by 0 days.

(21) Appl. No.: 18/779,832

(22) Filed: Jul. 22, 2024

(65) Prior Publication Data

US 2025/0036310 A1    Jan. 30, 2025

(30) Foreign Application Priority Data

Jul. 25, 2023    (JP) ................................. 2023-120954

(51) Int. Cl.
*G06F 12/08*        (2016.01)
*G06F 3/06*         (2006.01)
*G06F 12/0802*      (2016.01)
(52) U.S. Cl.
CPC .......... *G06F 3/0656* (2013.01); *G06F 3/0602*
(2013.01); *G06F 3/0679* (2013.01); *G06F
12/0802* (2013.01); *G06F 2212/60* (2013.01)
(58) Field of Classification Search
CPC .... G06F 3/0656; G06F 3/0602; G06F 3/0679;
G06F 12/0802; G06F 2212/60
USPC ....................................................... 711/118
See application file for complete search history.

(56) References Cited

U.S. PATENT DOCUMENTS

| | | | |
|---|---|---|---|
| 11,908,511 B2 | 2/2024 | Kato | |
| 2016/0329082 A1* | 11/2016 | Chun | .................... G11C 7/1087 |
| 2019/0362761 A1* | 11/2019 | Sato | ....................... G11C 16/24 |
| 2020/0342941 A1 | 10/2020 | Tokiwa | |
| 2021/0072922 A1* | 3/2021 | Shin | ....................... G06F 3/0659 |
| 2021/0375372 A1* | 12/2021 | Sakurada | .............. G06F 3/0604 |
| 2022/0366966 A1 | 11/2022 | Kato | |
| 2023/0021244 A1 | 1/2023 | Harada | |
| 2023/0230640 A1* | 7/2023 | Cho | ....................... G11C 16/24 |
| | | | 365/185.12 |
| 2023/0267972 A1* | 8/2023 | Fujiu | ....................... G11C 7/12 |
| | | | 365/185.21 |

(Continued)

FOREIGN PATENT DOCUMENTS

| | | |
|---|---|---|
| JP | 2022-174874 A | 11/2022 |
| JP | 2023-12706 A | 1/2023 |

(Continued)

*Primary Examiner* — Than Nguyen
(74) *Attorney, Agent, or Firm* — Kim & Stewart LLP

(57) ABSTRACT

A semiconductor storage device includes a memory string,
a sense amplifier including first and second latch circuits, a
cache memory including a third latch circuit, and a control
circuit. The control circuit is configured to perform a first
read operation in response to a first command set and
consecutively perform a second read operation in response
to a second command set received during the first read
operation. During the first read operation, data read from the
memory string is stored in the first latch circuit. When the
second command set is received at a first timing, the control
circuit transfers the data to the second latch circuit, and then
to the third latch circuit. When the second command set is
received at a second timing before the first timing, the
control circuit directly transfers the data to the third latch
circuit.

20 Claims, 36 Drawing Sheets

(56)             References Cited

U.S. PATENT DOCUMENTS

2023/0307018 A1      9/2023  Kataoka
2025/0053302 A1*     2/2025  Park ....................... G11C 16/32

FOREIGN PATENT DOCUMENTS

TW          202020870 A      6/2020
TW          202040577 A      11/2020

* cited by examiner

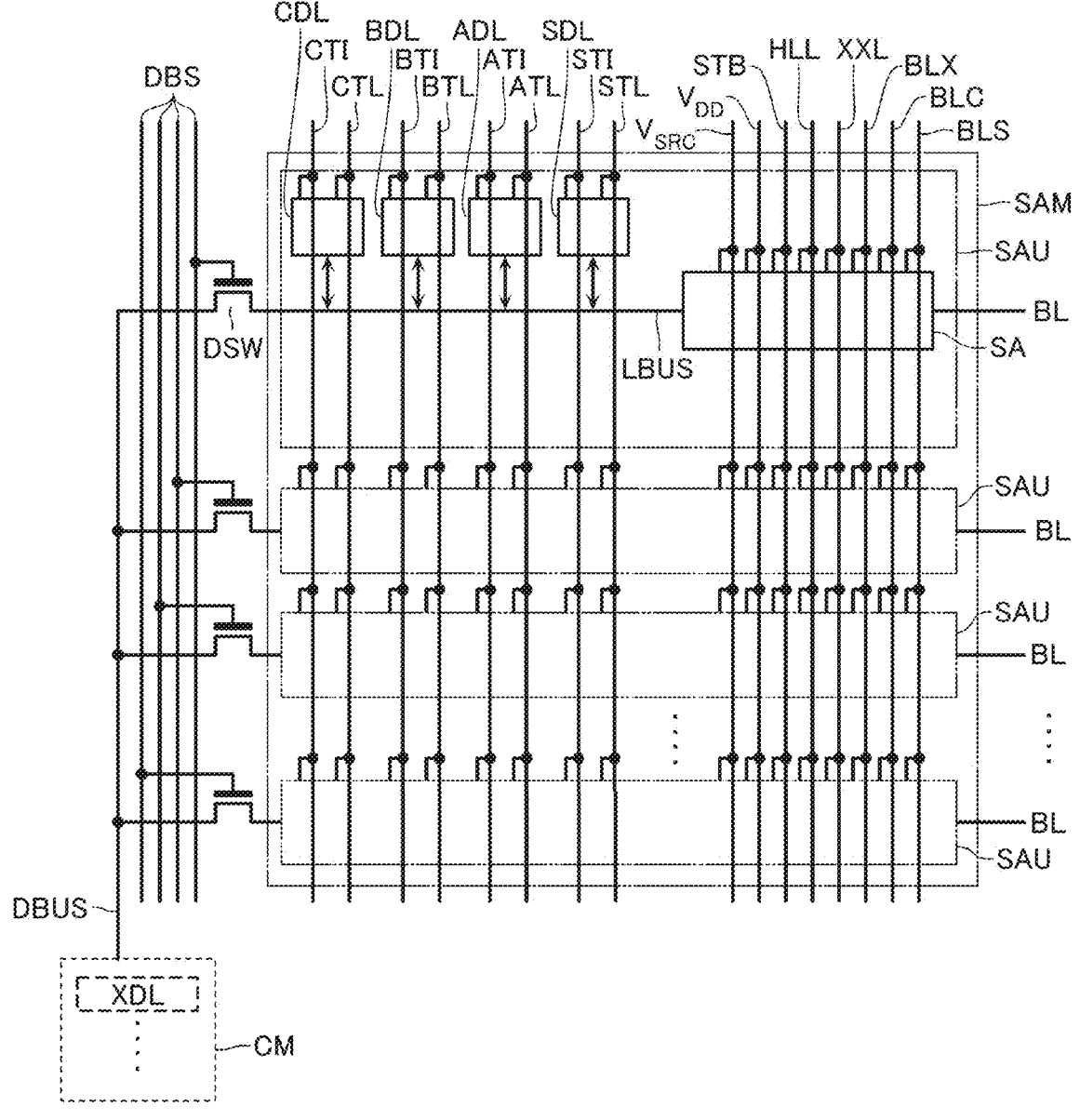
F I G. 10

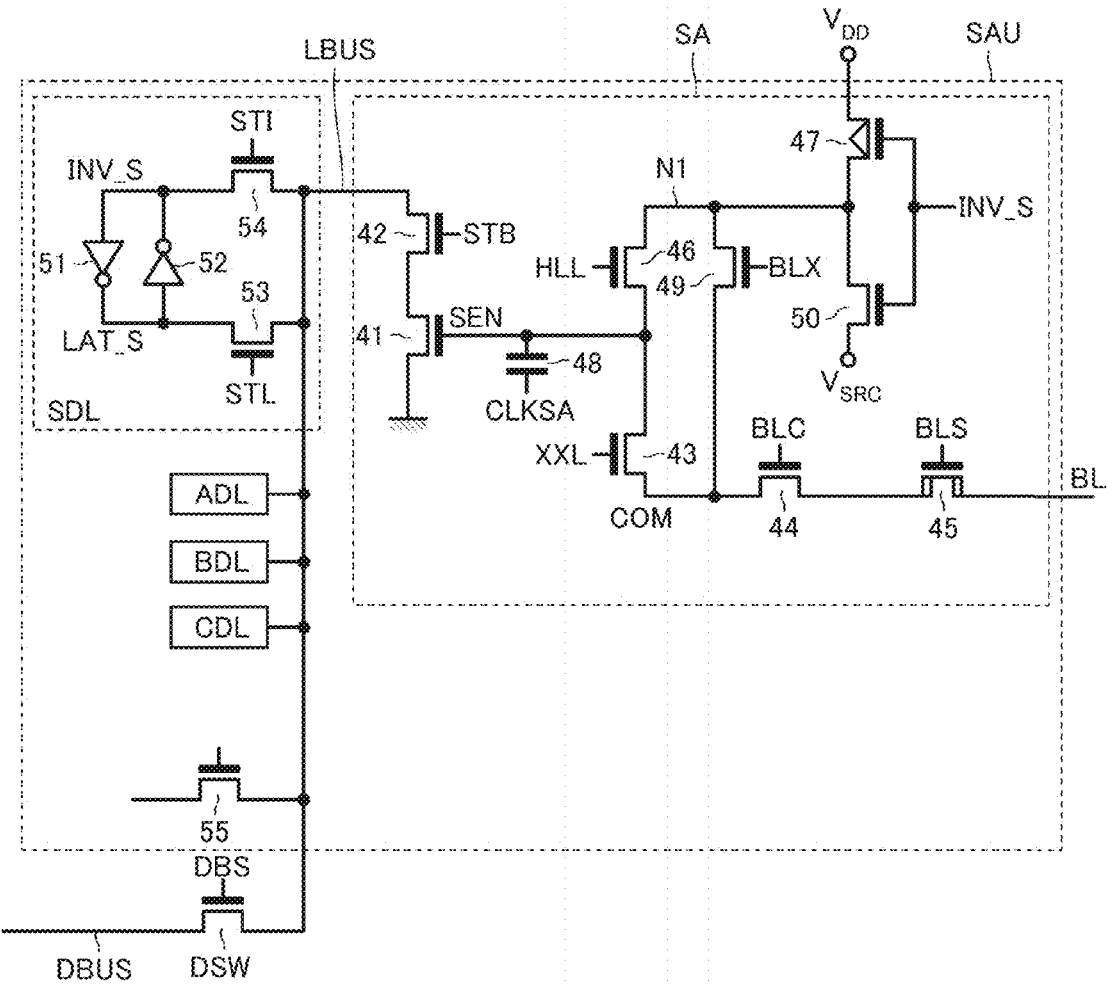
F I G. 11

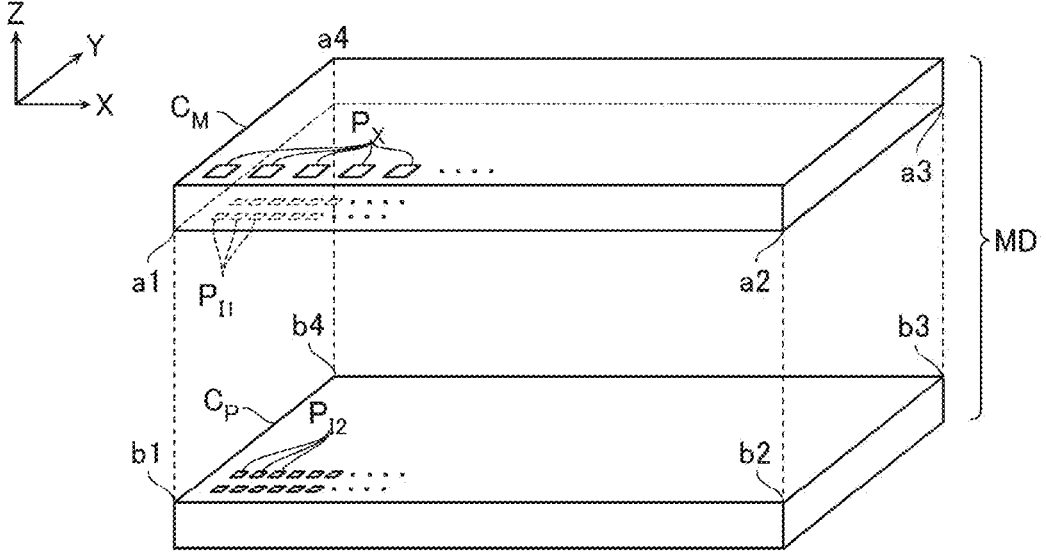
F I G. 12

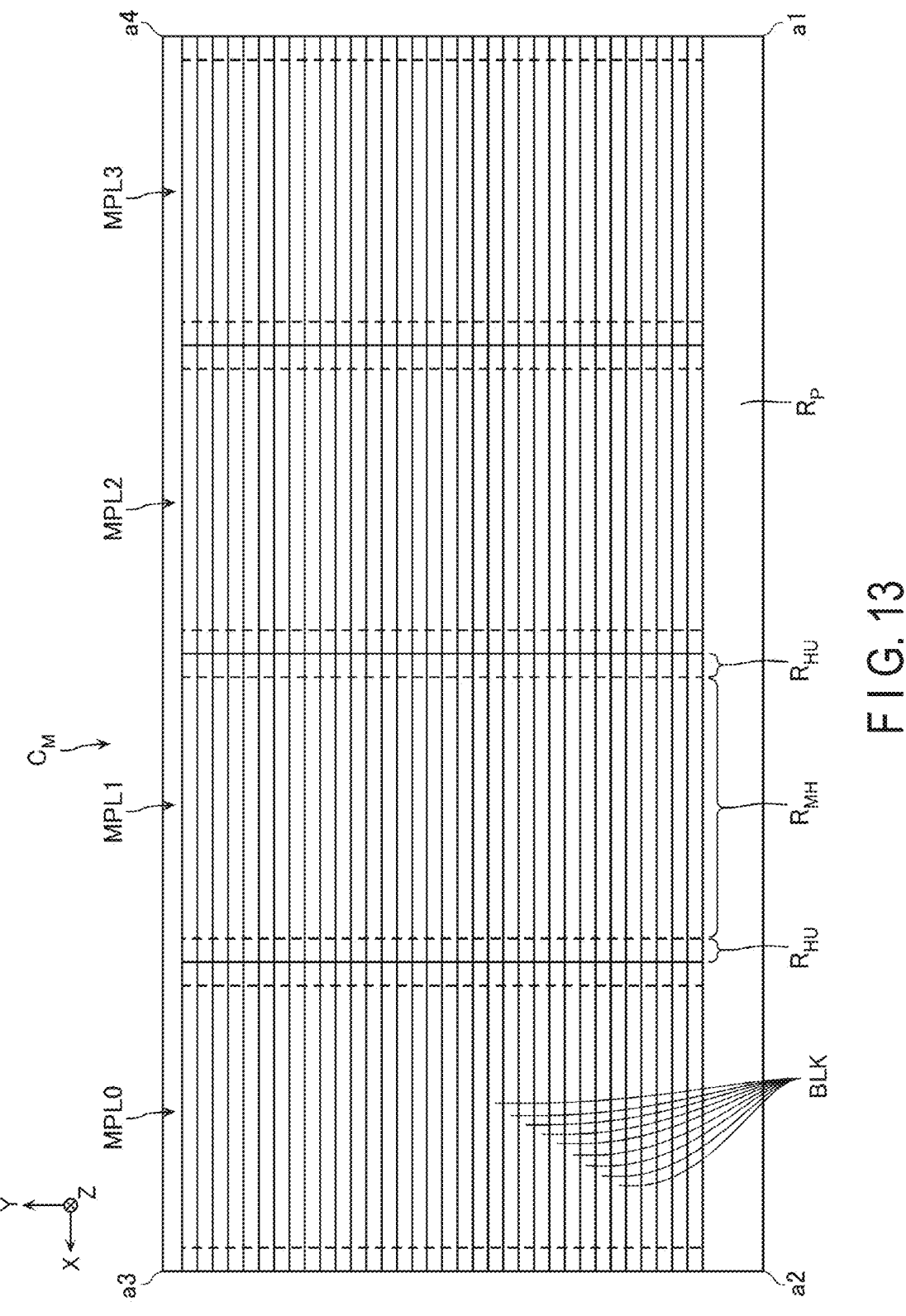
F I G. 13

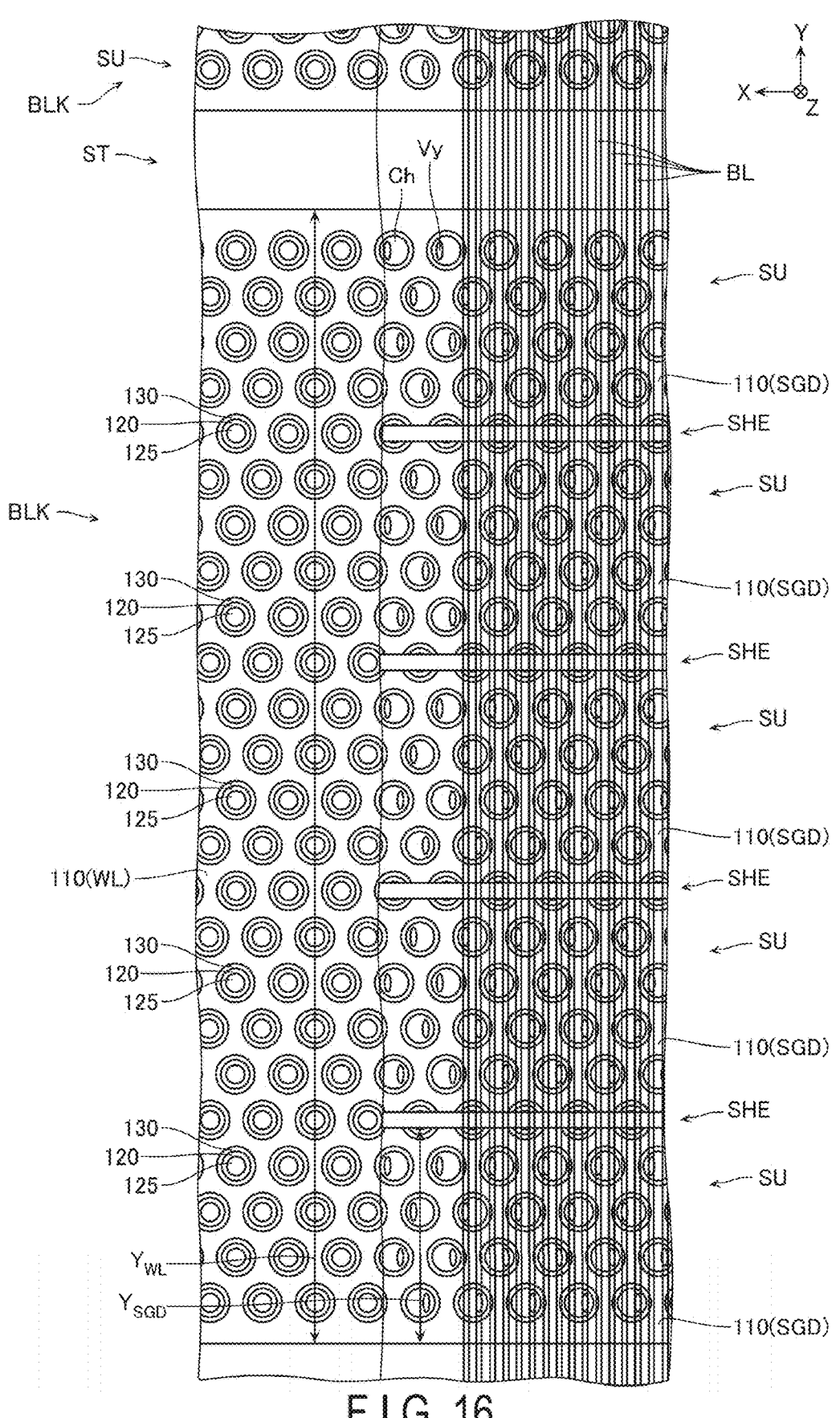
F I G. 16

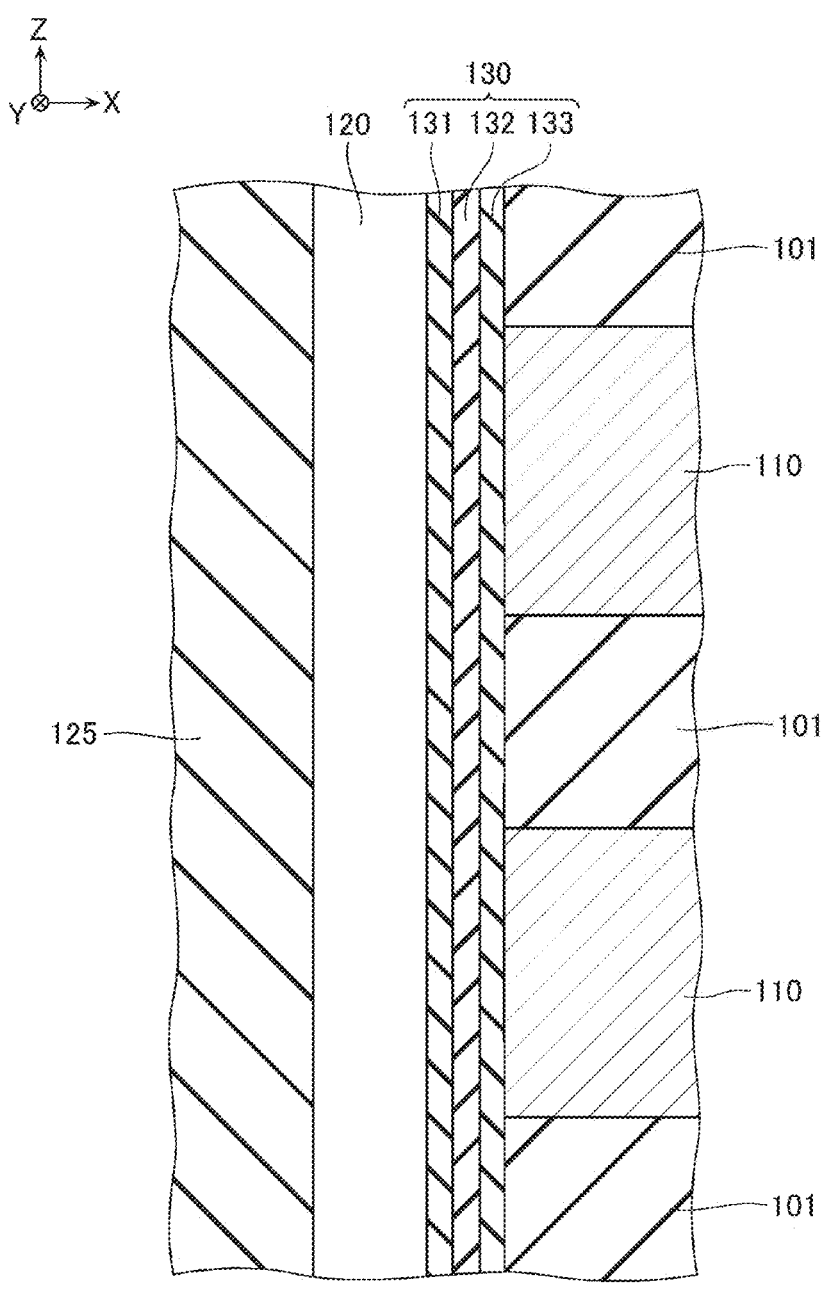
F I G. 17

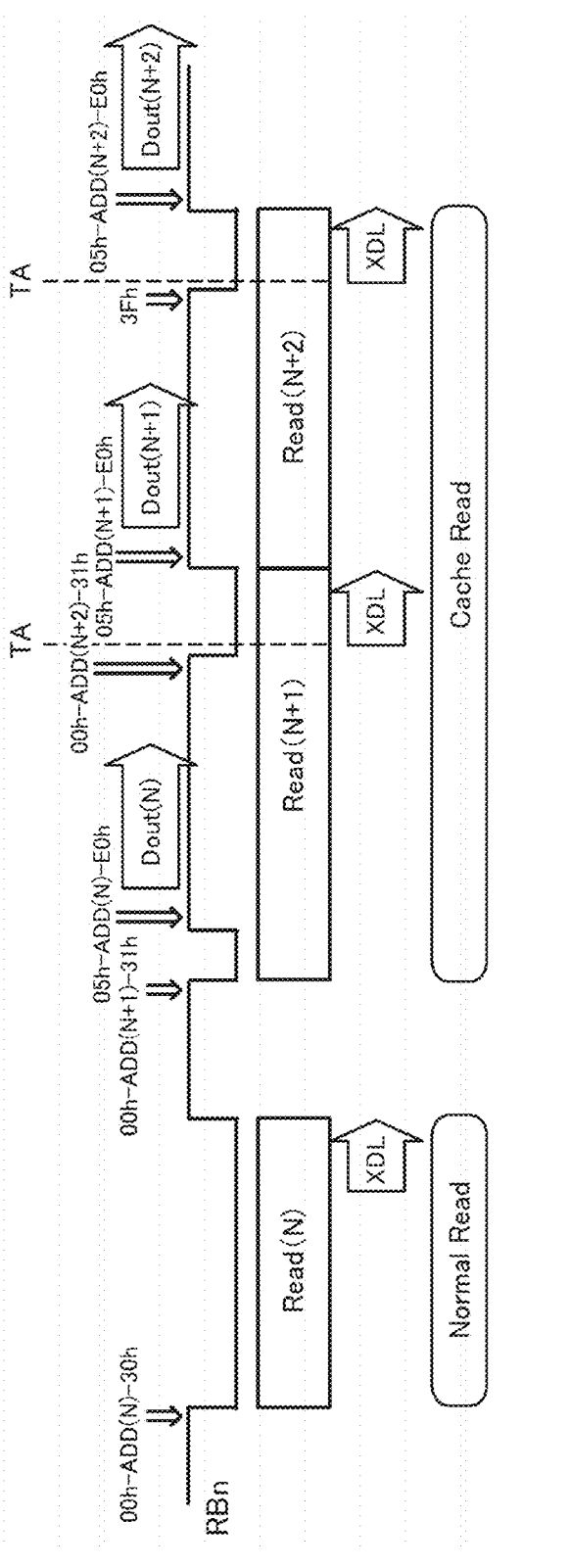
F I G. 20

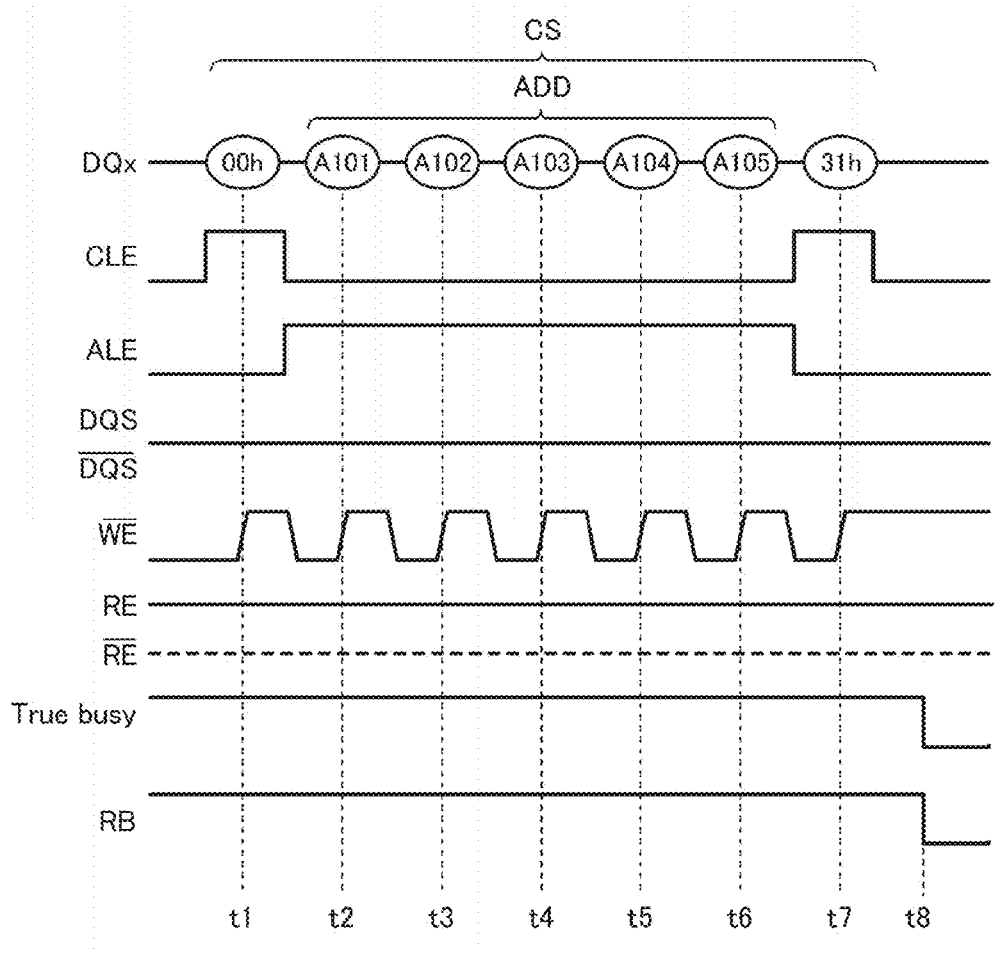
F I G. 21

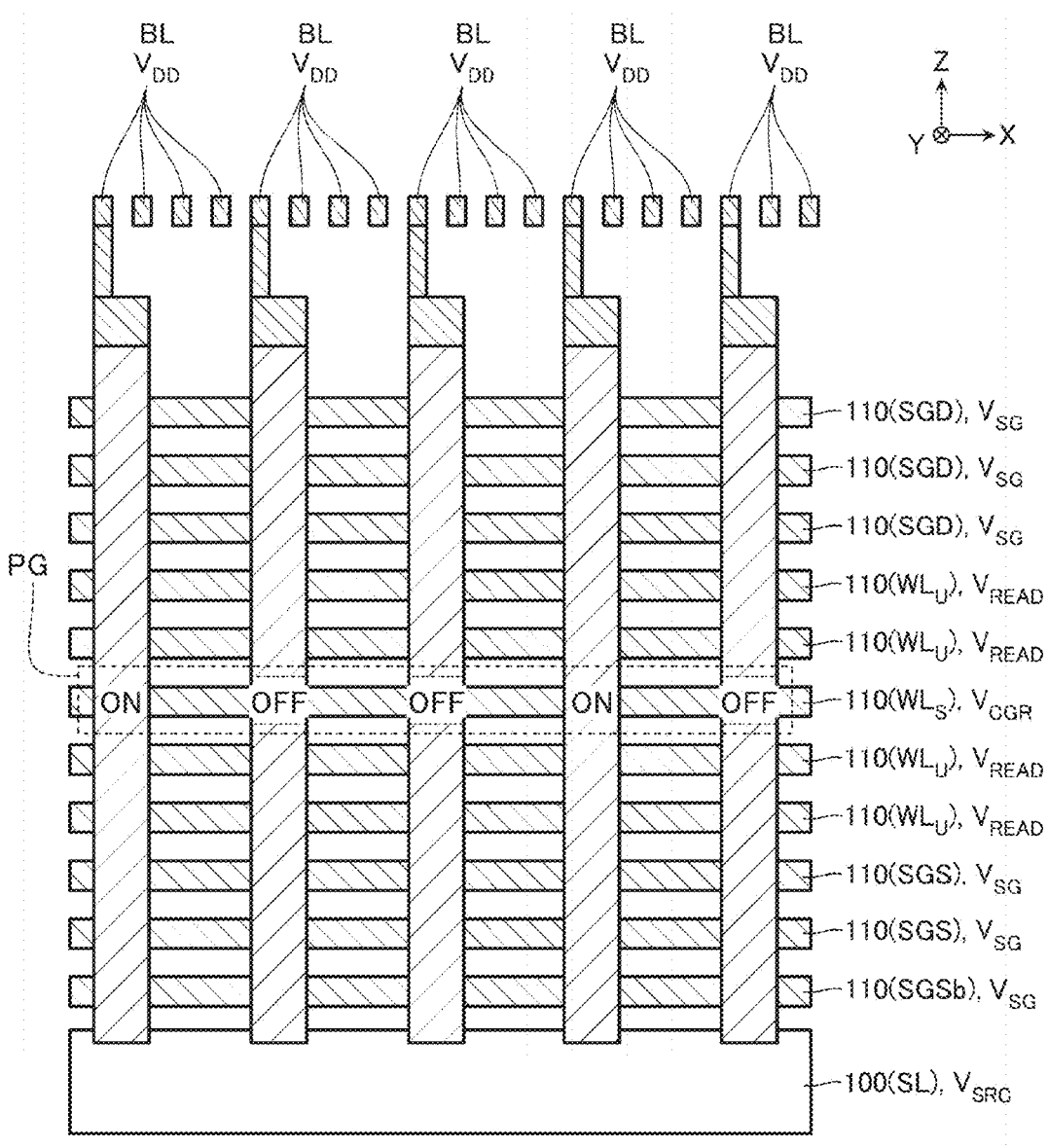
F I G. 22

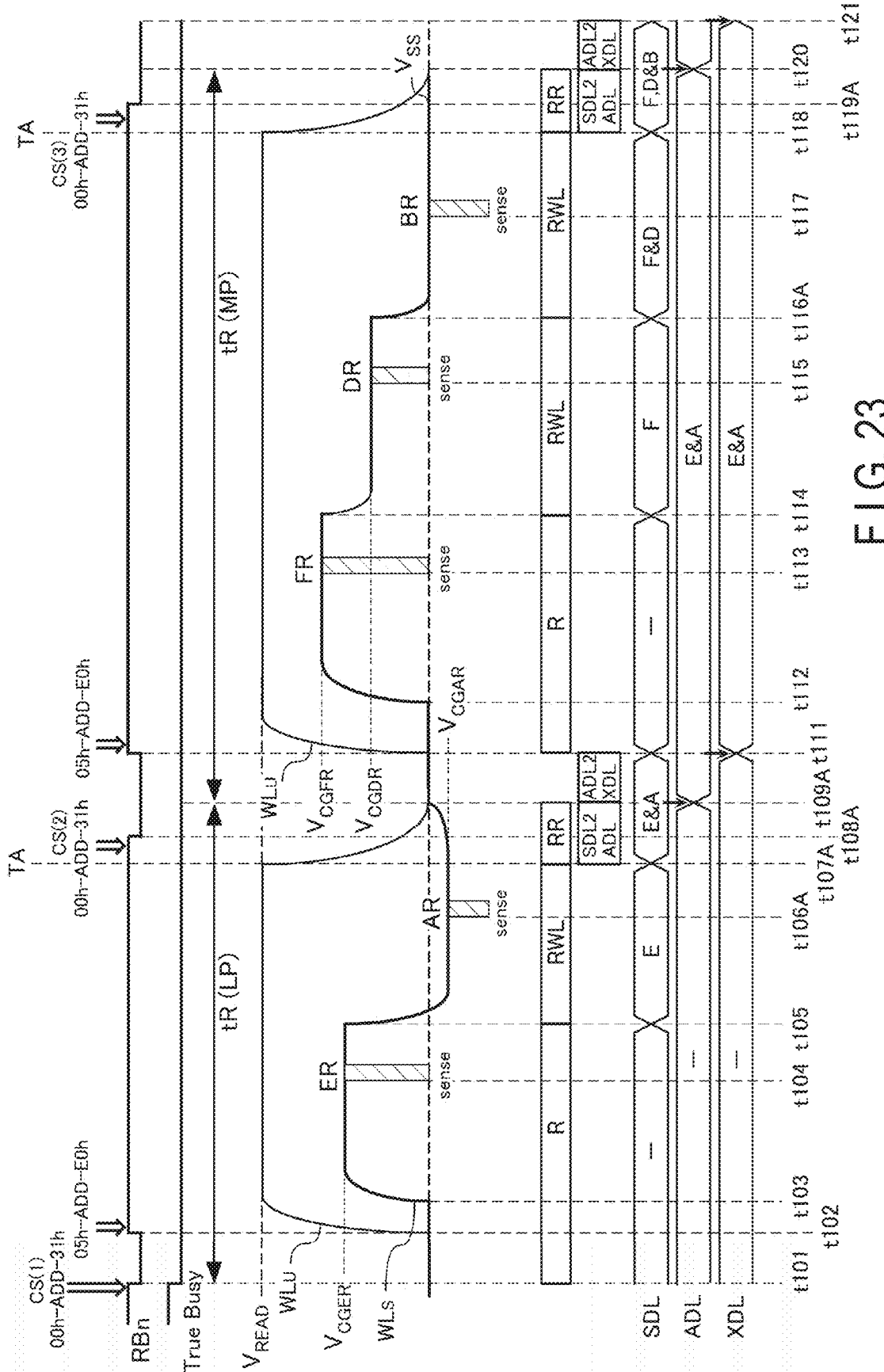
F I G. 23

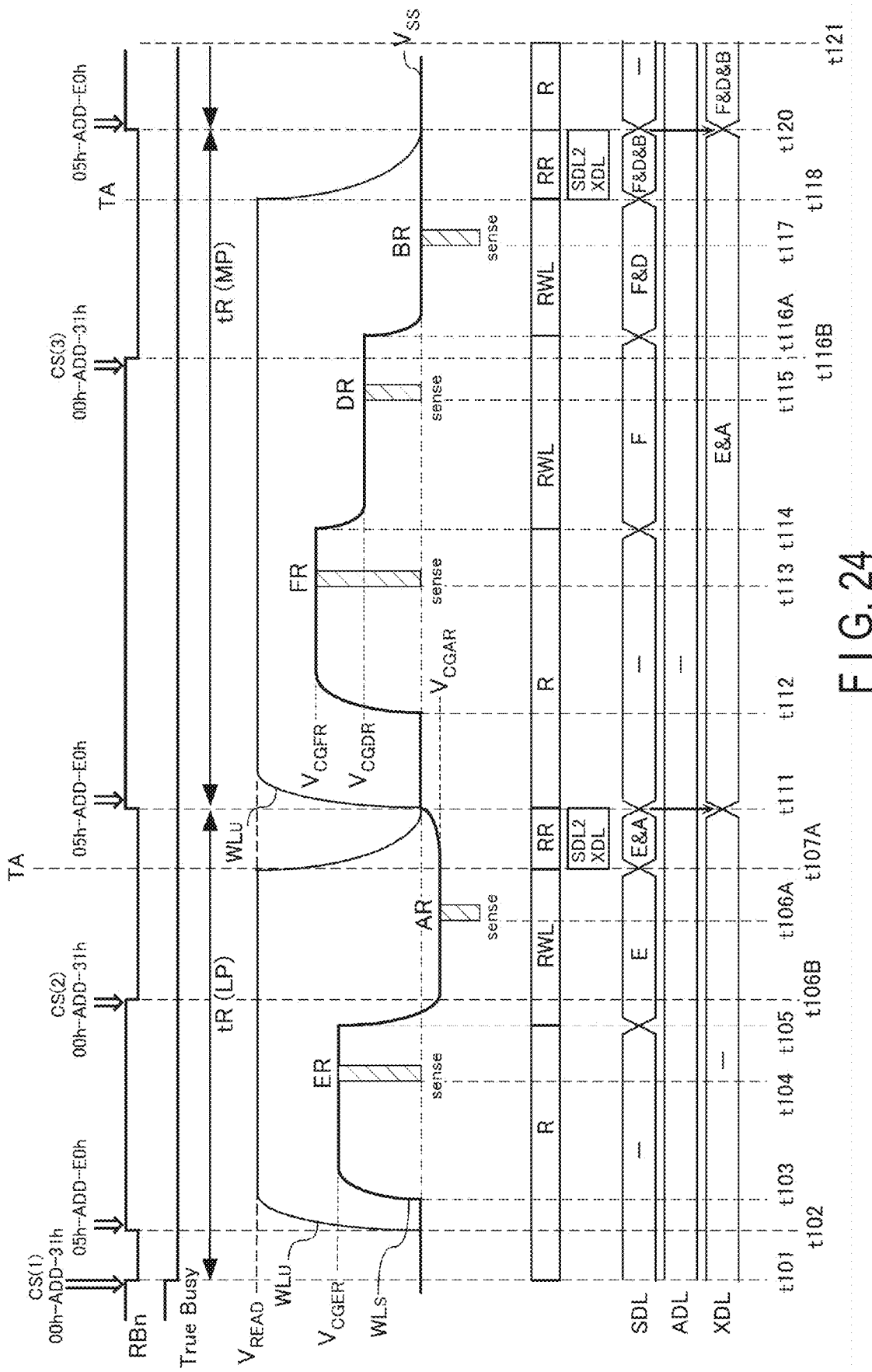
F I G. 24

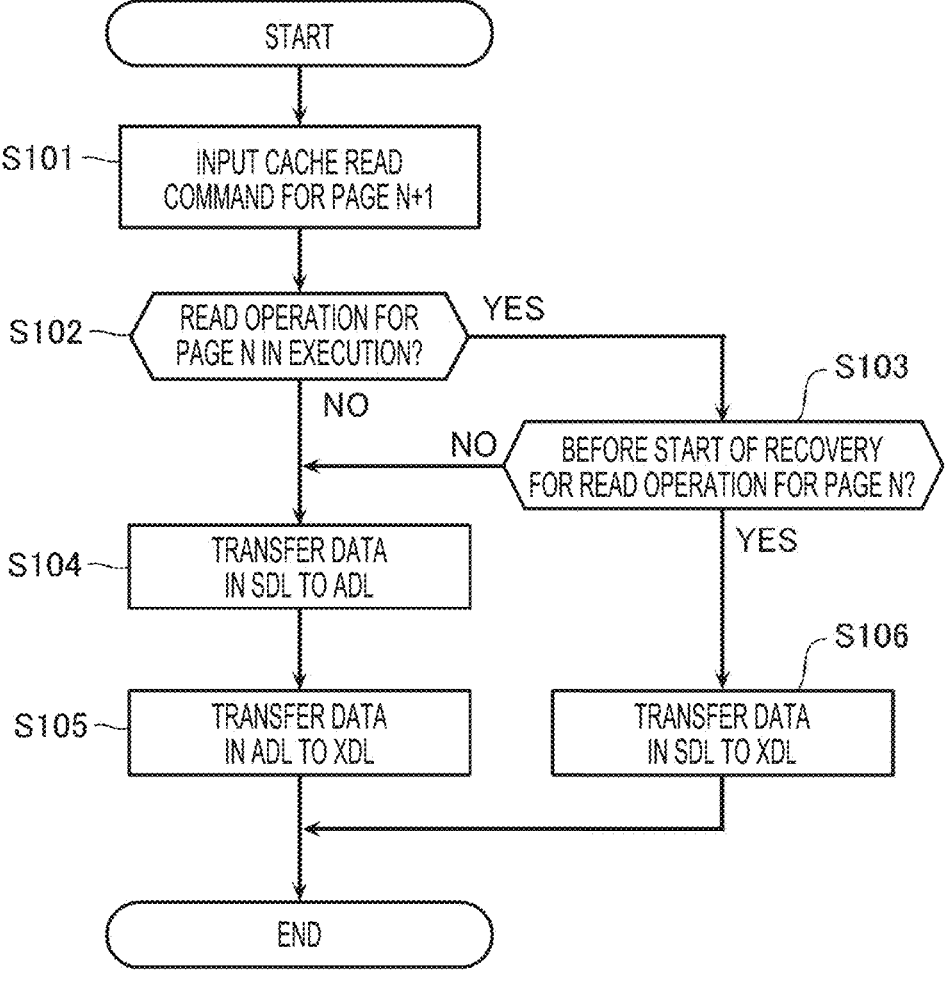
F I G. 25

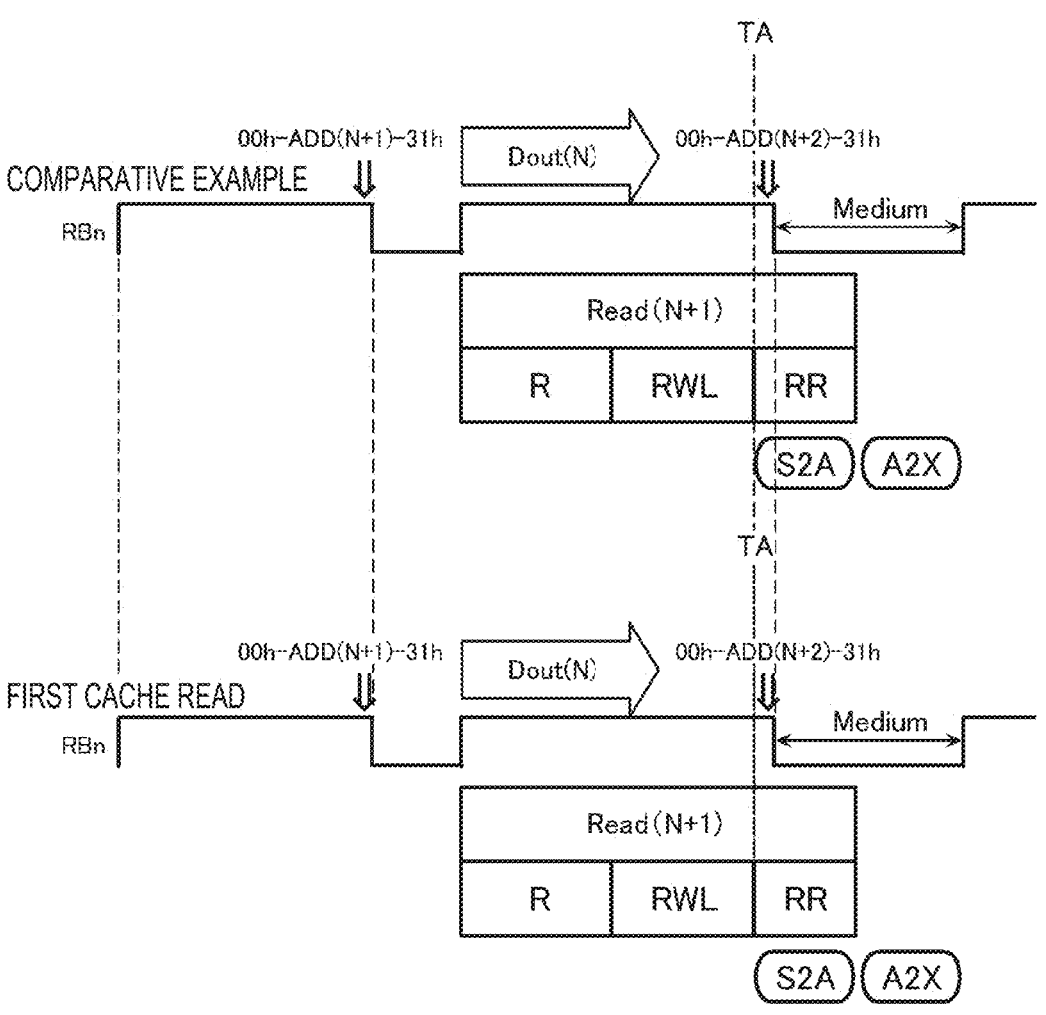
F I G. 27

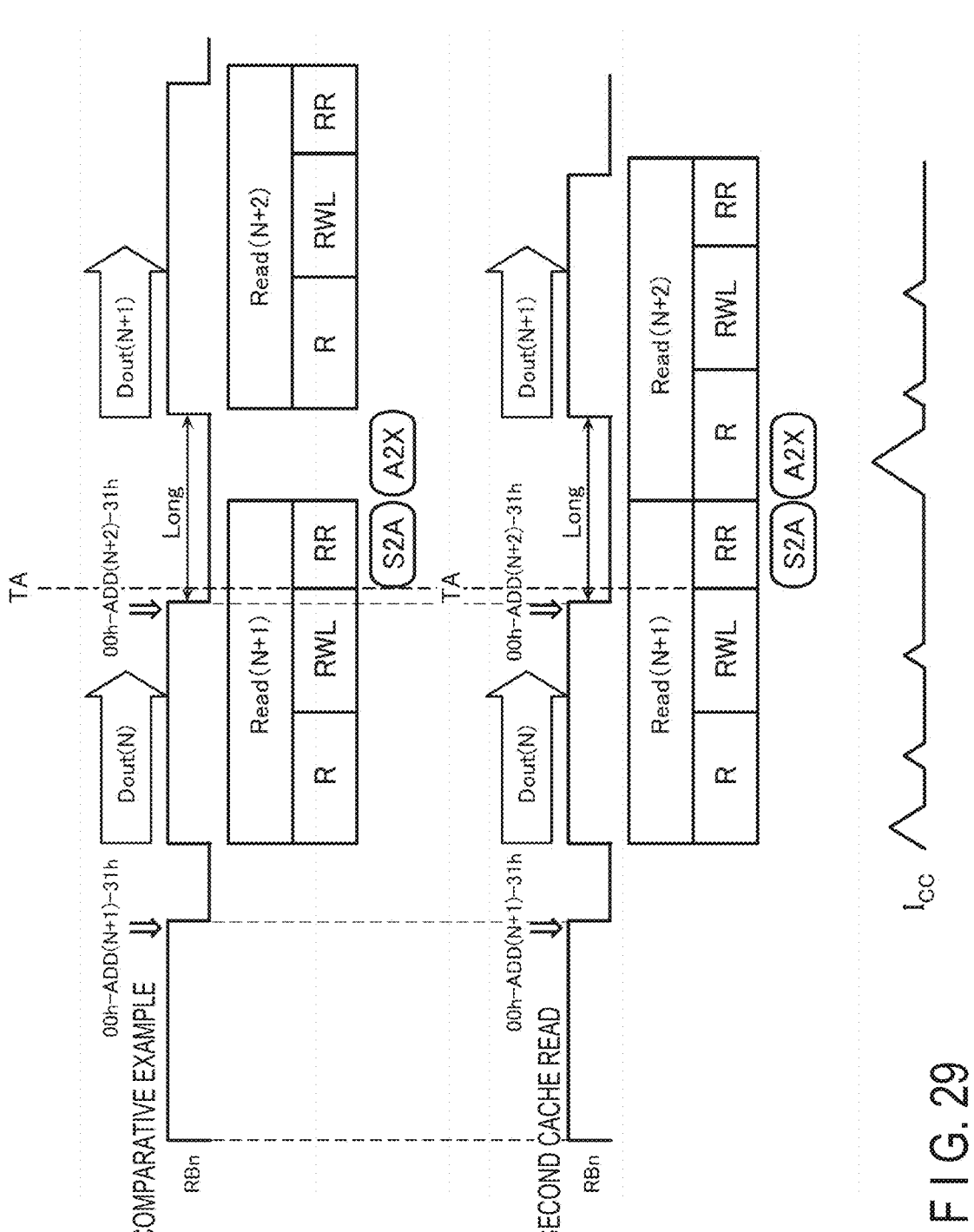
F I G. 29

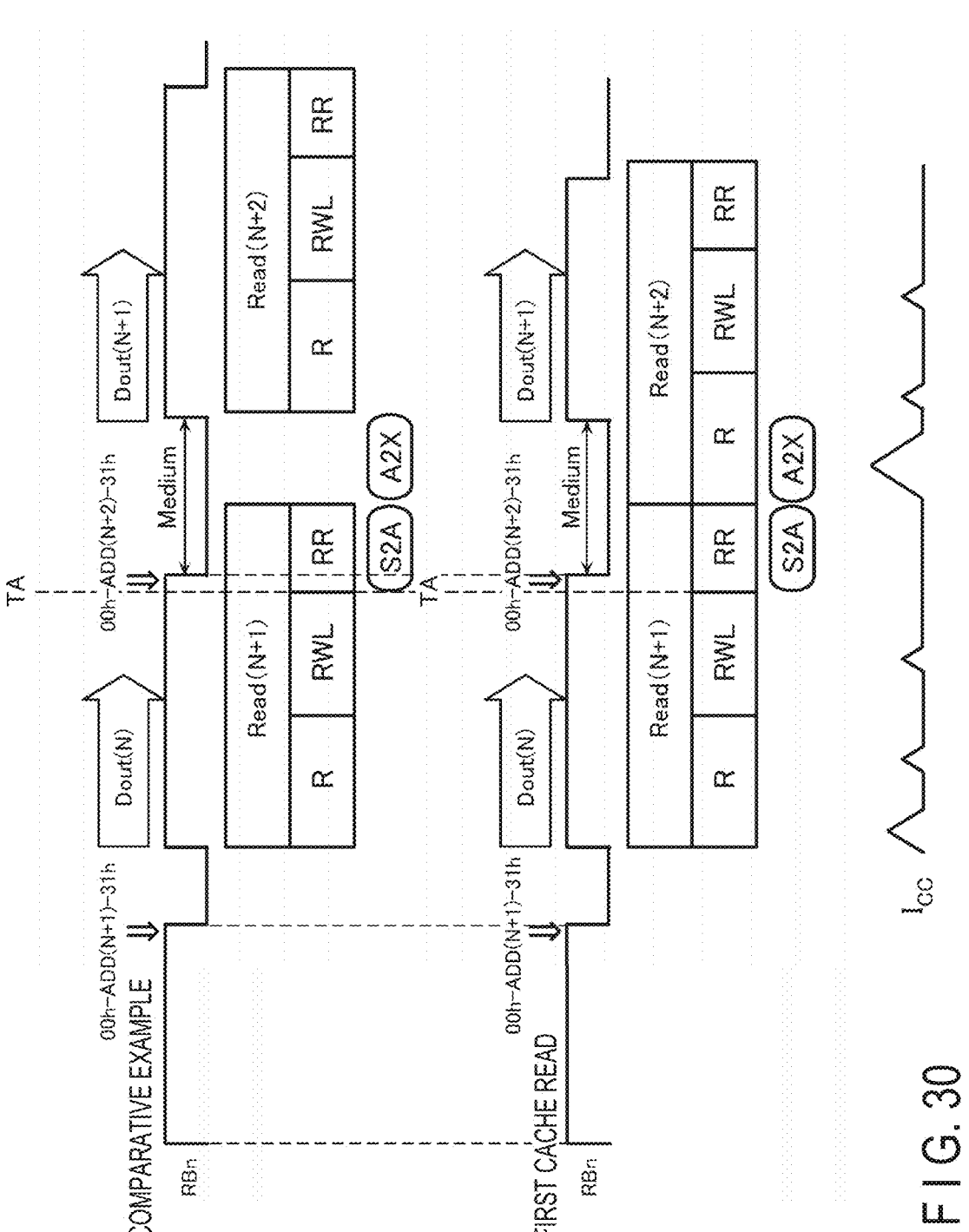
F I G. 30

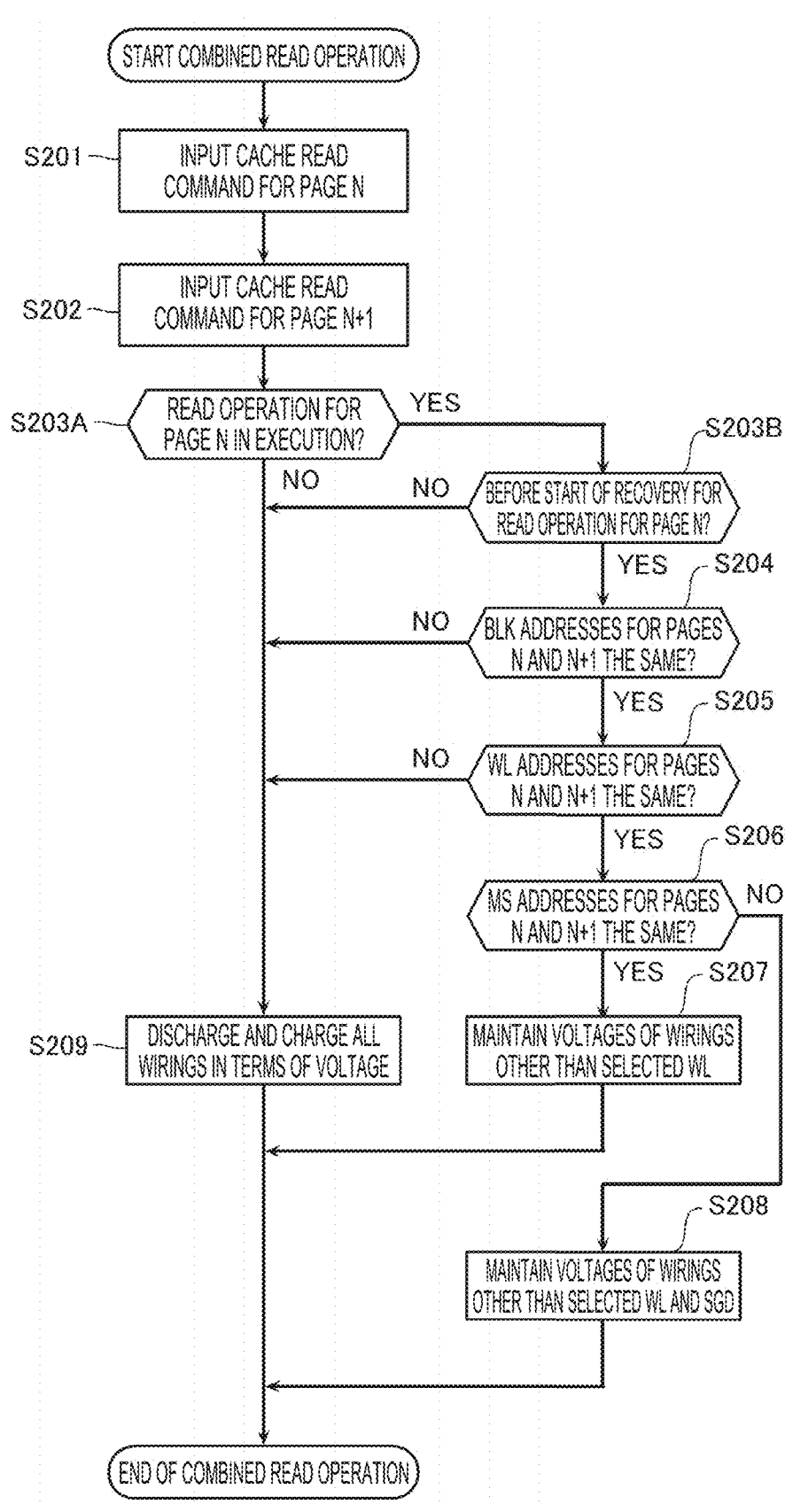
F I G. 33

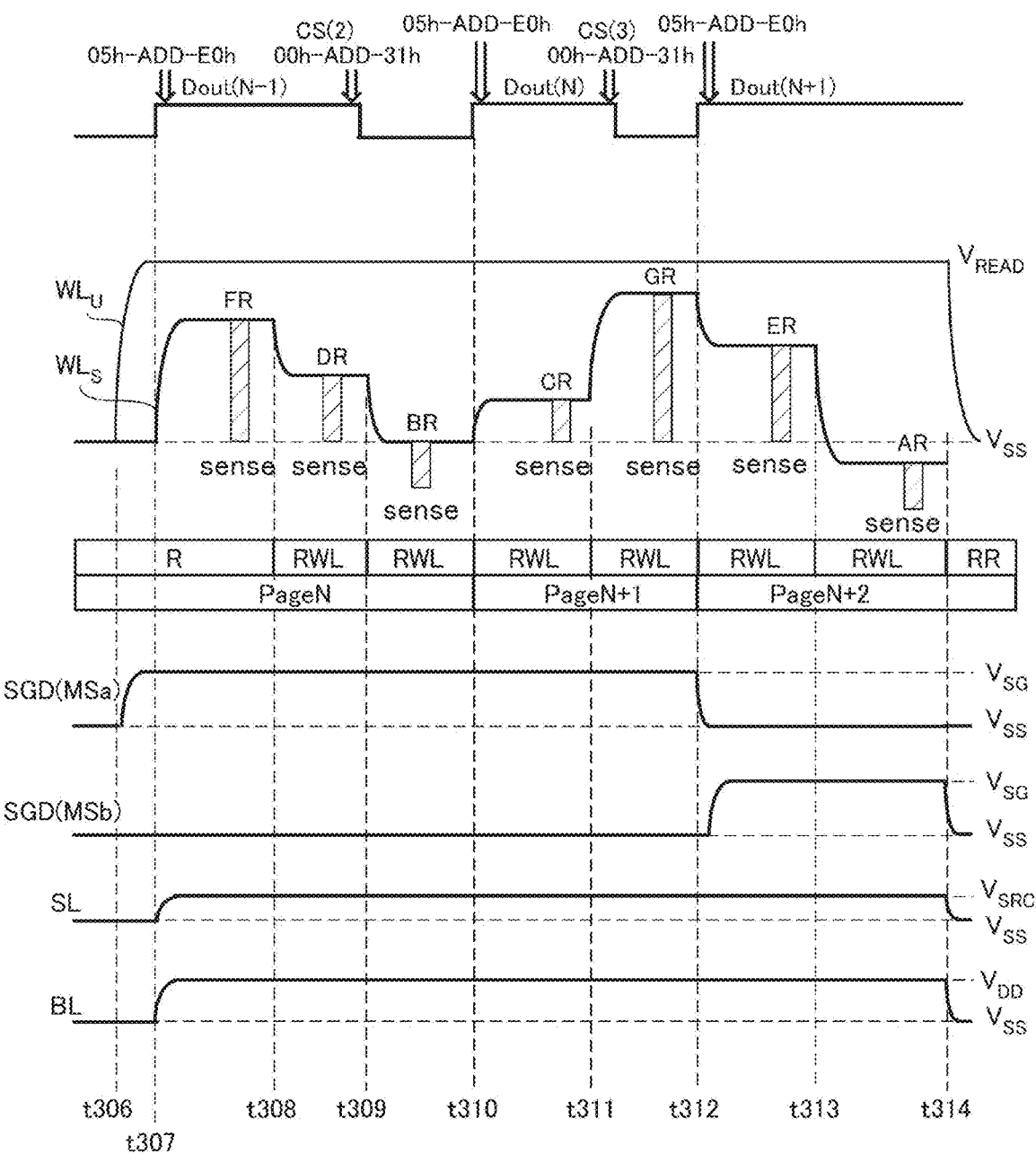
F I G. 34

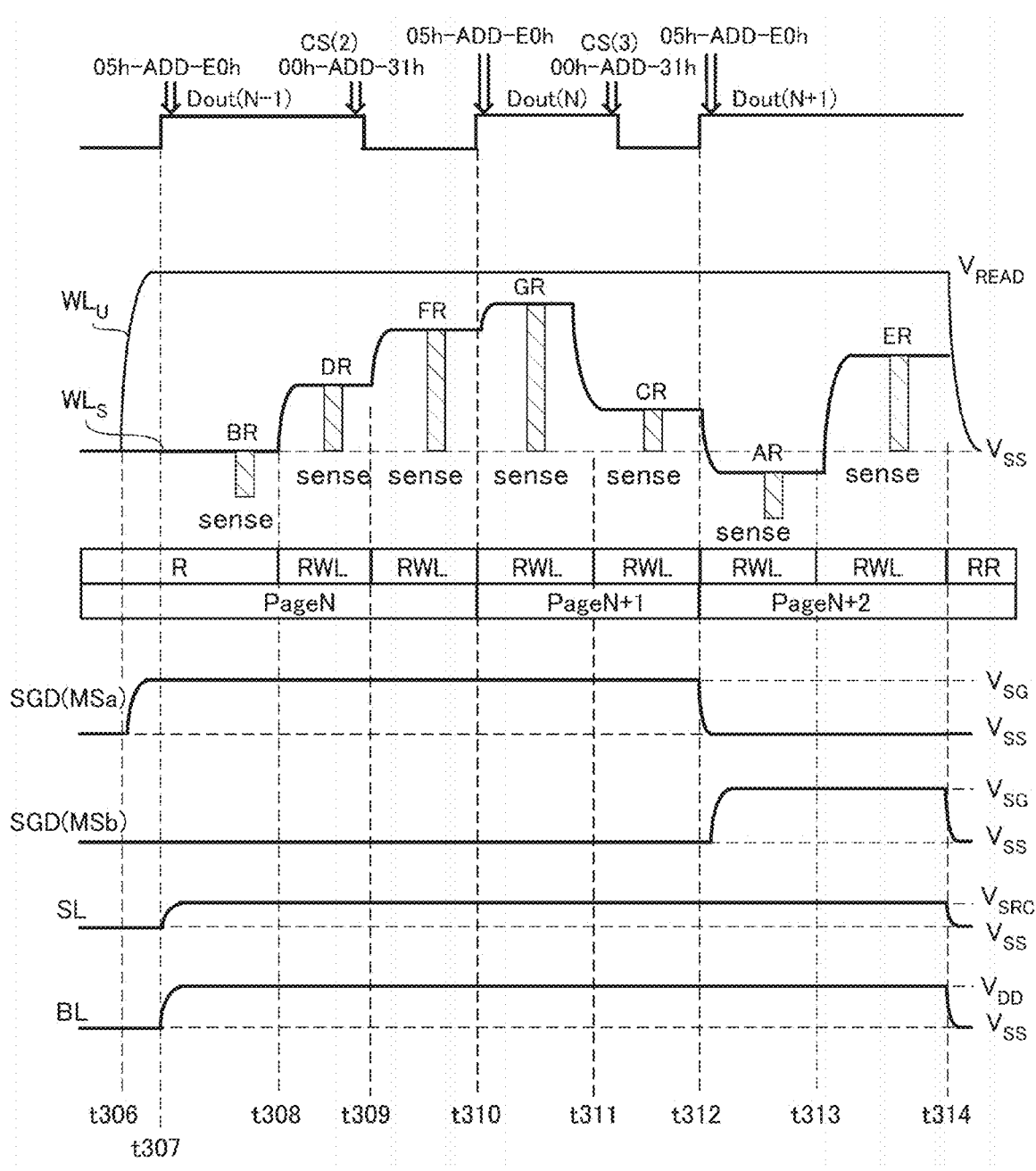
F I G. 35

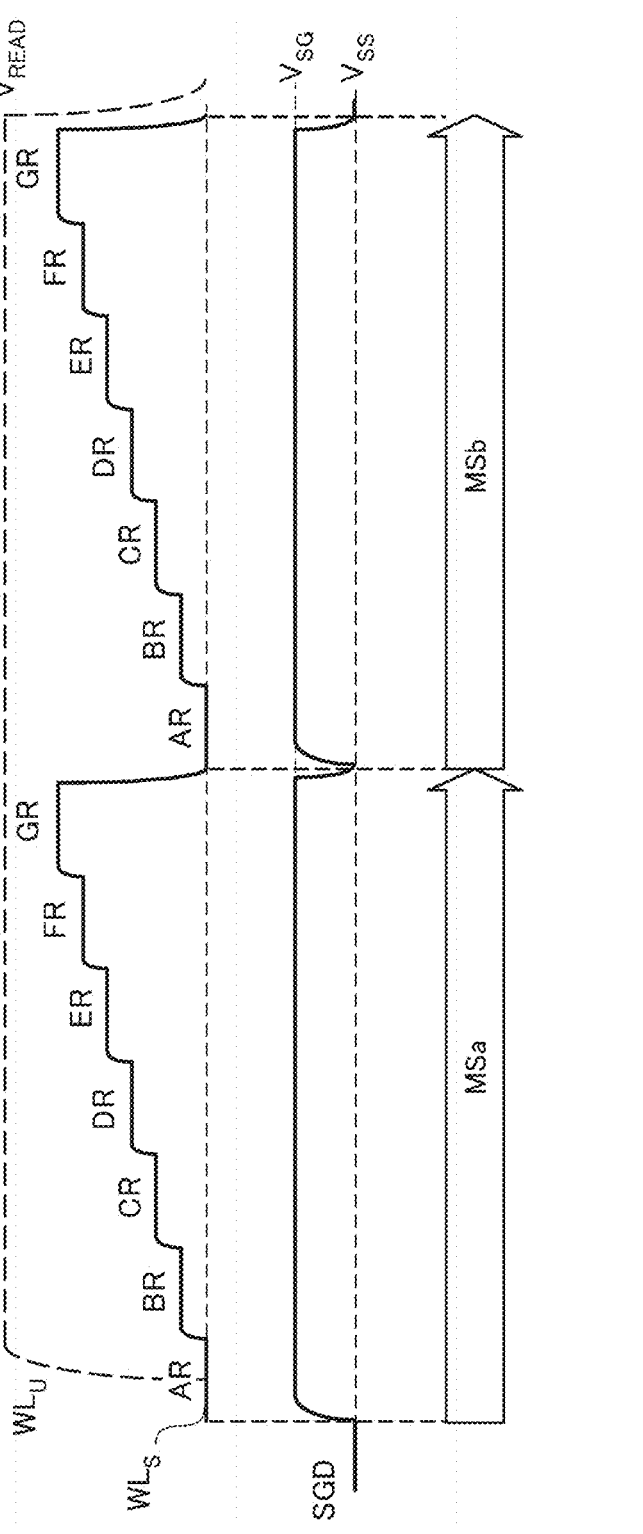
F I G. 36

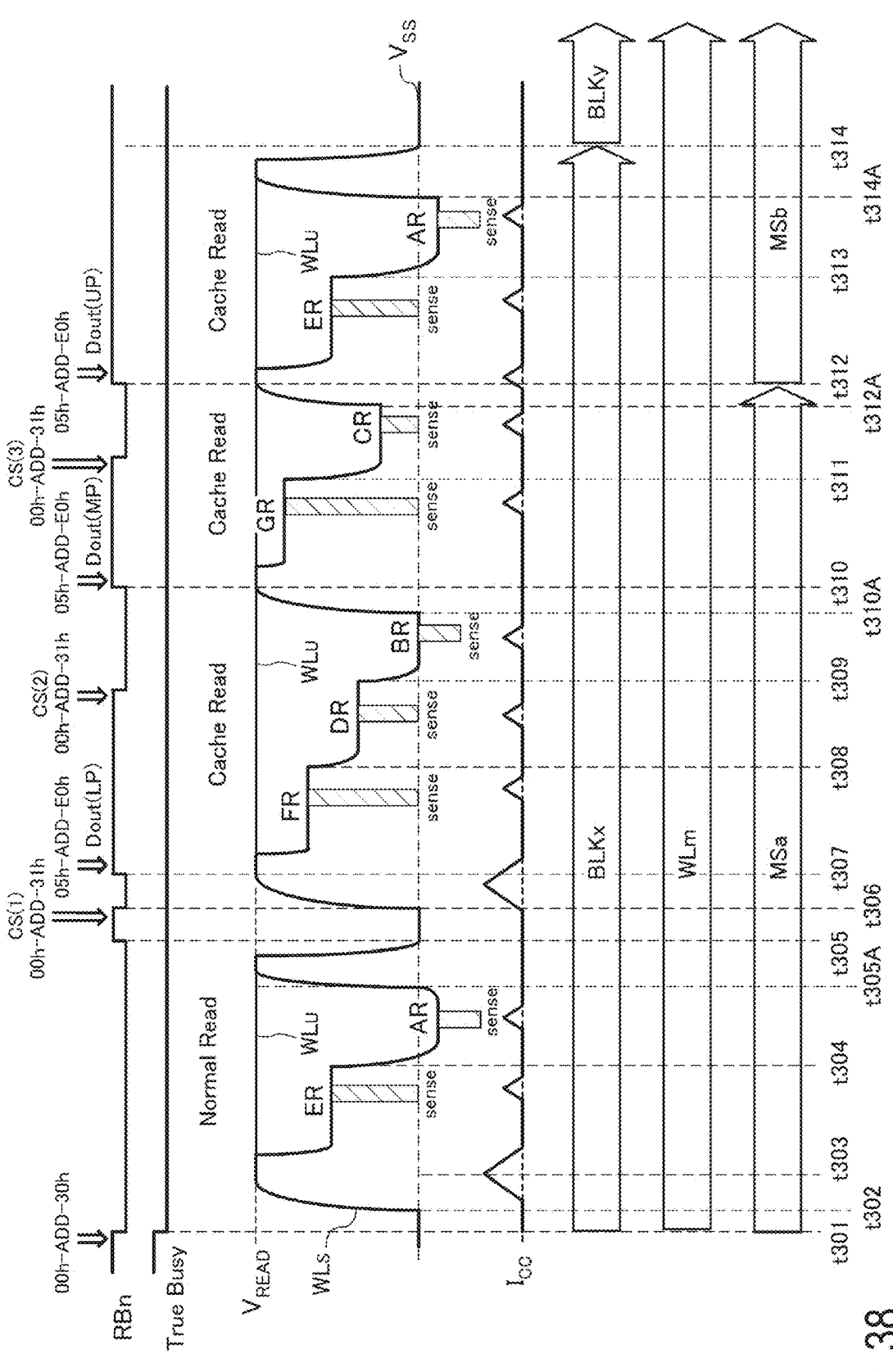
F I G. 38

SEMICONDUCTOR STORAGE DEVICE

CROSS-REFERENCE TO RELATED APPLICATIONS

This application is based upon and claims the benefit of priority from Japanese Patent Application No. 2023-120954, filed Jul. 25, 2023, the entire contents of which are incorporated herein by reference.

FIELD

Embodiments described herein relate generally to a semiconductor storage device.

BACKGROUND

A semiconductor storage device which includes a memory string, and a plurality of first wirings electrically connected to the memory string is known. In the semiconductor storage device, the memory string includes a plurality of memory transistors connected in series, and gate electrodes of these memory transistors are connected to the first wirings.

BRIEF DESCRIPTION OF THE DRAWINGS

FIG. 10 is a circuit diagram schematically showing a configuration of still another part of the memory die.

FIG. 11 is a circuit diagram schematically showing a configuration of still another part of the memory die.

FIG. 12 is a exploded perspective view diagram schematically showing a configuration example of a semiconductor storage device according to the first embodiment.

FIG. 13 is a bottom view diagram schematically showing a configuration example of a chip.

FIG. 16 is a bottom view diagram schematically showing a configuration of a part of the chip.

FIG. 17 is a cross sectional diagram schematically showing s configuration of part of the chip.

FIG. 20 is a timing chart for explaining the normal read operation and a second cache read operation.

FIG. 21 is a timing chart for explaining an operation when a command set is received.

FIG. 22 is a cross sectional diagram schematically illustrating voltages applied during a read voltage supply operation.

FIG. 23 is a waveform diagram for the first cache read operation.

FIG. 24 is a waveform diagram for the second cache read operation.

FIG. 25 is a flowchart for a data transfer operation.

FIG. 27 is a timing chart for a cache read operation according to the comparative example and the first cache read operation according to the first embodiment.

FIG. 29 is a timing chart for a cache read operation according to the comparative example and the second cache read operation according to the second embodiment.

FIG. 30 is a timing chart for a cache read operation according to the comparative example and a first cache read operation according to the second embodiment.

FIG. 33 is a flowchart for the combined read operation according to the third embodiment.

FIG. 34 is a waveform diagram for a combined read operation according to a fourth embodiment.

FIG. 35 is a waveform diagram for a combined read operation according to a modified example of the fourth embodiment.

FIG. 36 is a waveform diagram for a sequential read operation according to a fifth embodiment.

FIG. 38 is a waveform diagram showing a modified example of FIG. 31.

DETAILED DESCRIPTION

Figure 1:
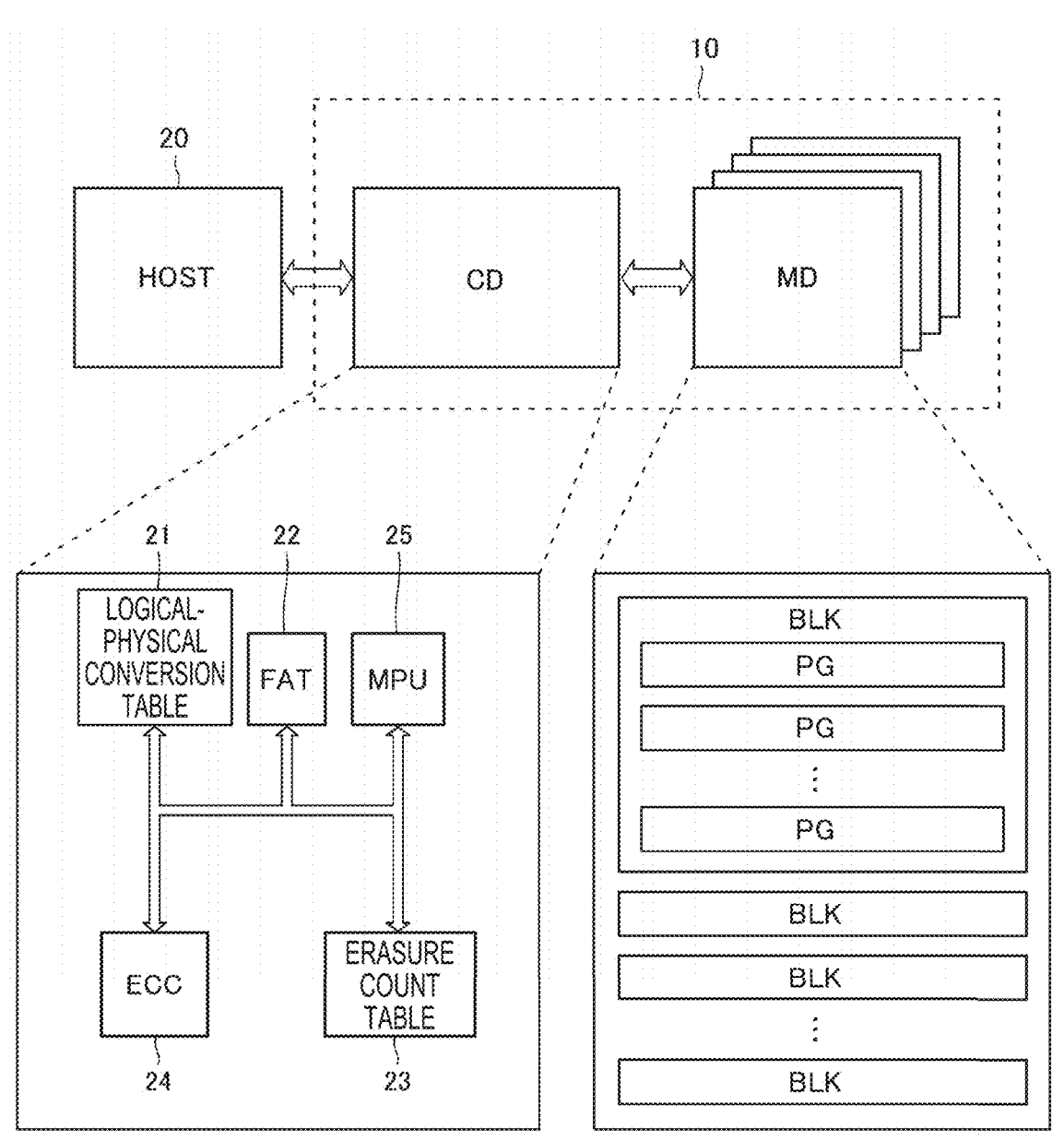
FIG. 1 is a block diagram schematically showing the configuration of a memory system according to a first embodiment.

A semiconductor storage device that can achieve improvement in data reading rate is provided.

In general, according to an embodiment, a semiconductor storage device includes a memory string, a bit line, a sense amplifier including first and second latch circuits, a cache memory including a third latch circuit, and a control circuit. The control circuit is configured to perform a first read operation in response to a first command set and consecutively perform a second read operation in response to a second command set received during the first read operation. During the first read operation, data read from the memory string is stored in the first latch circuit. When the second command set is received at a first timing, the control circuit performs a first data transfer operation of transferring the data stored in the first latch circuit to the second latch circuit, and then to the third latch circuit. When the second command set is received at a second timing before the first timing, the control circuit performs a second data transfer operation of transferring the data stored in the first latch circuit to the third latch circuit without storing the data in the second latch circuit.

Next, semiconductor storage devices according to embodiments are described in detail with reference to the drawings. It is noted that each of the following embodiments is only an example, and is not presented with an intention to limit the present invention. Furthermore, the following drawings may be schematic. For convenience of description, part of a configuration or the like is omitted in some cases. Parts common among embodiments are assigned the same symbols, and their description may be omitted.

The term "semiconductor storage device" in this disclosure may mean a memory die in some cases, or may mean a memory system including a controller die, such as a memory chip, a memory card, or an SSD (Solid State Drive). This may mean a configuration including a host computer, such as a smartphone, a tablet terminal, or a personal computer.

In this disclosure, the term "control circuit" may mean a peripheral circuit, such as a sequencer provided on a memory die in some cases, may mean a controller die or a controller chip connected to a memory die, or may mean a configuration including both of them.

In this disclosure, the expression that a first component "is electrically connected" to a second component may mean that the first component is directly connected to the second component in some cases, or may mean that the first component is connected to the second component via wiring, a semiconductor member, a transistor or the like. For example, in a case where three transistors are connected in series, the first transistor is "electrically connected" to the third transistor even when the second transistor is in the OFF state.

In this disclosure, the expression that a first component "is connected between" a second component and a third component sometimes may mean that the first, second, and third components are connected in series, and the second component is connected to the third component via the first component.

In this expression, the expression that a circuit or the like "makes conductive" two wirings or the like may mean, for example, that the circuit or like includes a transistor or the like, the transistor or the like is provided on a current path between the two wirings, and the transistor or the like is placed in the ON state.

In this expression, a predetermined direction parallel to the upper surface of a substrate is called an X-direction, a direction that is parallel to the upper surface of the substrate and is perpendicular to the X-direction is called a Y-direction, and a direction perpendicular to the upper surface of the substrate is called a Z-direction.

In this expression, a direction along a predetermined plane is called a first direction, a direction intersecting with the first direction along the predetermined plane is called a second direction, and a direction intersecting the predetermined plane is called a third direction in some cases. These first, second and third directions may each correspond to any of the X-, Y-, and Z-directions, but not necessarily.

In this expression, representations, such as of "upper" and "lower", are used with reference to the substrate. For example, a sense apart from the substrate along the Z-direction is called upper, and a sense approaching the substrate along the Z-direction is called lower. The reference to a lower surface or a lower end of a certain component means a surface or an end of this component closer to the substrate. The reference to an upper surface or an upper end means a surface or an end of this component away from the substrate. A surface intersecting with the X- or Y-direction is called a side surface or the like.

First Embodiment

[Memory System 10]

FIG. 1 is a block diagram schematically showing a configuration of a memory system 10 according to a first embodiment.

The memory system 10 performs reading, writing, erasing and the like of user data, according to a signal transmitted from a host computer 20. The memory system 10 is, for example, a memory chip, a memory card, an SSD, or another system that can store user data. The memory system 10 includes a plurality of memory dies MD, and a controller die CD.

The memory dies MD store user data. Each memory die MD includes a plurality of memory blocks BLK. Each memory block BLK includes a plurality of pages PG. The memory block BLK may be a unit of execution of an erase operation. The page PG may be a unit of execution of a read operation and a write operation.

As shown in FIG. 1, the controller die CD is connected to the plurality of memory dies MD and the host computer 20. The controller die CD includes, for example, a logical-physical conversion table 21, a FAT (File Allocation Table) 22, an erase count holder 23, an ECC circuit 24, and an MPU (Micro Processor Unit) 25.

The logical-physical conversion table 21 holds logical addresses received from the host computer 20, and respective physical addresses each allocated to the corresponding page PG in the corresponding memory die MD, in association with each other. The logical-physical conversion table 21 is achieved by, for example, a RAM (Random Access Memory) or the like, not shown.

The FAT 22 holds FAT information that indicates the states of the pages PG. Such FAT information may include, for example, information indicating "valid", "invalid", and "erased". For example, "valid" pages PG store valid data that is to be read according to an instruction from the host computer 20. "Invalid" pages PG store invalid data that is not to be read according to an instruction from the host computer 20. "Erased" pages PG store no data after an erase process is executed. The FAT 22 is achieved by, for example, a RAM or the like, not shown.

The erase count holder 23 holds the physical addresses corresponding to the memory blocks BLK, and the numbers of erase operations executed to the respective memory blocks BLK, in association with each other. The erase count holder 23 is achieved by, for example, a RAM or the like, not shown.

The ECC circuit 24 detects errors of data read from the memory die MD, and corrects the data if possible.

The MPU 25 refers to the logical-physical conversion table 21, the FAT 22, the erase count holder 23, and the ECC circuit 24, and performs processes, such as conversion between logical addresses and physical addresses, bit error detection/correction, garbage collection (compaction), wear leveling and the like.

Figure 2:
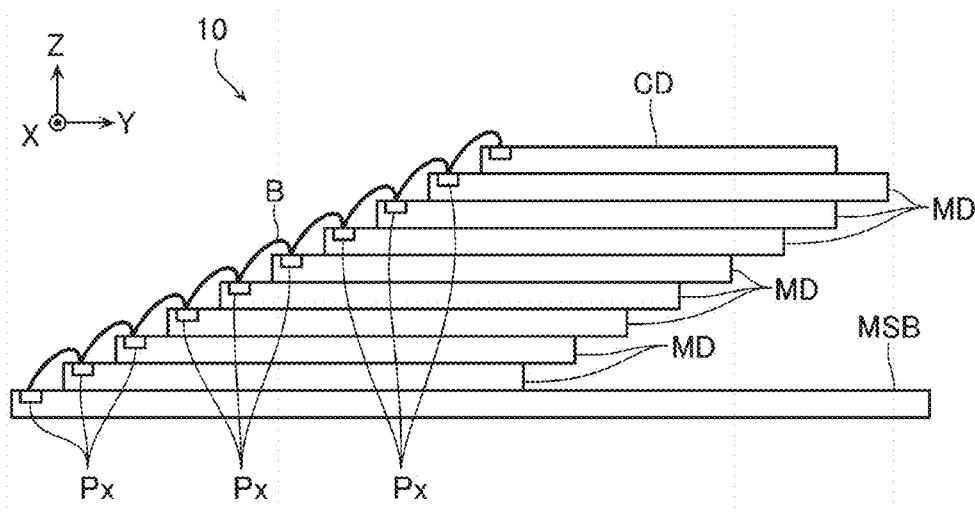
FIG. 2 is a side view diagram schematically showing a configuration example of the memory system.
Figure 3:
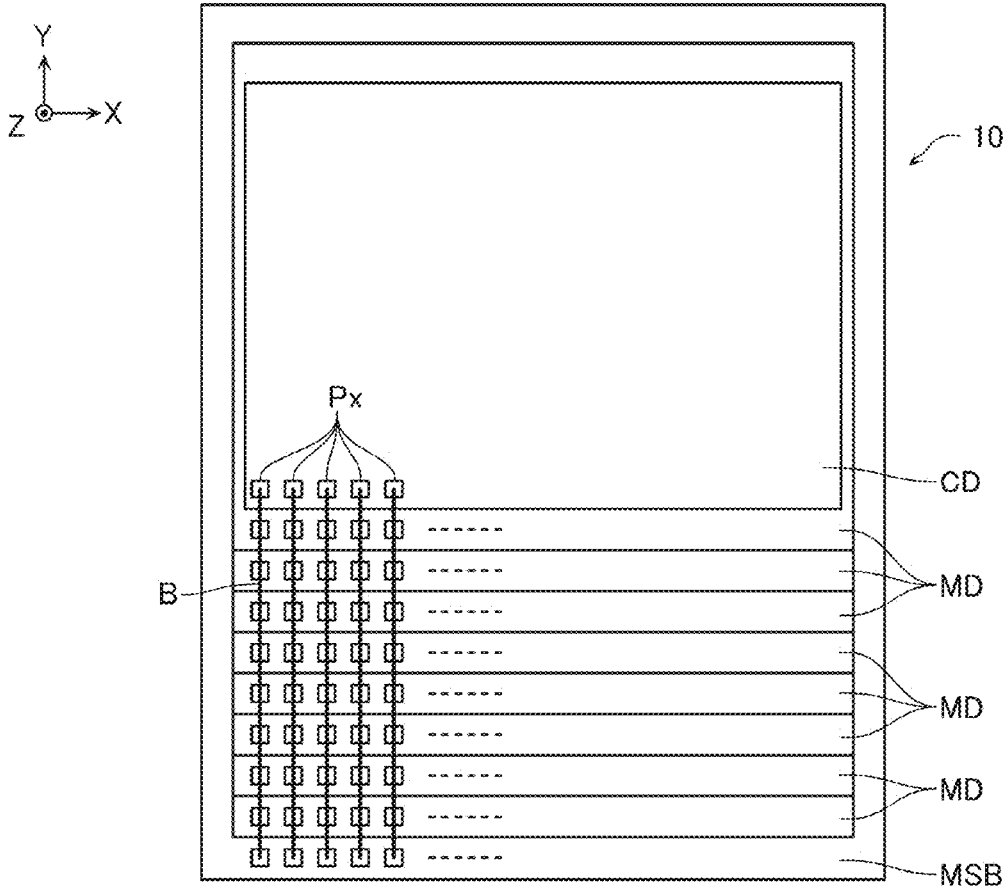
FIG. 3 is a plan view diagram schematically showing a configuration example of the memory system.

FIG. 2 is a side view diagram schematically showing a configuration example of the memory system 10 according to the present embodiment. FIG. 3 is a plan view diagram schematically showing the same configuration example. For convenience of description, part of the configuration is omitted in FIGS. 2 and 3.

As shown in FIG. 2, the memory system 10 according to the present embodiment includes a mount substrate MSB, the plurality of memory dies MD, and the controller die CD. Pad electrodes Px are provided in a region at an end in the Y-direction on the upper surface of the mount substrate MSB. A region of the upper surface of the mount substrate MSB other than the end in the Y-direction is bonded to the lower surface of a memory die MD with an adhesive or the like. The plurality of memory dies MD are stacked on the mount substrate MSB. Pad electrodes Px are provided in a region at the end in the Y-direction on the upper surface of each memory die MD. A region of the upper surface of each memory die MD other than the end in the Y-direction is bonded to the lower surface of another memory die MD or the controller die CD with an adhesive or the like. The controller die CD is stacked on the memory die MD. Pad electrodes Px are provided in a region at the end in the Y-direction on the upper surface of the controller die CD.

As shown in FIG. 3, the mount substrate MSB, the plurality of memory dies MD, and the controller die CD each include the plurality of pad electrodes Px arranged in the X-direction. The plurality of pad electrodes Px provided on the mount substrate MSB, the plurality of memory dies MD, and the controller die CD are connected to each other via corresponding bonding wires B.

It is noted that the configuration shown in FIGS. 2 and 3 is only an example. A specific configuration can be appropriately adjusted. For example, in the example shown in FIGS. 2 and 3, the controller die CD is stacked on the plurality of memory dies MD. The memory dies MD and the controller die CD are connected to each other by the bonding wires B. The plurality of memory dies MD and the controller die CD are included in a single package. However, the controller die CD may be included in a package other than that for the memory dies MD. The plurality of memory dies MD and the controller die CD may be connected to each other by corresponding through-vias or the like instead of the bonding wires B.

[Circuit Configuration of Memory Die MD]

Figure 4:
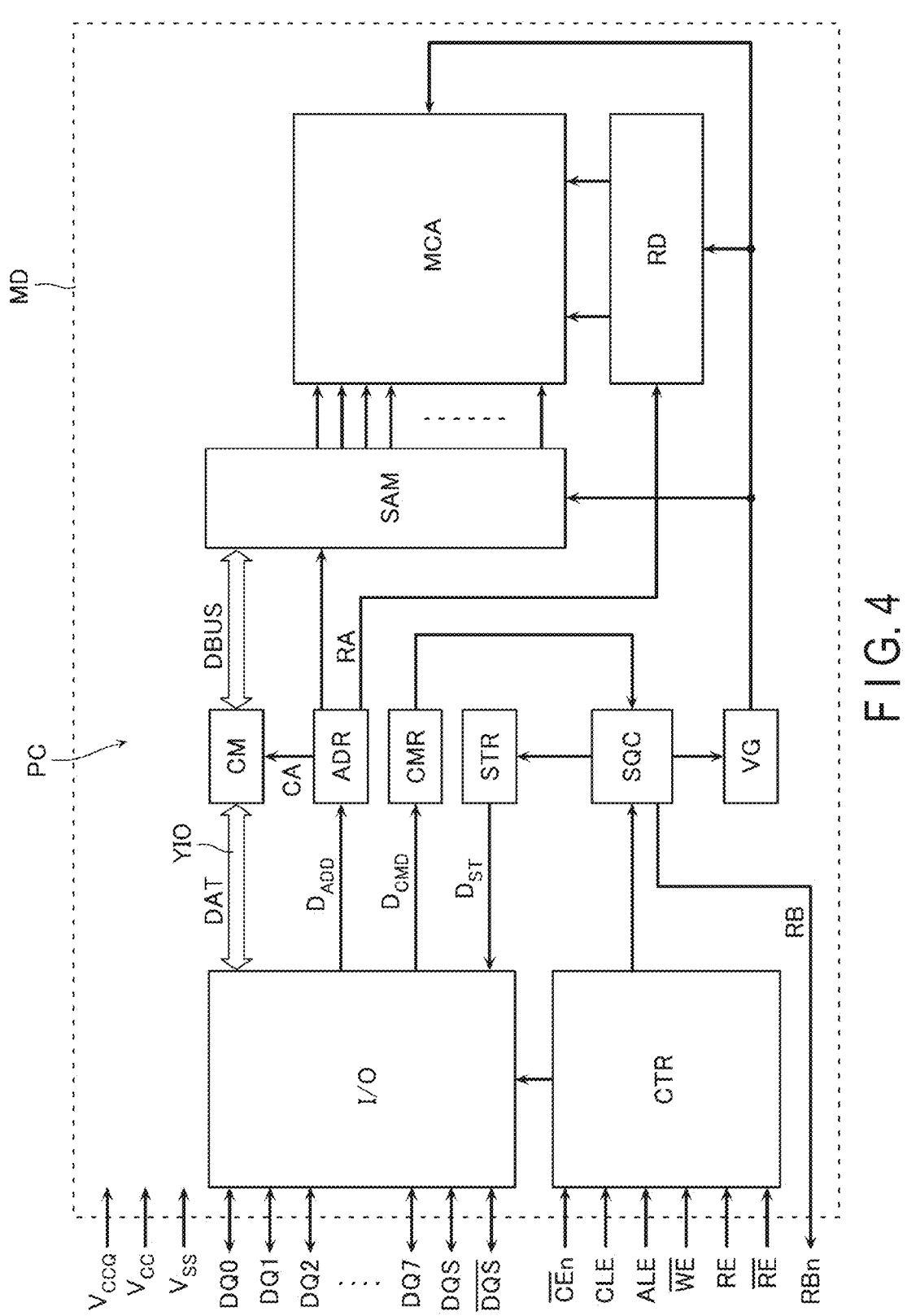
FIG. 4 is a block diagram schematically showing a configuration of a memory die in the memory system according to the first embodiment.

FIG. 4 is a block diagram schematically showing a configuration of the memory die MD according to the first embodiment. FIGS. 5 to 11 are circuit diagrams schematically showing a configuration of various parts of the memory die MD.

It is noted that FIG. 4 shows a plurality of control terminals and the like. These control terminals are represented as control terminals that each support a high active signal (positive logic signal) in some cases. These control terminals are represented as control terminals that each support a low active signal (negative logic signal). These control terminals are represented as control terminals that each support both the high active signal and the low active signal. In FIG. 4, the symbol of each control terminal supporting the low active signal includes an overline. In this Specification, the symbol of each control terminal supporting the low active signal includes a diagonal ("/"). It is noted that the illustration of FIG. 4 is only an example, and a specific example can be appropriately adjusted. For example, some or all of the high active signals may be low active signals, and some or all of the low active signals may be high active signals.

As shown in FIG. 4, the memory die MD includes a memory cell array MCA and a peripheral circuit PC. The peripheral circuit PC includes a voltage generation circuit VG, a row decoder RD, a sense amplifier module SAM, and a sequencer SQC. The peripheral circuit PC further includes a cache memory CM, an address register ADR, a command register CMR, and a status register STR. The peripheral circuit PC further includes an input/output control circuit I/O, and a logic circuit CTR.

[Circuit Configuration of Memory Cell Array MCA]

Figure 5:
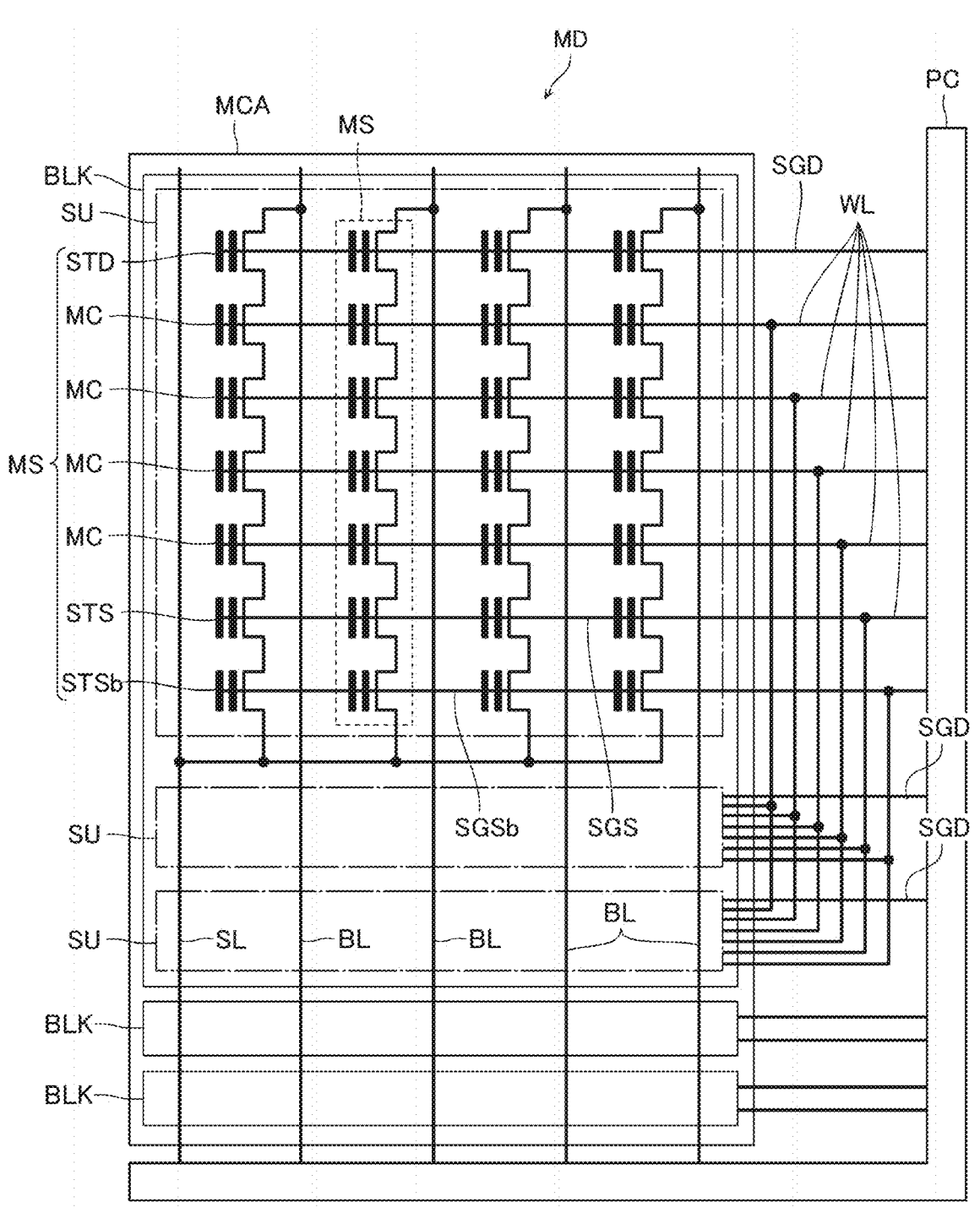
FIG. 5 is a circuit diagram schematically showing a configuration of a part of the memory die.

As shown in FIG. 5, the memory cell array MCA includes the plurality of memory blocks BLK. These memory blocks BLK each include a plurality of string units SU. These string units SU each include a plurality of memory strings MS. One end of each of these memory strings MS is connected to the peripheral circuit PC via the corresponding bit line BL. The other end of each of these memory strings MS is connected to the peripheral circuit PC via a common source line SL.

Each memory string MS includes a drain-side selection transistor STD, a plurality of memory cells MC (memory transistors), a source-side selection transistor STS, and a source-side selection transistor STSb. The drain-side selection transistor STD, the plurality of memory cells MC, the source-side selection transistor STS, and the source-side selection transistor STSb are connected in series between the corresponding bit line BL and the source line SL. Hereinafter, the drain-side selection transistor STD, the source-side selection transistor STS, and the source-side selection transistor STSb are simply called selection transistors (STD, STS, and STSb) in some cases.

The memory cells MC are field-effect type transistors. Each memory cell MC includes a semiconductor layer, a gate insulator film, and a gate electrode. The semiconductor layer functions as a channel region. The gate insulator film includes a charge accumulation film. The threshold voltage of the memory cell MC changes depending on the charge amount in the charge accumulation film. The memory cell MC stores one or more bits of data. A word line WL is connected to the gate electrodes of the multiple memory cells MC corresponding to one memory string MS. The word lines WL are each commonly connected to all the memory strings MS in the corresponding one memory block BLK.

The selection transistors (STD, STS, and STSb) are field-effect type transistors. The selection transistors (STD, STS, and STSb) each include a semiconductor layer, a gate insulator film, and a gate electrode. The semiconductor layer functions as a channel region. Select gate lines (SGD, SGS, and SGSb) are connected to the gate electrodes of the selection transistors (STD, STS, and STSb). One drain-side select gate line SGD is commonly connected to all the memory strings MS in one corresponding string unit SU. One source-side select gate line SGS is commonly connected to all the memory strings MS in one corresponding memory block BLK. One source-side select gate line SGSb is commonly connected to all the memory strings MS in one corresponding memory block BLK.

[Circuit Configuration of Voltage Generation Circuit VG]

Figure 6:
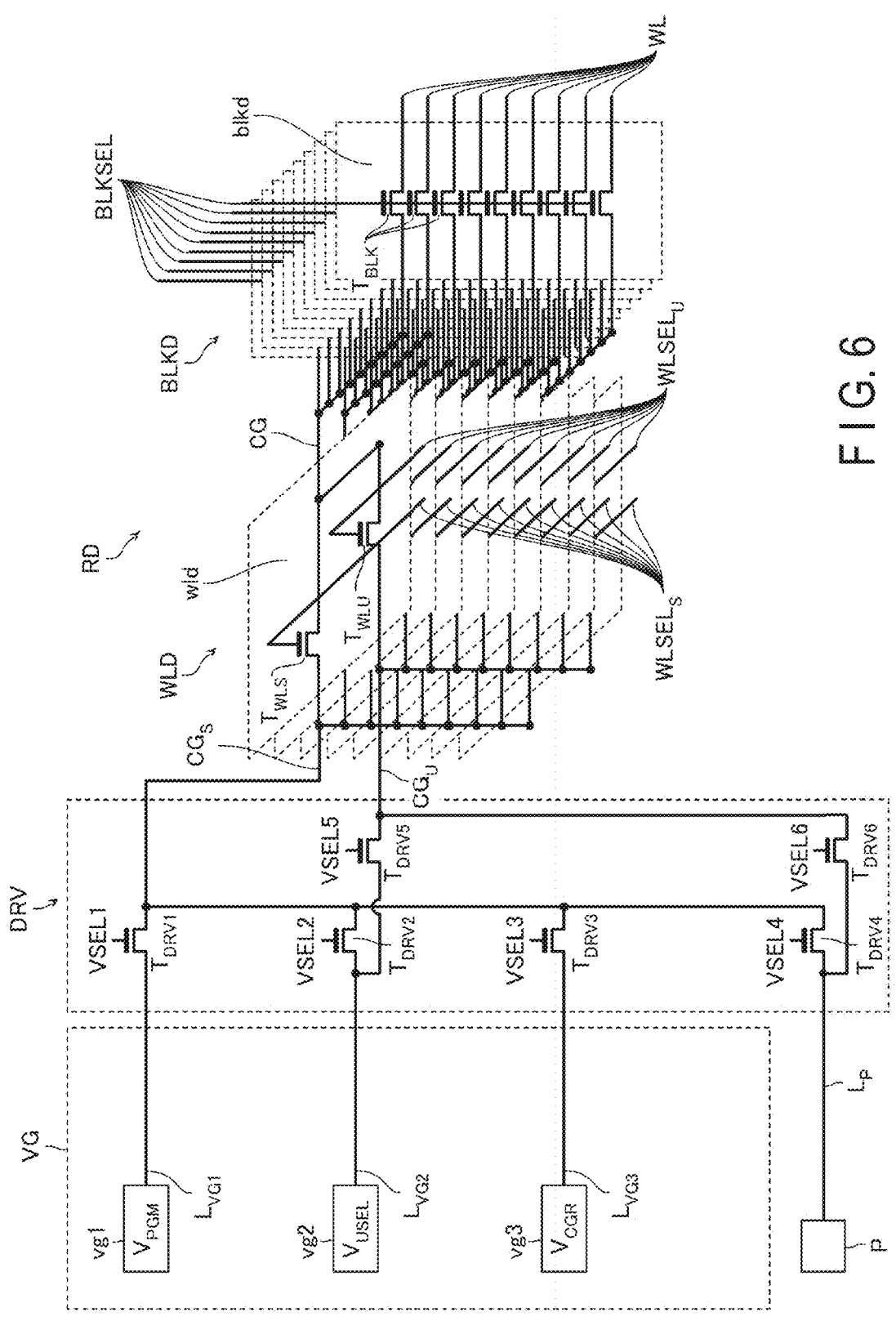
FIG. 6 is a circuit diagram schematically showing a configuration of another part of the memory die.

For example, as shown in FIG. 6, the voltage generation circuit VG (FIG. 4) includes a plurality of voltage generation units vg1 to vg3. The voltage generation units vg1 to vg3 generate voltages with predetermined magnitudes during the read operation, the write operation, and the erase operation, and output the voltages respectively via voltage supply lines $L_{VG}$ ($L_{VG1}$ to $L_{VG3}$). For example, the voltage generation unit vg1 outputs a program voltage that is to be used for the write operation. The voltage generation unit vg2 outputs an after-mentioned read pass voltage $V_{READ}$ Or the like during the read operation. Furthermore, the voltage generation unit vg2 outputs a write pass voltage that is to be used for the write operation. The voltage generation unit vg3 outputs an after-mentioned read voltage during the read operation.

Furthermore, the voltage generation unit vg3 outputs an after-mentioned verify voltage during the write operation. The voltage generation units vg1 to vg3 may be, for example, a booster circuit, such as charge pump circuit, or a step-down circuit, such as a regulator. These step-down circuit and the booster circuit are connected to voltage supply lines $L_P$. The voltage supply lines $L_P$ are supplied with a power source voltage $V_{CC}$ or a ground voltage $V_{SS}$ (FIG. 4). These voltage supply lines $L_P$ are connected to the pad electrodes Px described with reference to FIGS. 2 and 3, for example. An operating voltage output from the voltage generation circuit VG is appropriately adjusted according to a control signal from the sequencer SQC.

A charge pump circuit 32 (FIG. 7) in the voltage generation circuit VG includes a voltage output circuit 32a, a voltage dividing circuit 32b, and a comparator 32c. The voltage output circuit 32a outputs a voltage $V_{OUT}$ to the voltage supply line $L_{VG}$. The voltage dividing circuit 32b is connected to the voltage supply line $L_{VG}$. The comparator 32c outputs a feedback signal FB to the voltage output circuit 32a depending on the magnitude relationship between a voltage $V_{OUT}'$ output from the voltage dividing circuit 32b and a reference voltage $V_{REF}$.

Figure 8:
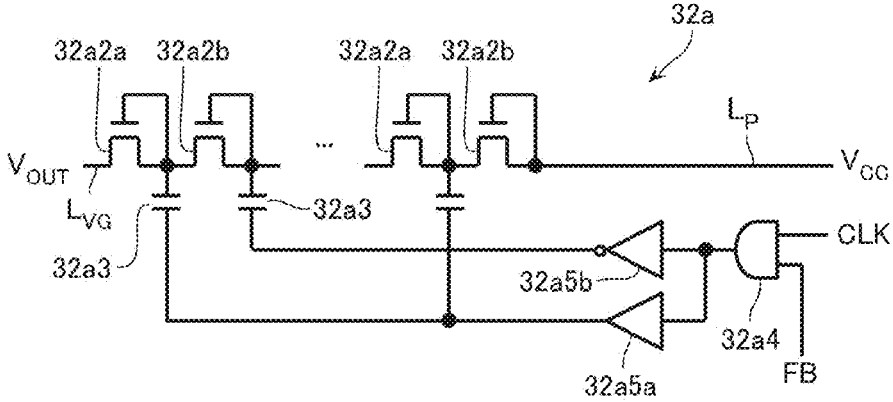
FIG. 8 is a circuit diagram schematically showing a configuration of still another part of the memory die.

As shown in FIG. 8, the voltage output circuit 32a includes a plurality of transistors 32a2a and 32a2b. The transistors 32a2a and 32a2b are alternately connected between the voltage supply line $L_{VG}$ and the voltage supply line $L_P$. The illustrated voltage supply line $L_P$ is supplied with a power source voltage $V_{CC}$. The gate electrodes of the transistors 32a2a and 32a2b connected in series are connected to their drain electrodes and corresponding capacitors 32a3. The voltage output circuit 32a includes an AND circuit 32a4, a level shifter 32a5a, and a level shifter 32a5b. The AND circuit 32a4 outputs the logical OR of a clock signal CLK and a feedback signal FB. The level shifter 32a5a boosts and outputs the output signal of the AND circuit 32a4. The output terminal of the level shifter 32a5a is connected to the gate electrode of the transistor 32a2a via a capacitor 32a3. The level shifter 32a5b boosts and outputs the inverted signal of the output signal of the AND circuit 32a4. The output terminal of the level shifter 32a5b is connected to the gate electrode of the transistor 32a2b via a capacitor 32a3.

If the feedback signal FB is in the "H" state, the clock signal CLK is output from the AND circuit 32a4. Accordingly, electrons are transported from the voltage supply line $L_{VG}$ to the voltage supply line $L_P$, and the voltage of the voltage supply line $L_{VG}$ increases. On the other hand, if the feedback signal FB is in the "L" state, the clock signal CLK is not output from the AND circuit 32a4. Consequently, the voltage of the voltage supply line $L_{VG}$ does not increase.

Figure 7:
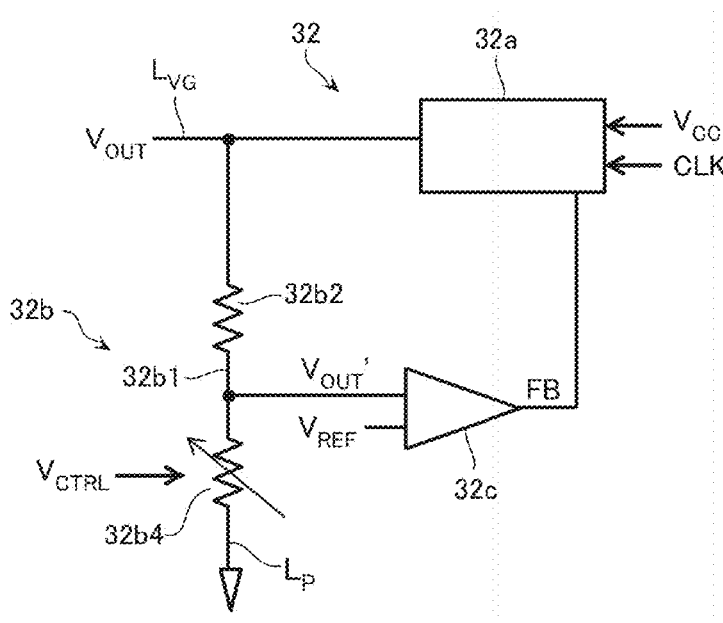
FIG. 7 is a circuit diagram schematically showing a configuration of still another part of the memory die.

As shown in FIG. 7, the voltage dividing circuit 32b includes a resistance element 32b2 and a variable resistance element 32b4. The resistance element 32b2 is connected between the voltage supply line $L_{VG}$ and a voltage dividing terminal 32b1. The variable resistance element 32b4 is connected in series between the voltage dividing terminal 32b1 and the voltage supply line $L_P$. The voltage supply line $L_P$ is supplied with the ground voltage $V_{SS}$. The resistance of the variable resistance element 32b4 can be adjusted according to an operation voltage control signal $V_{CTRL}$. Consequently, the magnitude of the voltage $V_{OUT}'$ of the voltage dividing terminal 32b1 can be adjusted according to the operation voltage control signal $V_{CTRL}$.

Figure 9:
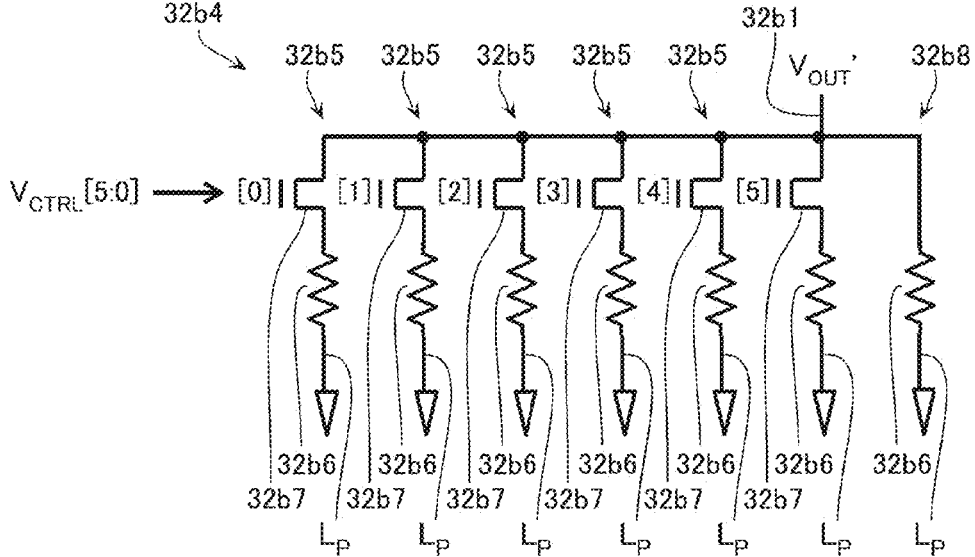
FIG. 9 is a circuit diagram schematically showing the configuration of still another part of the memory die.

As shown in FIG. 9, the variable resistance element 32b4 includes a plurality of current paths 32b5. The current paths 32b5 are connected in parallel between the voltage dividing terminal 32b1 and the voltage supply lines $L_P$. The current paths 32b5 each include a resistance element 32b6 and a transistor 32b7 that are connected in series. The resistances of the resistance elements 32b6 provided on the respective current paths 32b5 may be different from each other. The individual bits of the operation voltage control signal $V_{CTRL}$ are respectively input into the gate electrodes of the transistors 32b7. The variable resistance element 32b4 may include a current path 32b8 that includes no transistor 32b7.

As shown in FIG. 7, the comparator 32c outputs the feedback signal FB. For example, the feedback signal FB is placed in the "L" state if the voltage $V_{OUT}'$ of the voltage dividing terminal 32b1 is higher than the reference voltage $V_{REF}$. For example, the feedback signal FB is placed in the "H" state if the voltage $V_{OUT}'$ is lower than the reference voltage $V_{REF}$.

[Circuit Configuration of Row Decoder RD]

For example, as shown in FIG. 6, the row decoder RD includes a block decoder BLKD, a word line decoder WLD, a driver circuit DRV, and an address decoder, not shown.

The block decoder BLKD includes a plurality of block decode units blkd. The block decode units blkd correspond to the respective memory blocks BLK in the memory cell array MCA. Each block decode unit blkd includes a plurality of transistors $T_{BLK}$. The transistors $T_{BLK}$ correspond to the respective word lines WL in the memory block BLK. The transistors $T_{BLK}$ are, for example, field-effect type NMOS transistors. The drain electrodes of the transistors $T_{BLK}$ are connected to the word line WL. The source electrodes of the transistors $T_{BLK}$ are connected to wirings CG. The wirings CG are connected to all the block decode units blkd in the block decoder BLKD. The gate electrodes of the transistors $T_{BLK}$ are connected to signal lines BLKSEL. The signal lines BLKSEL are provided so as to respectively support all the block decode units blkd. The signal lines BLKSEL are connected to all the transistors $T_{BLK}$ in the block decode units blkd.

During the read operation, the write operation and the like, for example, the voltage of one signal line BLKSEL associated with the block address in the address register ADR (FIG. 4) is in the "H" state, and the voltages of the other signal lines BLKSEL are in the "L" state. For example, one signal line BLKSEL is supplied with a predetermined driving voltage having a positive value, and the other signal lines BLKSEL are supplied with the ground voltage $V_{SS}$ or the like. Accordingly, all the word lines WL in one memory block BLK associated with this block address are conductive to all the wirings CG. All the word lines WL in the other memory blocks BLK are in a floating state.

The word line decoder WLD includes a plurality of word line decode units wld. The word line decode units wld correspond to the respective memory cells MC in the memory string MS. In the illustrated example, each word line decode unit wld includes two transistors $T_{WLS}$ and $T_{WLU}$. The transistors $T_{WLS}$ and $T_{WLU}$ are, for example, field-effect type NMOS transistors. The drain electrodes of the transistors $T_{WLS}$ and $T_{WLU}$ are connected to the wiring CG. The source electrode of the transistor $T_{WLS}$ is connected to a wiring $CG_S$. The source electrode of the transistor $T_{WLU}$ is connected to a wiring $CG_U$. The gate electrode of the transistor $T_{WLS}$ is connected to a signal line $WLSEL_S$. The gate electrode of the transistor $T_{WLU}$ is connected to a signal line $WLSEL_U$. A plurality of the signal lines $WLSEL_S$ are provided to each support one transistor $T_{WLS}$ included in the corresponding one of all the word line decode units wld. A plurality of the signal lines $WLSEL_S$ are provided to each support the other transistor $T_{WLU}$ included in the corresponding one of all the word line decode units wld.

During the read operation, the write operation and the like, for example, the voltage of the signal line $WLSEL_S$ corresponding to one word line decode unit wld associated with the page address in the address register ADR (FIG. 4) is in the "H" state, and the voltage of the corresponding $WLSEL_U$ is in the "L" state. The voltages of the signal lines $WLSEL_S$ corresponding to the other respective word line decode units wld are in the "L" state, and the voltages of the corresponding $WLSEL_U$ are in the "H" state. The wiring $CG_S$ is supplied with a voltage corresponding to a selected word line $WL_S$. The wiring $CG_U$ is supplied with a voltage corresponding to unselected word lines $WL_U$. Accordingly, the one word line WL corresponding to the aforementioned page address is supplied with the voltage corresponding to the selected word line $WL_S$. The other word lines WL are supplied with the voltage corresponding to the unselected word lines $WL_U$.

The driver circuit DRV includes, for example, six transistors $T_{DRV1}$ to $T_{DRV6}$. The transistors $T_{DRV1}$ to $T_{DRV6}$ are, for example, field-effect type NMOS transistors. The drain electrodes of the transistors $T_{DRV1}$ to $T_{DRV4}$ are connected to the wiring $CG_S$. The drain electrodes of the transistors $T_{DRV5}$ and $T_{DRV6}$ are connected to the wiring $CG_U$. The source electrode of the transistor $T_{DRV1}$ is connected to the output terminal of the voltage generation unit vg1 via the voltage supply line $L_{VG1}$. The source electrodes of the transistors $T_{DRV2}$ and $T_{DRV5}$ are connected to the output terminal of the voltage generation unit vg2 via the voltage supply line $L_{VG2}$. The source electrode of the transistor $T_{DRV3}$ is connected to the output terminal of the voltage generation unit vg3 via the voltage supply line $L_{VG3}$. The source electrodes of the transistors $T_{DRV4}$ and $T_{DRV6}$ are connected, through the voltage supply line $L_P$, to the pad electrode Px described with reference to FIGS. 2 and 3. Signal lines VSEL1 to VSEL6 are connected to the gate electrodes of the respective transistors $T_{DRV1}$ to $T_{DRV6}$.

During the read operation, the write operation and the like, for example, the voltage of one of the signal lines VSEL1 to VSEL4 corresponding to the wiring $CG_S$ is in the "H" state, and the voltages of the others are in the "L" state. The voltage of one of the two signal lines VSEL5 and VSEL6 corresponding to the wiring $CG_U$ is in the "H" state, and the voltage of the other is in the "L" state.

For example, the address decoder, not shown, sequentially refers to the row address RA of the address register ADR (FIG. 4) according to the control signal from the sequencer SQC (FIG. 4). The row address RA includes the block address and the page address described above. The address decoder controls the voltages of the signal lines BLKSEL, $WLSEL_S$, and $WLSEL_U$ to the "H" state or the "L" state.

It is noted that in the example in FIG. 6, the row decoder RD is provided with the block decode units blkd, each of which supports the corresponding one memory block BLK. However, the configuration can be appropriately changed. For example, one block decode unit blkd may be provided for two or more memory blocks BLK.

[Circuit Configuration of Sense Amplifier Module SAM]

For example, as shown in FIG. 10, the sense amplifier module SAM (FIG. 4) includes a plurality of sense amplifier units SAU. The sense amplifier units SAU correspond to the respective bit lines BL. Each sense amplifier unit SAU includes a sense amplifier SA, a wiring LBUS, latch circuits SDL, ADL, BDL, and CDL. A charge transistor 55 (FIG. 11)

for pre-charging is connected to the wiring LBUS. The wiring LBUS is connected to a wiring DBUS via a switch transistor DSW.

As shown in FIG. 11, the sense amplifier SA includes a sense transistor 41. The sense transistor 41 discharges charges on the wiring LBUS in accordance with the current flowing through the bit line BL. The source electrode of the sense transistor 41 is connected to a voltage supply line through which the ground voltage $V_{SS}$ is supplied. The drain electrode is connected to the wiring LBUS via a switch transistor 42. The gate electrode is connected to the bit lines BL via a sense node SEN, a discharge transistor 43, a node COM, a clamp transistor 44, and a voltage resistance transistor 45. It is noted that the sense node SEN is connected to an internal control signal line CLKSA via a capacitor 48.

The sense amplifier SA includes a voltage transfer circuit. The voltage transfer circuit selectively makes the node COM and the sense node SEN conductive to a voltage supply line through which a voltage $V_{DD}$ is supplied or a voltage supply line through which a voltage $V_{SRC}$ is supplied, depending on data latched in the latch circuit SDL. The voltage transfer circuit includes a node N1, a charge transistor 46, a charge transistor 49, a charge transistor 47, and a discharge transistor 50. The charge transistor 46 is connected between the node N1 and the sense node SEN. The charge transistor 49 is connected between the node N1 and the node COM. The charge transistor 47 is connected between the node N1 and the voltage supply line through which the voltage $V_{DD}$ is supplied. The discharge transistor 50 is connected between the node N1 and the voltage supply line through which the voltage $V_{SRC}$ is supplied. It is noted that the gate electrodes of the charge transistor 47 and the discharge transistor 50 are commonly connected to a node INV_S of the latch circuit SDL.

It is noted that the sense transistor 41, the switch transistor 42, discharge transistor 43, the clamp transistor 44, the charge transistor 46, the charge transistor 49, and the discharge transistor 50 are, for example, enhancement type NMOS transistors. The voltage resistance transistor 45 is, for example, a depression-type NMOS transistor. The charge transistor 47 is, for example, a PMOS transistor.

The gate electrode of the switch transistor 42 is connected to a signal line STB. The gate electrode of the discharge transistor 43 is connected to a signal line XXL. The gate electrode of the clamp transistor 44 is connected to a signal line BLC. The gate electrode of the voltage resistance transistor 45 is connected to a signal line BLS. The gate electrode of the charge transistor 46 is connected to a signal line HLL. The gate electrode of the charge transistor 49 is connected to a signal line BLX. These signal lines STB, XXL, BLC, BLS, HLL, and BLX are connected to the sequencer SQC.

The latch circuit SDL includes nodes LAT_S and INV_S, an inverter 51, an inverter 52, a switch transistor 53, and a switch transistor 54. The inverter 51 includes an output terminal connected to the node LAT_S, and an input terminal connected to the node INV_S. The inverter 52 includes an input terminal connected to the node LAT_S, and an output terminal connected to the node INV_S. The switch transistor 53 is provided on a current path between the node LAT_S and the wiring LBUS. The switch transistor 54 is provided on a current path between the node INV_S and the wiring LBUS. The switch transistors 53 and 54 are, for example, NMOS transistors. The gate electrode of the switch transistor 53 is connected to the sequencer SQC via a signal line STL. The gate electrode of the switch transistor 54 is connected to the sequencer SQC via a signal line STI.

The latch circuits ADL, BDL, and CDL are configured substantially similarly to the latch circuit SDL. However, as described above, the node INV_S of the latch circuit SDL is conductive to the gate electrodes of the charge transistor 47 and the discharge transistor 50 in the sense amplifier SA. The latch circuits ADL, BDL, and CDL are different from the latch circuit SDL in this point.

The switch transistor DSW is, for example, an NMOS transistor. The switch transistor DSW is connected between the wiring LBUS and the wiring DBUS. The gate electrode of the switch transistor DSW is connected to the sequencer SQC via a signal line DBS.

It is noted that as exemplified in FIG. 10, the aforementioned signal lines STB, HLL, XXL, BLX, BLC, and BLS are connected commonly among all the sense amplifier units SAU included in the sense amplifier module SAM. The voltage supply line through which the voltage $V_{DD}$ is supplied and the voltage supply line through which the voltage $V_{SRC}$ is supplied, described above, are connected commonly among all the sense amplifier units SAU included in the sense amplifier module SAM. The signal line STI and the signal line STL of the latch circuit SDL are connected commonly among all the sense amplifier units SAU included in the sense amplifier module SAM. Likewise, signal lines ATI, ATL, BTI, BTL, CTI, and CTL in the latch circuits ADL, BDL, and CDL that correspond to the signal line STI and the signal line STL are connected commonly among all the sense amplifier units SAU included in the sense amplifier module SAM. Meanwhile, a plurality of the signal lines DBS described above are provided corresponding to all the sense amplifier units SAU included in the sense amplifier module SAM.

[Circuit Configuration of Cache Memory CM]

The cache memory CM (FIG. 4) includes a plurality of latch circuits XDL as shown in FIG. 10. The plurality of latch circuits XDL are connected to the latch circuits in the sense amplifier module SAM via the wiring DBUS.

Data DAT included in these latch circuits XDL is sequentially transferred to the latch circuits in the sense amplifier module SAM during or before the write operation. The data DAT included in the latch circuits in the sense amplifier module SAM is sequentially transferred to the latch circuits XDL during or after the read operation. In general, when data transfer using the wiring DBUS is executed, operation current $I_{CC}$ flowing through the pad electrodes Px supplied with the power source voltage $V_{CC}$ increases owing to charging and discharging of the wiring DBUS. The data DAT included in the latch circuits XDL is sequentially transferred to the input/output control circuit I/O via a bidirectional bus YIO during the data out operation.

A decode circuit and a switch circuit, not shown, are connected to the cache memory CM. The decode circuit decodes the column address CA held in the address register ADR. The switch circuit makes the latch circuit associated with the column address CA conductive to the bidirectional bus YIO (FIG. 4) according to the output signal of the decode circuit.

[Circuit Configuration of Sequencer SQC]

The sequencer SQC (FIG. 4) outputs an internal control signal to the row decoder RD, the sense amplifier module SAM, and the voltage generation circuit VG, according to command data $D_{CMD}$ held in the command register CMR. The sequencer SQC appropriately outputs status data $D_{ST}$ indicating its own state, to the status register STR.

The sequencer SQC generates a ready/busy signal RB, and outputs the ready/busy signal RB to a terminal RBn. The ready/busy signal RB is a signal for notifying the controller die CD of whether the state is a ready state capable of receiving a command from the controller die CD, or a busy state of receiving no command. In a period in which the voltage of the terminal RBn is in the "L" state (busy period), access to the memory die MD is basically inhibited. In a period in which the voltage of the terminal RBn is in the "H" state (ready period), access to the memory die MD is allowed. It is noted that the terminal RBn is achieved by, for example, the pad electrode Px described with reference to FIGS. 2 and 3.

[Circuit Configuration of Input/output Control Circuit I/O]

The input/output control circuit I/O includes data signal input/output terminals DQ0 to DQ7, toggle signal input/output terminals DQS and /DQS, a plurality of input circuits, a plurality of output circuits, a shift register, and a buffer circuit. The multiple input circuits, the multiple output circuits, the shift register, and the buffer circuit are connected to terminals supplied with the power source voltage $V_{CC}$ and the ground voltage $V_{SS}$.

The data signal input/output terminals DQ0 to DQ7, the toggle signal input/output terminals DQS and /DQS, and the terminal supplied with the power source voltage $V_{CC}$ are achieved by, for example, the pad electrodes Px described with reference to FIGS. 2 and 3. Data input via the data signal input/output terminals DQ0 to DQ7 is output from the buffer circuit to the cache memory CM, the address register ADR, or the command register CMR, according to the internal control signal from the logic circuit CTR. Data output via the data signal input/output terminals DQ0 to DQ7 is input into the buffer circuit from the cache memory CM or the status register STR, according to the internal control signal from the logic circuit CTR.

The input circuits include, for example, a comparator connected to any of the data signal input/output terminals DQ0 to DQ7, or both the toggle signal input/output terminals DOS and /DQS. The output circuits include, for example, an OCD (Off Chip Driver) circuit connected to any of the data signal input/output terminals DQ0 to DQ7, or any of the toggle signal input/output terminals DQS and /DQS.

[Circuit Configuration of Logic Circuit CTR]

The logic circuit CTR (FIG. 4) receives an external control signal from the controller die CD via external control terminals /CEn, CLE, ALE, /WE, RE, and /RE, and outputs an internal control signal to the input/output control circuit I/O according to the received signal. It is noted that the external control terminals /CEn, CLE, ALE, /WE, RE, and /RE are achieved by, for example, the pad electrodes Px described with reference to FIGS. 2 and 3.

[Structure of Memory Die MD]

FIG. 12 is a exploded perspective view diagram schematically showing a configuration example of the semiconductor storage device according to the present embodiment. As shown in FIG. 12, the memory die MD includes a chip $C_M$ including the memory cell array MCA, and a chip $C_P$ including the peripheral circuit PC.

The multiple pad electrodes Px connectable to bonding wires, not shown, are provided on the upper surface of the chip $C_M$. A plurality of pasted electrodes $P_{I1}$ are provided on the lower surface of the chip $C_M$. A plurality of pasted electrodes $P_{I2}$ are provided on the upper surface of the chip $C_P$. Hereinafter, as for the chip $C_M$, the surface provided with the multiple pasted electrodes $P_{I1}$ is called a front surface, and the surface provided with the multiple pad electrodes Px is called a rear surface. As for the chip $C_P$, the surface provided with the multiple pasted electrodes $P_{I2}$ is called a front surface, and the surface opposite to the front surface is called a rear surface. In the illustrated example, the front surface of the chip $C_P$ is provided above the rear surface of the chip $C_P$, and the rear surface of the chip $C_M$ is provided above the front surface of the chip $C_M$.

The chip $C_M$ and the chip $C_P$ are arranged so that the front surface of the chip $C_M$ and the front surface of the chip $C_P$ are arranged to face each other. The pasted electrodes $P_{I1}$ are provided corresponding to the respective pasted electrodes $P_{I2}$, and are arranged at positions allowing pasting to the respective pasted electrodes $P_{I2}$. The pasted electrodes $P_{I1}$ and the pasted electrodes $P_{I2}$ function as pasted electrodes for pasting the chip $C_M$ to the chip $C_P$, and making them electrically conductive.

It is noted that in the example in FIG. 12, corners a1, a2, a3, and a4 of the chip $C_M$ correspond to corners b1, b2, b3, and b4 of the chip $C_P$, respectively.

Figure 14:
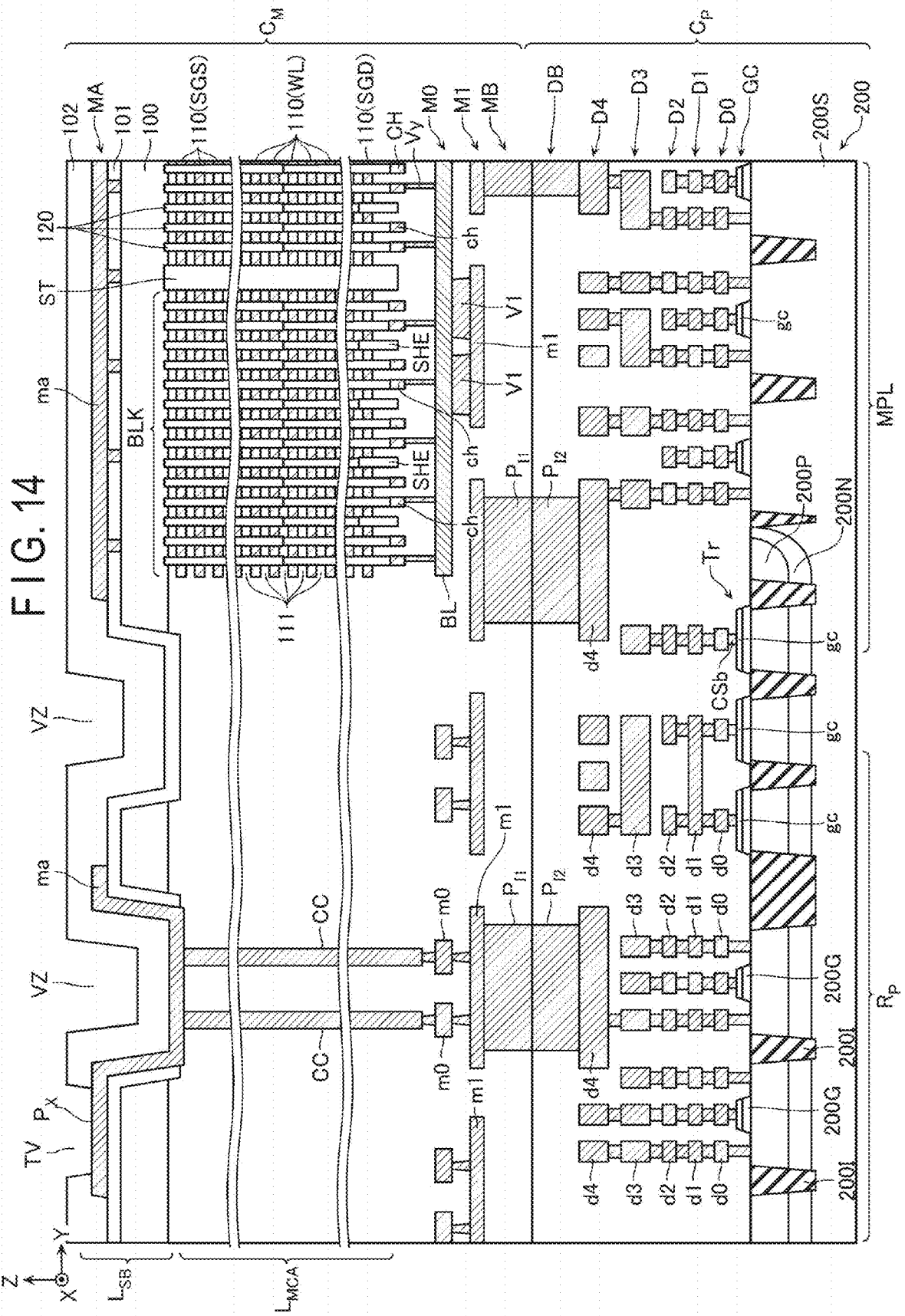
FIG. 14 is a cross sectional diagram schematically showing a configuration of a part of the memory die.
Figure 15:
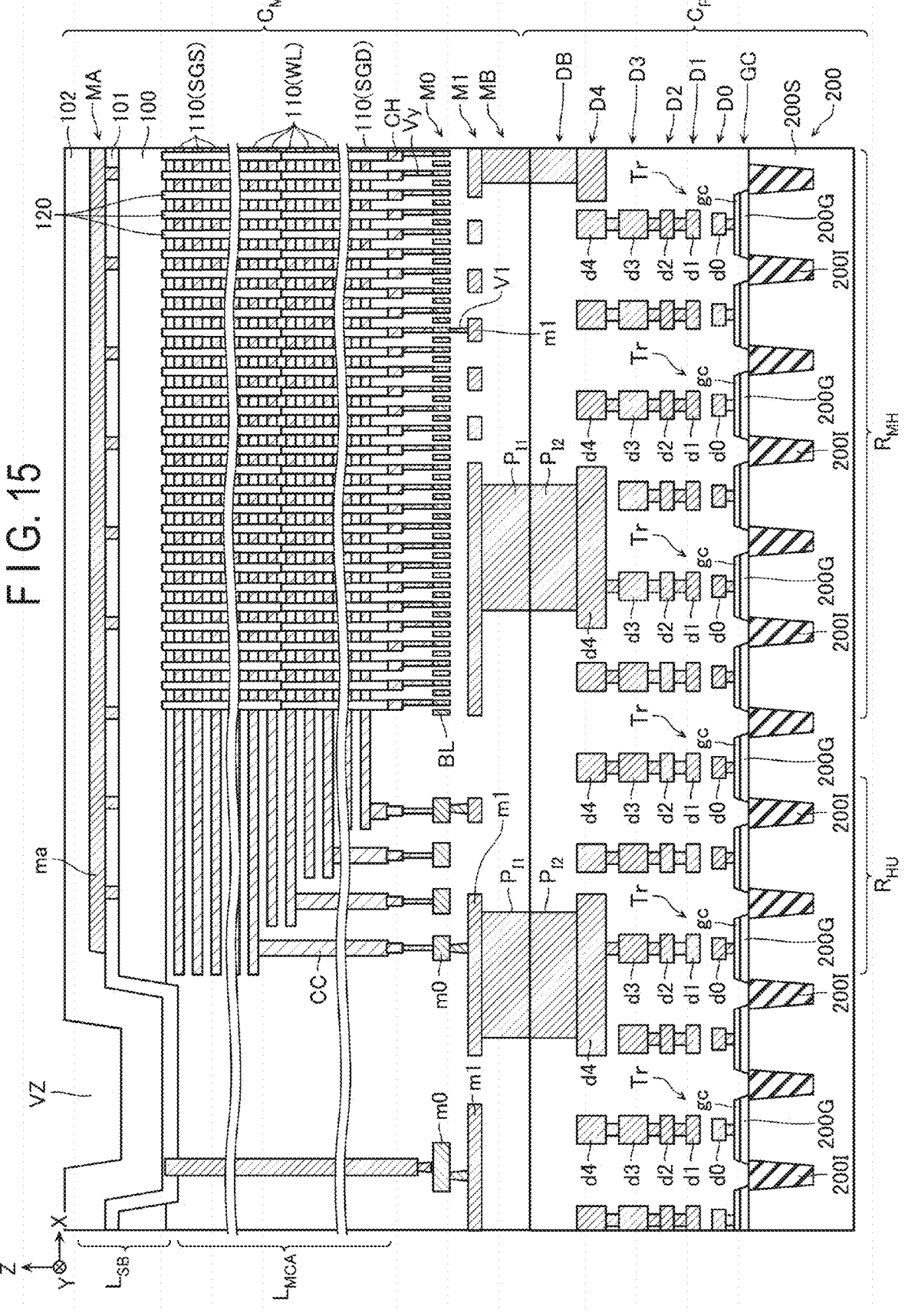
FIG. 15 is a cross sectional diagram schematically showing a configuration of another part of the memory die.

FIG. 13 is a bottom view diagram schematically showing a configuration example of the chip $C_M$. In FIG. 13, a part of a configuration of the pasted electrodes $P_{I1}$ and the like is omitted. FIGS. 14 and 15 are cross sectional diagrams schematically showing a configuration of various parts of the memory die MD. FIG. 16 is a bottom view diagram schematically showing a configuration of a part of the chip $C_M$. FIG. 17 is a cross sectional diagram schematically showing a configuration of a part of the chip $C_M$. FIG. 17 shows a YZ section. However, also in a case where a section along the central axis of a semiconductor layer 120 other than the YZ section (e.g., an XZ section) is observed, a structure similar to that in FIG. 17 can be observed.

[Structure of Chip $C_M$]

In the example in FIG. 13, the chip $C_M$ includes four memory planes MPL0, MPL1, MPL2, and MPL3 arranged in the X-direction. The four memory planes MPL0 to MPL3 each correspond to the memory cell array MCA (FIG. 5). These four memory planes MPL0 to MPL3 each include a plurality of memory blocks BLK arranged in the Y-direction. In the example in FIG. 13, the memory blocks BLK each include hook-up regions $R_{HU}$ provided on the opposite ends in the X-direction, and a memory hole region $R_{MH}$ between the hook-up regions $R_{HU}$. The chip $C_M$ includes a peripheral region $R_P$ provided on one side of the four memory planes MPL0 to MPL3 in the Y-direction.

It is noted that in the illustrated example, the hook-up regions $R_{HU}$ are provided at the opposite ends of a memory cell array region $R_{MCA}$ in the X-direction. However, such a configuration is only an example. A specific configuration can be appropriately adjusted. For example, the hook-up region $R_{HU}$ may be provided at one end in the X-direction instead of the opposite ends of the memory cell array region $R_{MCA}$ in the X-direction. The hook-up region $R_{HU}$ may be provided at the center position of the memory cell array region $R_{MCA}$ in the X-direction or a position adjacent to the center.

For example, as shown in FIG. 14, the chip $C_M$ includes: a base layer $L_{SB}$; a memory cell array layer $L_{MCA}$ provided under the base layer $L_{SB}$; and a plurality of wiring layers CH, M0, M1, and MB provided under the memory cell array layer $L_{MCA}$.

[Structure of Base Layer $L_{SB}$ of Chip $C_M$]

For example, as shown in FIG. 14, the base layer $L_{SB}$ includes: a conductive layer 100 provided on the upper surface of the memory cell array layer $L_{MCA}$; an insulating layer 101 provided on the upper surface of the conductive layer 100; a rear surface wiring layer MA provided on the upper surface of the insulating layer 101; and an insulating layer 102 provided on the upper surface of the rear surface wiring layer MA.

The conductive layer 100 may include, for example, a semiconductor layer of silicon (Si) or the like in which an n-type impurity, such as phosphorus (P), or a p-type impurity, such as boron (B), is injected, or contain a metal, such as tungsten (W), or a silicide, such as tungsten silicide (WSi).

The conductive layer 100 functions as part of the source line SL (FIG. 5). Four conductive layers 100 are provided to respectively support the four memory planes MPL0 to MPL3 (FIG. 13). Regions VZ that include no conductive layer 100 are provided at ends of the memory planes MPL0 to MPL3 in the X- and Y-directions.

The insulating layer 101 contains, for example, silicon oxide ($SiO_2$) or the like.

The rear surface wiring layer MA includes a plurality of wirings ma. These wirings ma may contain, for example, aluminum (Al) or the like.

Some of the wirings ma function as part of the source line SL (FIG. 5). Four wirings ma are provided to respectively support the four memory planes MPL0 to MPL3 (FIG. 13). The wirings ma are electrically connected to the conductive layer 100.

Some of the wirings ma function as the pad electrodes Px. The wirings ma are provided in the peripheral region $R_P$. In the regions VZ that include no conductive layer 100, the wirings ma are connected to via contact electrodes CC in the memory cell array layer $L_{MCA}$. Some of the wirings ma are exposed outside of the memory die MD via an opening TV provided in the insulating layer 102.

The insulating layer 102 is, for example, a passivation layer made of an insulating material, such as polyimide.

[Structure of Memory Cell Array Layer $L_{MCA}$ of Chip $C_M$ in Memory Hole Region $R_{MH}$]

As described with reference to FIG. 13, the multiple memory blocks BLK arranged in the Y-direction are provided in the memory cell array layer $L_{MCA}$. As shown in FIG. 14, an inter-block insulating layer ST, such as of silicon oxide ($SiO_2$), is provided between the two memory blocks BLK adjacent to each other in the Y-direction.

For example, as shown in FIG. 14, each memory block BLK includes a plurality of conductive layers 110 arranged in the Z-direction, and a plurality of semiconductor layers 120 extending in the Z-direction. As shown in FIG. 17, a gate insulator film 130 is provided between the conductive layers 110 and the semiconductor layers 120.

Each conductive layer 110 has a substantially planar shape extending in the X-direction. The conductive layer 110 may include laminate films of a barrier conductive film formed of a material such as titanium nitride (TiN), and a metal film formed of a material such as tungsten (W). The conductive layer 110 may include, for example, polysilicon or the like that contains impurities, such as phosphorus (P) or boron (B). Inter-layer insulating layers 111, formed of a material such as silicon oxide ($SiO_2$), are each provided between the conductive layers 110 arranged in the Z-direction.

Among the conductive layers 110, one or more conductive layers 110 positioned at the uppermost layers function as the gate electrodes of the source-side selection transistors STS (FIG. 5) and the source-side select gate lines SGS (see FIG. 14). These conductive layers 110 are electrically independent with respect to each memory block BLK.

The conductive layers 110 positioned lower than them function as the gate electrodes and the word lines WL of the memory cells MC (FIG. 5). These conductive layers 110 are electrically independent with respect to each memory block BLK.

One or more conductive layers 110 positioned lower than them function as the gate electrodes of the drain-side selection transistors STD and the drain-side select gate lines SGD. For example, as shown in FIG. 16, the width $Y_{SGD}$ of these conductive layers 110 in the Y-direction is smaller than the width $Y_{WL}$ of the conductive layers 110 functioning as the word lines WL in the Y-direction. Insulating layers SHE, formed of a material such as silicon oxide ($SiO_2$), are each provided between two conductive layers 110 adjacent to each other in the Y-direction.

For example, as shown in FIG. 16, the semiconductor layers 120 are arranged with a predetermined pattern in the X- and Y-directions. The semiconductor layers 120 each function as the memory cells MC included in one memory string MS (FIG. 12), and the channel regions of the selection transistors (STD and STS). The semiconductor layer 120 contains, for example, polysilicon (Si) or the like. The semiconductor layer 120 has a substantially cylindrical shape. An insulating layer 125, formed of a material such as silicon oxide, is provided at a central portion. The outer peripheral surfaces of the semiconductor layers 120 are surrounded by the conductive layers 110, and face these conductive layers 110.

Impurity regions, not shown, are provided at the upper ends of the semiconductor layers 120. The impurity regions are connected to the conductive layer 100 (see FIG. 14). The impurity regions contain an impurity that is, for example, an n-type impurity, such as phosphorus (P), or a p-type impurity, such as boron (B).

Impurity regions, not shown, are provided at the lower ends of the semiconductor layers 120. The impurity regions are connected to the bit lines BL through the via contact electrodes ch and via contact electrodes Vy. The impurity regions contain, for example, an n-type impurity, such as phosphorus (P).

For example, as shown in FIG. 16, the gate insulator film 130 has a substantially cylindrical shape covering the outer peripheral surface of the semiconductor layer 120. For example, as shown in FIG. 17, the gate insulator film 130 includes a tunnel insulator film 131, a charge accumulation film 132, and a block insulator film 133 that are stacked between the semiconductor layer 120 and the conductive layers 110. The tunnel insulator film 131 and the block insulator film 133 contain, for example, silicon oxide ($SiO_2$) or the like. The charge accumulation film 132 includes, for example, a film capable of accumulating charges, formed of a material such as silicon nitride (SiN). The tunnel insulator film 131, the charge accumulation film 132, and the block insulator film 133 have substantially cylindrical shapes, and extend in the Z-direction along the outer peripheral surface of the semiconductor layer 120 except the contact part between the semiconductor layer 120 and the conductive layer 100.

It is noted that FIG. 17 shows an example where the gate insulator film 130 includes the charge accumulation film 132, such as of silicon nitride. However, the gate insulator film 130 may include, for example, a floating gate of polysilicon or the like that contains an n-type or p-type impurity.

[Structure of Memory Cell Array Layer $L_{MCA}$ of Chip $C_M$ in Hook-Up Region $R_{HU}$]

As shown in FIG. 15, a plurality of via contact electrodes CC are provided in the hook-up region $R_{HU}$. These via contact electrodes CC extend in the Z-direction, and are connected, at their upper ends, to the conductive layers 110.

[Structure of Memory Cell Array Layer $L_{MCA}$ of Chip $C_M$ in Peripheral Region $R_P$]

For example, as shown in FIG. 14, in the peripheral region $R_P$, the via contact electrodes CC are provided corresponding to the pad electrodes Px. These via contact electrodes CC are connected, at their upper ends, to the pad electrodes Px.

[Structure of Wiring Layers CH, M0, M1, and MB of Chip $C_M$]

For example, the wirings included in the wiring layers CH, M0, M1, and MB are electrically connected to at least one of the configuration in the memory cell array layer $L_{MCA}$, and the configuration in the chip $C_P$.

The wiring layer CH includes a plurality of via contact electrodes ch as the plurality of wirings. These via contact electrodes ch may include, for example, laminate films that are a barrier conductive film, formed of a material such as titanium nitride (TiN), and a metal film, formed of a material such as tungsten (W). The via contact electrodes ch are provided corresponding to the respective semiconductor layers 120, and connected to the lower ends of the semiconductor layers 120.

The wiring layer M0 includes a plurality of wirings m0. These wirings m0 may include, for example, laminate films that are a barrier conductive film, formed of a material such as titanium nitride (TiN), and a metal film, such as of copper (Cu). It is noted that some of the wirings m0 function as the bit lines BL. For example, as shown in FIG. 16, the bit lines BL are arranged in the X-direction and extend in the Y-direction.

For example, as shown in FIG. 14, the wiring layer M1 includes a plurality of wirings ml. These wirings ml may include, for example, laminate films that are a barrier conductive film, formed of a material such as titanium nitride (TiN), and a metal film, formed of a material such as tungsten (W).

The wiring layer MB includes a plurality of pasted electrodes $P_{I1}$. These pasted electrodes $P_{I1}$ may include, for example, laminate films that are a barrier conductive film, formed of a material such as titanium nitride (TiN), and a metal film, formed of a material such as copper (Cu).

[Structure of Chip $C_P$]

For example, as shown in FIG. 14, the chip $C_P$ includes: a semiconductor substrate 200; an electrode layer GC provided on the semiconductor substrate 200; and wiring layers D0, D1, D2, D3, D4, and DB provided on the electrode layer GC.

[Structure of Semiconductor Substrate 200 of Chip $C_P$]

The semiconductor substrate 200 contains, for example, p-type silicon (Si) containing a p-type impurity, such as boron (B). On the front surface of the semiconductor substrate 200 there are provided, for example, an n-type well region 200N that contains an n-type impurity, such as phosphorus (P), a p-type well region 200P that contains a p-type impurity, such as boron (B), a semiconductor substrate region 200S provided with neither the n-type well region 200N nor the p-type well region 200P, and an insulating region 200I. The n-type well region 200N, the p-type well region 200P, and the semiconductor substrate region 200S function as part of a plurality of transistors Tr, a plurality of capacitors and the like that constitute the peripheral circuit PC.

[Structure of Electrode Layer GC of Chip $C_P$]

On the upper surface of the semiconductor substrate 200, the electrode layer GC is provided via an insulating layer 200G. The electrode layer GC includes a plurality of electrodes gc opposite to the front surface of the semiconductor substrate 200. Each region of the semiconductor substrate 200, and the electrodes gc included in the electrode layer GC are connected to via contact electrodes CSb.

The n-type well region 200N, the p-type well region 200P, and the semiconductor substrate region 200S of the semiconductor substrate 200 function as the channel regions of the transistors Tr, electrodes of capacitors on one side and the like that constitute the peripheral circuit PC.

The electrodes gc included in the electrode layer GC function as the gate electrodes of the transistors Tr, the electrodes of the capacitors on the other side and the like that constitute the peripheral circuit PC.

The via contact electrodes CSb extend in the Z-direction, and are connected, at their lower ends, to the semiconductor substrate 200 or the upper surfaces of the electrodes gc. Portions at which the via contact electrodes CSb are connected to the semiconductor substrate 200 are provided with impurity regions that contain an n-type impurity or a p-type impurity. The via contact electrodes CSb may include, for example, laminate films that are a barrier conductive film, formed of a material such as titanium nitride (TiN), and a metal film, formed of a material such as tungsten (W).

[Structure of Wiring Layers D0, D1, D2, D3, D4, and DB of Chip $C_P$]

For example, as shown in FIG. 14, the wirings included in D0, D1, D2, D3, D4, and DB are electrically connected to, for example, at least one of the configuration in the memory cell array layer $L_{MCA}$, and the configuration in the chip $C_P$.

The wiring layers D0, D1, and D2 include a plurality of wirings d0, d1, and d2, respectively. These wirings d0, d1, and d2 may include, for example, laminate films that are a barrier conductive film, formed of a material such as titanium nitride (TiN), and a metal film, formed of a material such as tungsten (W).

The wiring layers D3 and D4 include a plurality of wirings d3 and d4, respectively. These wirings d3 and d4 may include, for example, laminate films that are a barrier conductive film, formed of a material such as titanium nitride (TiN), and a metal film, formed of a material such as copper (Cu).

The wiring layer DB includes a plurality of pasted electrodes $P_{I2}$. These pasted electrodes $P_{I2}$ may include, for example, laminate films that are a barrier conductive film, formed of a material such as titanium nitride (TiN), and a metal film, formed of a material such as copper (Cu).

[Threshold Voltages of Memory Cell MC]

Figure 18:
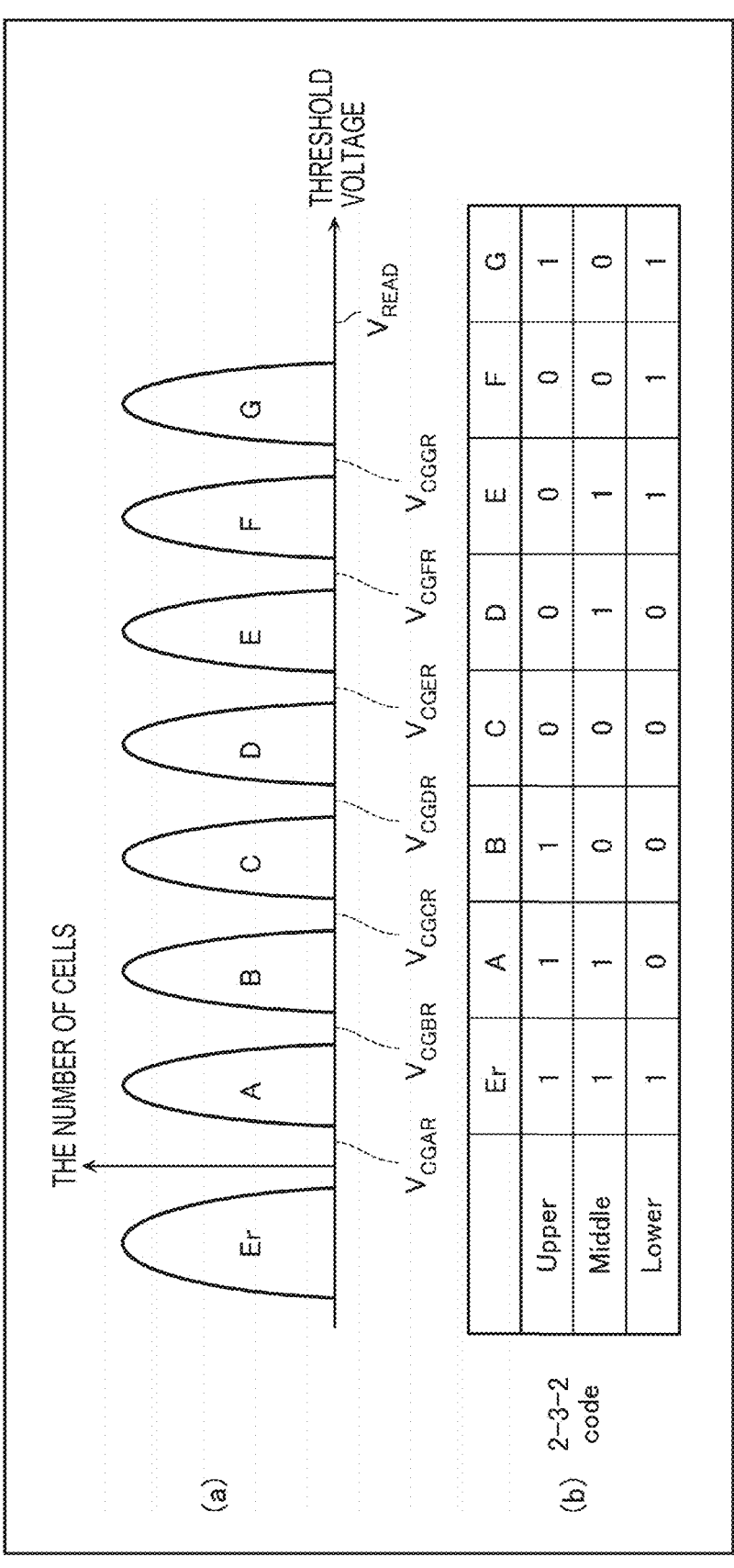
FIG. 18 is a diagram for explaining data stored in memory cells.

Next, with reference to FIG. 18, the threshold voltages of the memory cell MC are described. The part (a) of FIG. 18 is a schematic histogram for illustrating the threshold voltages of the memory cell MC. The abscissa axis indicates the voltage of the word line WL, and the ordinate axis indicates the number of memory cells MC. The part (b) of FIG. 18 shows an example of the threshold voltages of the memory cell MC, and data stored in the memory cell MC.

As described above, the memory cell array MCA includes the plurality of memory cells MC. When a write operation is performed in these memory cells MC, the threshold voltages of these memory cells MC are controlled among multiple states. The part (a) of FIG. 18 shows the distributions of threshold voltages of the memory cells MC controlled among eight states. For example, the threshold voltage of the memory cell MC controlled to an A state is higher than a read voltage $V_{CGAR}$ but is lower than a read voltage $V_{CGBR}$ in the part (a) of FIG. 18. The threshold voltages of all the memory cells MC are each lower than the read pass voltage $V_{READ}$ in the part (a) of FIG. 18).

In the present embodiment, by adjusting the memory cells MC among the eight states, three-bit data is stored in each memory cell MC.

For example, an Er state corresponds to the lowest threshold voltage (the threshold voltage of the memory cell MC in the erased state). Data "111" is allocated to, for example, the memory cell MC corresponding to the Er state.

An A state corresponds to a threshold voltage higher than the threshold voltage corresponding to the Er state. For example, Data "110" is allocated to the memory cell MC corresponding to the A state.

A B state corresponds to a threshold voltage higher than the threshold voltage corresponding to the A state. For example, Data "100" is allocated to the memory cell MC corresponding to the B state.

Hereinafter, the same applies. C to G states in the diagram correspond to threshold voltages higher than the respective threshold voltages corresponding to the B to F states. For example, Data "000", "010", "011", "001", and "101" are allocated to the memory cells MC corresponding to these distributions.

It is noted that in the case of allocation as exemplified in the part (b) of FIG. 18, data on the lower bit (Lower Page: $L_P$) can be determined by two read voltages $V_{CGAR}$ and $V_{CGER}$, data on the middle bit (Middle Page: MP) can be determined by three read voltages $V_{CGBR}$, $V_{CGDR}$, and $V_{CGFR}$, and data on the upper bit (Upper page: UP) can be determined by two read voltages $V_{CGCR}$ and $V_{CGGR}$. Such data allocation is sometimes called 2-3-2 code. A method of performing the read operation with respect to each of the lower page, the middle page, and the upper page is called page read.

It is noted that the number of bits of data to be stored in the memory cell MC, the number of states, allocation of data to each state and the like can be appropriately changed.

[Mode Types of Read Operation]

Next, the operational modes of the read operation, which is primarily performed by a control circuit (e.g., the sequencer SQC) in a specific implementation, according to the present embodiment are described. The operational modes of the read operation according to the present embodiment include a mode of a normal read operation, and a mode of cache read operation. The cache read operation further includes a first cache read operation, and a second cache read operation.

Figure 19:
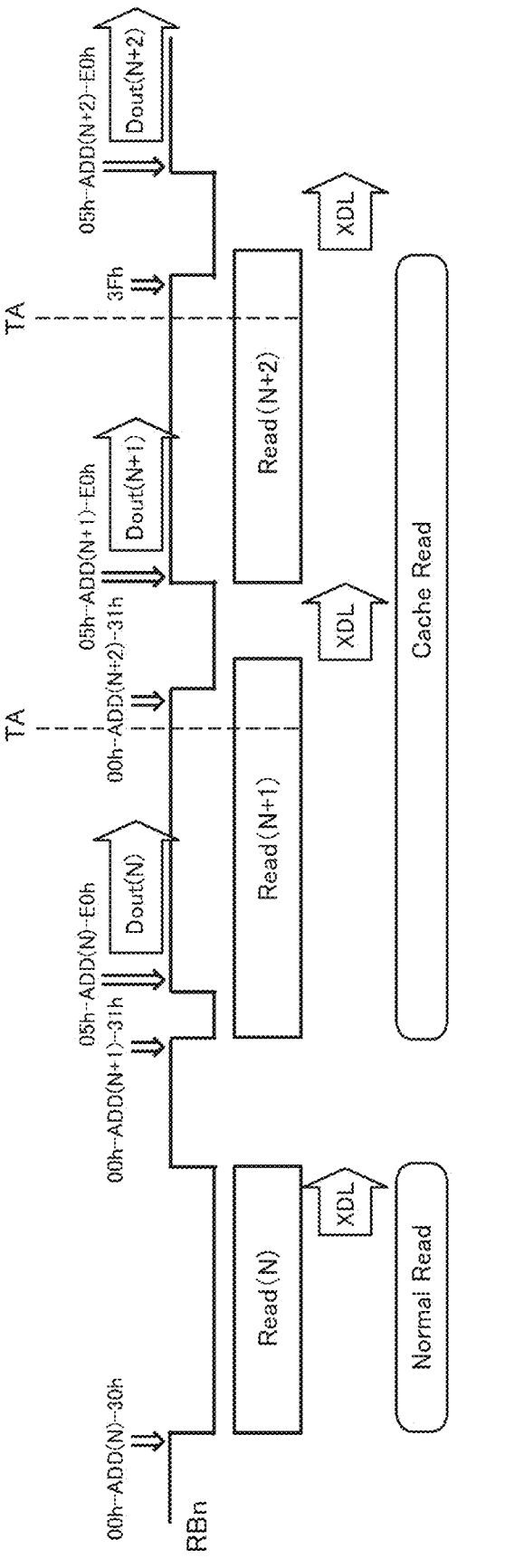
FIG. 19 is a timing chart for explaining a normal read operation and a first cache read operation.

FIG. 19 is a timing chart for the normal read operation and the first cache read operation. FIG. 20 is a timing chart for the normal read operation and the second cache read operation.

In FIGS. 19 and 20, "Read(N)" indicates a read operation for a page N, "Read(N+1)" indicates a read operation for a page N+1, and "Read(N+2)" indicates a read operation for a page N+2. It is noted that N is an integer of one or greater. "Dout(N)" indicates a data out operation for the page N, "Dout(N+1)" indicates a data out operation for the page N+1, and "Dout(N+2)" indicates a data out operation for the page N+2. In the command set, "ADD(N)" indicates that address data $D_{ADD}$ identifying the page N is included, "ADD(N+1)" indicates that address data $D_{ADD}$ identifying the page N+1 is included, and "ADD(N+2)" indicates that address data $D_{ADD}$ identifying the page N+2 is included.

[Mode of Normal Read Operation]

The mode of the normal read operation is an operational mode for executing the normal read operation. As shown in FIGS. 19 and 20, in the normal read operation, upon reception of a command set ("00h-ADD(N)-30h" in FIGS. 19 and 20) indicating the normal read operation from the controller die CD with the ready/busy signal RB being in the "H" state (ready state), the normal read operation for the page N(Read(N)) is started, and the ready/busy signal RB is controlled to the "L" state (busy state).

In the memory cell array MCA, the normal read operation (Read(N)) is performed, which stores read data (page N read data) in the latch circuit SDL in the sense amplifier module SAM. Then, the read data stored in the latch circuit SDL in the sense amplifier module SAM is transferred to the latch circuit XDL in the cache memory $C_M$ before the read operation is finished.

When the normal read operation (Read(N)) is finished in the memory cell array MCA, the ready/busy signal RB is controlled from the "L" state (busy state) to the "H" state (ready state), and a state capable of receiving a command set indicating normal read or cache read is achieved. During the normal read operation, the state of the ready/busy signal RB matches "True busy". "True busy" indicates that access to the sense amplifier module SAM is prohibited, or a state in which a write operation, a read operation, an erase operation or the like to the memory cell array MCA is under execution.

[Mode of Cache Read Operation]

The mode of the cache read operation is an operational mode for executing a cache read operation. The cache read operation includes: a first cache read operation in which a data transfer operation is executed after the cache read operation is finished; and a second cache read operation in which the data transfer operation is allowed to be executed during the cache read operation.

[First Cache Read Operation]

As shown in FIG. 19, upon reception of a command set indicating cache read ("00h-ADD(N+1)-31h" in FIG. 19; hereinafter may be referred to as a cache read command), with the ready/busy signal RB being controlled in the "H" state (ready state), during the first cache read operation, a read operation for the page N+1 (Read(N+1)) is started, and the ready/busy signal RB is temporarily controlled from the "H" state (ready state) to the "L" state (busy state), and then the "L" state (busy state) is immediately controlled to the "H" state (ready state). Thus, the ready/busy signal RB changes in an order of the "H" state, "L" state, and "H" state. Since the read data (page N read data) is stored in the latch circuit XDL, the data transfer operation to the latch circuit XDL is not ready, and the ready/busy signal RB changes in a short time period.

When the ready/busy signal RB is controlled to the "H" state (ready state), a command set indicating data out ("05h-ADD(N)-E0h" in FIG. 19; hereinafter may be referred to as a data out command) from the controller die CD is received. Upon reception of this command set, a data out operation Dout(N) for the read data (page N read data) stored in the latch circuit XDL is started. In the cache read operation, the read operation (Read(N+1)) and the data out operation Dout(N) are executed in parallel. When the data out operation Dout(N) is finished, a state of capable of receiving the next cache read command ("00h-ADD(N+2)-31h" in FIG. 19) is achieved.

In the case where the ready/busy signal RB is controlled in the "H" state (ready state) as described above, reception of a cache read command is allowed for the next read operation (Read(N+2)) even if the cache read operation (Read(N+1)) is not finished.

Upon reception of the cache read command ("00h-ADD(N+2)-31h" in FIG. 19) from the controller die CD, the ready/busy signal RB is controlled to the "L" state (busy state). Timing when the cache read command is received is after specific timing TA. When the read operation for the page N+1 (Read(N+1)) is finished, the page N+1 read data is transferred to the latch circuit XDL. After the page N+1 read data is transferred to the latch circuit XDL, a read operation for the page N+2 (Read(N+2)) is started, and the ready/busy signal RB is controlled to the "H" state (ready state).

Specifically, the read operation for the page N+1 (Read (N+1)) is performed, which causes read data (page N+1 read data) to be stored in the latch circuit SDL in the sense amplifier module SAM. Then, the read data stored in the latch circuit SDL in the sense amplifier module SAM is temporarily stored in the latch circuit ADL in the sense amplifier module SAM before the read operation is finished. The read data stored in the latch circuit ADL is transferred to the latch circuit XDL in the cache memory $C_M$ at timing when the read operation for the page N+1 is finished and the cache read command ("00h-ADD(N+2)-31h") is executed.

When the read operation for the page N+2 (Read(N+2)) is started, the ready/busy signal RB is returned to the "H" state (ready state). In the cache read operation, the state of the ready/busy signal RB does not match "True busy".

Subsequently, a data out command ("05h-ADD(N+1)-E0h" in FIG. 19) is received from the controller die CD, and then a data out operation Dout(N+1) for the read data (page N+1 read data) stored in the latch circuit XDL is performed. The read operation (Read(N+2)) and the data out operation Dout(N+1) are then executed in parallel. When the data out operation Dout(N+1) is finished, a state of capable of receiving a command ("3Fh" in FIG. 19) indicating termination of the cache read operation is achieved.

Upon reception of the command ("3Fh" in FIG. 19) indicating termination of the cache read from the controller die CD, the ready/busy signal RB is controlled to the "L" state (busy state). Timing when the command indicating termination of the cache read is received may be after the specific timing TA. After the read operation for the page N+2 (Read(N+2)) is finished, the page N+2 read data is transferred to the latch circuit XDL.

Subsequently, a data out command ("05h-ADD(N+2)-E0h" in FIG. 19) is received from the controller die CD, and then a data out operation Dout(N+2) for the read data (page N+2 read data) stored in the latch circuit XDL is performed.

[Second Cache Read Operation]

As shown in FIG. 20, the read operation for the page N+1 (Read(N+1)) and the data out operation (Dout(N)) for the page N in the second cache read operation are similar to the read operation for the page N+1 (Read(N+1)) and the data out operation (Dout(N)) for the page N in the first cache read operation. Consequently, redundant description is omitted.

Upon reception of the cache read command ("00h-ADD (N+2)-31h" in FIG. 20) from the controller die CD, the ready/busy signal RB is controlled to the "L" state (busy state). Timing when the cache read command is received is before the specific timing TA. Immediately after the read operation for the page N+1 (Read(N+1)) is finished, the read operation for the page N+2 (Read(N+2)) is started, and the ready/busy signal RB is controlled to the "H" state (ready state). In the second cache read operation, the timing when the cache read command is received is before the specific timing TA, and the page N+1 read data is transferred to the latch circuit XDL before the read operation for the page N+1 (Read(N+1)) is finished.

Specifically, the read operation for the page N+1 (Read (N+1)) is performed, which causes read data (page N+1 read data) to be stored in the latch circuit SDL in the sense amplifier module SAM. Then, the read data stored in the latch circuit SDL in the sense amplifier module SAM is transferred to the latch circuit XDL in the cache memory $C_M$ before the read operation is finished. Thus, in the second cache read operation, the read data stored in the latch circuit SDL is transferred to the latch circuit XDL in the cache memory $C_M$ not through (i.e., without being stored in) the latch circuit ADL.

When the read operation for the page N+2 (Read(N+2)) is started, the ready/busy signal RB is returned to the "H" state (ready state). As shown in FIG. 20, the read operation for the page N+1 (Read(N+1)), and the read operation for the page N+2 (Read(N+2)) are executed sequentially with no interval.

Subsequently, a data out command ("05h-ADD(N+1)-E0h" in FIG. 20) is received from the controller die CD, and then a data out operation Dout(N+1) for the read data (page N+1 read data) stored in the latch circuit XDL is performed. The read operation (Read(N+2)) and the data out operation Dout(N+1) are then executed in parallel. When the data out operation Dout(N+1) is finished, a state of capable of receiving the next command ("3Fh" in FIG. 20) indicating termination of the cache read is achieved.

Upon reception of the command ("3Fh" in FIG. 20) indicating termination of the cache read from the controller die CD, the ready/busy signal RB is controlled to the "L" state (busy state). Timing when the command indicating termination of the cache read is received is before the specific timing TA. Before the read operation for the page N+2 is finished, the page N+2 read data is transferred to the latch circuit XDL.

Subsequently, a data out command ("05h-ADD(N+2)-E0h" in FIG. 20) is received from the controller die CD, and then a data out operation Dout(N+2) for the read data (page N+2 read data) stored in the latch circuit XDL is performed.

As described above, improvement in data transfer rate at the interface between the controller die CD and the memory die MD is discussed, and the time period of the data out operation Dout is being reduced. Consequently, the possibility that the cache read command and the command indicating termination of the cache read operation are received before the specific timing TA becomes high. In this case, as shown in FIG. 20, before the cache read operation is finished, the read data is transferred from the latch circuit SDL to the latch circuit XDL. As a result, the total time period of the consecutively executed cache read operations can be reduced.

[Command Set for Read Operation]

Next, an operation performed when a command set for a read operation is received is described. FIG. 21 is a timing chart for an operation when a command set CS is received.

It is noted that in the following description, eight-bit data input into the eight data signal input/output terminals DQ0 to DQ7 may be represented using two hexadecimal digits. For example, when "0, 0, 0, 0, 0, 0, 0, 0" is input into the eight data signal input/output terminals DQ0 to DQ7, this data may be represented as data 00h or the like. When "1, 1, 1, 1, 1, 1, 1, 1" is input, this data may be represented as data FFh or the like.

FIG. 21 exemplifies the command set CS input into the memory die MD for the cache read operation. This command set CS is the cache read command described above. The command set CS includes data 00h, A101, A102, A103, A104, A105, and 31h. The data A101, A102, A103, A104, A105 among the data included in the command set CS may be referred to as data $D_{ADD}$. The data $D_{ADD}$ is data that is to be input into the address register ADR.

At time t1, the controller die CD inputs the data 00h as the command data $D_{CMD}$ (FIG. 4) into the memory die MD.

That is, the voltages of the data signal input/output terminals DQ0 to DQ7 are set to "H" or "L" depending on the respective bits of the data 00h, and "H" is input into the external control terminal CLE, and "L" is input into the external control terminal ALE. In this state, the external control terminal/WE is raised from "L" to "H". The data 00h is a command input at the start of the read operation.

At time t2, the controller die CD inputs data A101 as the address data $D_{ADD}$ (FIG. 4) into the memory die MD. That is, the voltages of the data signal input/output terminals DQ0 to DQ7 are set to "H" or "L" depending on the respective bits of the data A101, and "L" is input into the external control terminal CLE, and "H" is input into the external control terminal ALE. In this state, the external control terminal/WE is raised from "L" to "H". The data A101 is part of the column address CA.

At time t3, the controller die CD inputs data A102 as the address data $D_{ADD}$ (FIG. 4) into the memory die MD. The data A102 is part of the column address CA.

At time t4, the controller die CD inputs data A103 as the address data $D_{ADD}$ (FIG. 4) into the memory die MD. The data A103 is part of the row address RA. The data A103 includes, for example, a block address, and a page address. The block address is data identifying a memory block BLK. The page address is data identifying a string unit SU and a word line WL.

At time t5, the controller die CD inputs data A104 as the address data $D_{ADD}$ (FIG. 4) into the memory die MD. The data A104 is part of the row address RA. The data A104 includes, for example, a block address, and a page address.

At time t6, the controller die CD inputs data A105 as the address data $D_{ADD}$ (FIG. 4) into the memory die MD. The data A105 includes a chip address, and a plane address. The chip address is data identifying one memory die MD from among the memory dies MD controlled by the controller die CD. The plane address is data identifying one memory plane from among the memory planes MPL0 to MPL3 controlled by the controller die CD.

At time t7, the controller die CD inputs data 31h as the command data $D_{CMD}$ (FIG. 4) into the memory die MD. The data 31h is a command indicating that input of the command set CS pertaining to the read operation is finished.

At time t8, the voltage of the terminal RBn (ready/busy signal RB) transitions from the "H" state to the "L" state, and access to the memory die MD is prohibited. In the memory die MD, the read operation is executed.

It is noted that in the example in FIG. 21, the data $D_{ADD}$ in the command set CS is assumed as the data A101, A102, A103, A104, and A105. However, it does not mean that the data $D_{ADD}$ is the same address. A different address may be adopted.

[Read Voltage Supply Operation]

Next, a read voltage supply operation in the normal read operation and the cache read operation is described.

FIG. 22 is a cross sectional diagram of a part of the memory die to explain the read voltage supply operation. It is noted that the read voltage supply operation described below is common between both the cases of normal read and cache read operations.

It is noted that in the following description, a word line WL to be operated is called a selected word line $WL_S$, and the other word lines WL are called unselected word lines $WL_U$ in some cases. In the following description, an example is described where the read voltage supply operation is executed for a memory cell connected to the selected word line $WL_S$ (hereinafter sometimes called "selected memory cell MC") among the memory cells MC included in a string unit SU to be operated. In the following description, such a configuration including multiple selected memory cells MC may be referred to as a selected page PG.

In the read voltage supply operation, for example, the voltage $V_{DD}$ is supplied to the bit line BL. For example, "H" is latched in the latch circuit SDL in FIG. 11, and the states of the signal lines STB, XXL, BLC, BLS, HLL, and BLX are set to "L, L, H, H, H, H". Accordingly, the voltage $V_{DD}$ is supplied to the bit line BL and the sense node SEN. The voltage $V_{SRC}$ is supplied to the source line SL. The voltage $V_{SRC}$ may be higher than the ground voltage $V_{SS}$, or equal to the ground voltage $V_{SS}$. The voltage $V_{DD}$ is higher than the voltage $V_{SRC}$.

In the read voltage supply operation, the voltage $V_{SG}$ is supplied to the drain-side select gate line SGD. The voltage $V_{SG}$ is higher than the voltage $V_{DD}$. The voltage difference between the voltage $V_{SG}$ and the voltage $V_{DD}$ is higher than the threshold voltage of the drain-side selection transistor STD. Consequently, a channel of electrons is formed in the channel region of the drain-side selection transistor STD, and the voltage $V_{DD}$ is transferred.

In the read voltage supply operation, the voltage $V_{SG}$ is supplied to the source-side select gate lines SGS and SGSb. The voltage $V_{SG}$ is higher than the voltage $V_{SRC}$. The voltage difference between the voltage $V_{SG}$ and the voltage $V_{SRC}$ is higher than the threshold voltages of the source-side selection transistors STS and STSb. Consequently, a channel of electrons is formed in the channel region of the source-side selection transistors STS and STSb, and the voltage $V_{SRC}$ is transferred.

In the read voltage supply operation, the read pass voltage $V_{READ}$ is supplied to the unselected word lines $WL_U$. The read pass voltage $V_{READ}$ is higher than the voltages $V_{DD}$ and $V_{SRC}$. The voltage differences between the read pass voltage $V_{READ}$, and the voltages $V_{DD}$ and $V_{SRC}$ are higher than the threshold voltage when the memory cell MC is caused to function as an NMOS transistor, irrespective of data stored in the memory cell MC. Consequently, a channel of electrons is formed in the channel region of the unselected memory cell MC, and the voltages $V_{DD}$ and $V_{SRC}$ are transferred to the selected memory cell MC.

In the read voltage supply operation, the read voltage $V_{CGR}$ is supplied to the selected word line $WL_S$. The read voltage $V_{CGR}$ is lower than the read pass voltage $V_{READ}$. The read voltage $V_{CGR}$ is any of the read voltages $V_{CGAR}$ to $V_{CGGR}$ described with reference to FIG. 18. The voltage difference between the read voltage $V_{CGR}$ and the voltage $V_{SRC}$ is higher than the threshold voltage of some memory cells MC where data is stored. Consequently, these memory cells MC where the data is stored is in the ON state. Consequently, current flows through the bit line BL connected to such memory cells MC. On the other hand, the voltage difference between the read voltage $V_{CGR}$ and the voltage $V_{SRC}$ is lower than the threshold voltage of some memory cells MC where data is stored. Consequently, these memory cells MC where the data is stored is in the OFF state. Consequently, no current flows through the bit line BL connected to such memory cells MC.

In the read voltage supply operation, it is determined whether current flows through the bit line BL or not by the sense amplifier SA (FIG. 11), thus detecting the ON state/OFF state of the memory cell MC. Hereinafter, such an operation is called "sense operation". In the sense operation, for example, in a state where the voltage $V_{DD}$ is supplied to the bit line BL, the states of the signal lines STB, XXL, BLC, BLS, HLL, and BLX are "L, H, H, H, L, L", respectively. Accordingly, the sense node SEN of the sense amplifier SA (FIG. 11) is made conductive to the bit line BL. After a lapse of a prescribed period, the states of the signal lines STB, XXL, BLC, BLS, HLL, and BLX are "L, L, H, H, L, L", respectively. Accordingly, the sense node SEN of the sense amplifier SA (FIG. 11) is electrically detached from the bit line BL. After execution of the sense operation, the state of the signal line STB is temporarily set to "H". Accordingly, the sense transistor 41 is made conductive to the wiring LBUS (FIG. 11), and charges in the wiring LBUS are discharged or maintained. Any of the latch circuits (e.g., the latch circuit SDL) in the sense amplifier unit SAU is conductive to the wiring LBUS, and the data on the wiring LBUS is latched by this latch circuit.

In the read voltage supply operation, an operation process, such as AND, or OR, is executed for the data indicating the state of the memory cell MC, as required, thus calculating the data stored in the memory cell MC. The data is transferred to the latch circuit XDL (FIG. 10) in the cache memory CM via the wiring LBUS (FIG. 11), the switch transistor DSW, and the wiring DBUS.

[Cache Read Operation]

Next, the cache read operation according to the first embodiment is described.

FIG. 23 is a waveform diagram for the first cache read operation. FIG. 24 is a waveform diagram for the second cache read operation.

It is noted that in the following description, an example is described where data is allocated to each memory cell MC according to a method as described with reference to the part (b) of FIG. 18, and data on the lower page (LP) and the middle page (MP) is read.

In FIGS. 23 and 24, "tR" means a period during which the read operation is executed. "R" means a period during which the voltage of the selected word line $WL_S$ is set to a first read voltage. "RWL" means a period during which the voltage of the selected word line $WL_S$ is set to a second (or third) read voltage. "RR" means a period during which the recovery operation in the read operation is executed. Typically, the period R is a period longer than the period RWL, and the period RR is a period shorter than the period R and the period RWL.

[First Cache Read Operation]

The first cache read operation is described with reference to FIG. 23.

It is noted that in FIG. 23, time t101 to time t105, and time t111 to time t114 indicate the period R. Time t105 to time t107A, time t114 to time t116A, and time t116A to time t118 indicate the period RWL. Time t107A to time t109A, and time t118 to time t120 indicate the period RR.

In FIG. 23, a plurality of operations executed from time t103 to time t107A and from time t112 to time t118 correspond to the read voltage supply operation described with reference to FIG. 22.

When the cache read operation is started, the controller die CD outputs a command set CS(1) indicating the cache read operation, to the memory die MD via the data signal input/output terminals DQ0 to DQ7. As shown in FIG. 20, the command set CS(1) includes data 00h, ADD, and 31h. To distinguish the command sets CS from each other, the command sets CS are respectively assigned numbers.

When the command set CS(1) is input at time t101, the data 00h and 31h in the command set CS(1) are held as the command data $D_{CMD}$ in the command register CMR, and the data $D_{ADD}$ in the command set CS(1) is held as the address data $D_{ADD}$ in the address register ADR.

The sequencer SQC controls the terminal RBn (ready/busy signal RB) from the "H" state to the "L" state in response to input of the command set CS(1). Accordingly, access to the memory die MD is prohibited. In the memory die MD, the read operation is executed. At the time when the read operation is started, "True busy" transitions from the "H" state to the "L" state.

At time t102, the sequencer SQC controls the terminal RBn from the "L" state to the "H" state.

At time t102, the voltages of the unselected word lines $WL_U$ included in the selected memory block BLK are charged from the ground voltage $V_{SS}$ to the read pass voltage $V_{READ}$. The voltage $V_{SG}$ is supplied to the drain-side select gate line SGD.

At time t102, the controller die CD outputs the data out command to the memory die MD via the data signal input/output terminals DQ0 to DQ7. As shown in FIG. 23, the data out command includes data 05h, ADD, and E0h.

The data 05h is the command data $D_{CMD}$ input into the command register CMR. The data 05h is input at the start of data out. The data $D_{ADD}$ is the same data as the data $D_{ADD}$ in the cache read command. The data E0h is the command data $D_{CMD}$ input into the command register CMR. The data E0h is data indicating that the input of the data out command is finished.

At time t103, the read voltage $V_{CGER}$ is supplied to the selected word line $WL_S$ included in the selected memory block BLK. Accordingly, the memory cells MC corresponding to the Er state to the D state in the part (a) of FIG. 18 are placed in the ON state, and the memory cells MC corresponding to the E state to the G state are placed in the OFF state.

Although not shown in FIG. 23, at time t103, the voltages of the bit lines BL included in the selected memory block BLK are charged from the ground voltage $V_{SS}$ to the voltage $V_{DD}$. At time t103, the voltage $V_{SRC}$ is supplied to the source line SL included in the selected memory block BLK.

At time t104, the sense operation ("sense" in FIG. 23) is executed. Accordingly, the sense amplifier SA obtains read data (E) corresponding to the read voltage $V_{CGER}$. The read data (E) is held in the latch circuit SDL.

At time t105, the read voltage $V_{CGAR}$ is supplied to the selected word line $WL_S$. Accordingly, the memory cell MC corresponding to the Er state in the part (a) of FIG. 18 is placed in the ON state, and the memory cells MC corresponding to the A state to the G state are placed in the OFF state.

At time t106A, the sense operation is executed. According to the sense operation, the sense amplifier SA obtains read data (A) corresponding to the read voltage $V_{CGAR}$. The sense amplifier SA performs a predetermined logical operation for the read data (E) and the read data (A). The latch circuit SDL holds the result of the logical operation (E&A). The result of the logical operation (E&A) indicates read data [LP] for the lower bit (lower page).

From time t107A to time t109A, the recovery operation is performed. Time t107A corresponds to the specific timing TA described with reference to FIG. 19. Consequently, if the cache read command (00h-ADD-31h) is not input by time t107A, transfer of the read data (E&A) from the latch circuit SDL to the latch circuit XDL is not executed at time t107A. In the recovery operation, the charge pump circuit 32 (FIG. 7) is reset, voltage generation to the selected word line $WL_S$ and the unselected word lines $WL_U$ is stopped, and the selected word line $WL_S$ and the unselected word lines $WL_U$ are converged to, for example, the ground voltage $V_{SS}$.

In FIG. 23, at time t108A after time t107A, the cache read command (00h-ADD-31h) is input as a command set CS(2). The read data (E&A) stored in the latch circuit SDL is transferred to the latch circuit ADL at time t109A. In FIG. 23, transfer of the read data (E&A) from the latch circuit SDL to the latch circuit ADL is represented as "SDL2ADL" (i.e., meaning data transfer from SDL to ADL). The read data (E&A) stored in the latch circuit ADL is transferred to the latch circuit XDL at time t111. In FIG. 23, transfer of the read data (E&A) from the latch circuit ADL to the latch circuit XDL is represented as "ADL2XDL" (i.e., meaning data transfer from ADL to XDL). It is noted that a power source required for data transfer to the latch circuit XDL is prepared at, for example, time t109A.

The sequencer SQC controls the terminal RBn (ready/busy signal RB) from the "H" state to the "L" state in response to input of the command set CS(2) at time t108A. Accordingly, access to the memory die MD is prohibited. At time t108A, the voltages of the unselected word lines $WL_U$ included in the selected memory block BLK are each discharged from the read pass voltage $V_{READ}$ to the ground voltage $V_{SS}$. After the read operation is finished, the ground voltage $V_{SS}$ is supplied to the selected word line $WL_S$ included in the selected memory block BLK, and the read operation is executed in the memory die MD.

At time t111, the sequencer SQC controls the terminal RBn from the "L" state to the "H" state. At time t111, the voltages of the unselected word lines $WL_U$ included in the selected memory block BLK are charged from the ground voltage $V_{SS}$ to the read pass voltage $V_{READ}$. The voltage $V_{SG}$ is supplied to the drain-side select gate line SGD.

At time t111, the memory die MD receives a data out command (05h-ADD-E0h) from the controller die CD, via the data signal input/output terminals DQ0 to DQ7.

At time t112, the read voltage $V_{CGER}$ is supplied to the selected word line $WL_S$ included in the selected memory block BLK. Accordingly, the memory cells MC corresponding to the Er state to the E state in the part (a) of FIG. 18 are placed in the ON state, and the memory cells MC corresponding to the F state and the G state are placed in the OFF state.

Although not shown in FIG. 23, at time t112, the voltages of the bit lines BL included in the selected memory block BLK are charged from the ground voltage $V_{SS}$ to the voltage $V_{DD}$. At time t112, the voltage $V_{SRC}$ is supplied to the source line SL included in the selected memory block BLK.

At time t113, the sense operation is executed. According to the sense operation, the sense amplifier SA obtains read data (F) corresponding to the read voltage $V_{CGFR}$. The read data (F) is held in the latch circuit SDL.

At time t114, the read voltage $V_{CGDR}$ is supplied to the selected word line $WL_S$. Accordingly, the memory cells MC corresponding to the Er state to the C state in the part (a) of FIG. 18 are placed in the ON state, and the memory cells MC corresponding to the D state to the G state are placed in the OFF state.

At time t115, the sense operation is executed. According to the sense operation, the sense amplifier SA obtains read data (D) corresponding to the read voltage $V_{CGDR}$. The sense amplifier SA performs a predetermined logical operation for the read data (F) and the read data (D). The latch circuit SDL holds the result of the logical operation (F&D).

At time t116A, the read voltage $V_{CGBR}$ is supplied to the selected word line $WL_S$. Accordingly, the memory cells MC corresponding to the Er state and the A state in the part (a) of FIG. 18 are placed in the ON state, and the memory cells MC corresponding to the B state to the G state are placed in the OFF state.

At time t117, the sense operation is executed. According to the sense operation, the sense amplifier SA obtains read data (B) corresponding to the read voltage $V_{CGBR}$. The sense amplifier SA performs a predetermined logical operation for the read data (F), the read data (D), and the read data (B). The latch circuit SDL holds the result of the logical operation (F, D&B). The result of the logical operation (F, D&B) indicates read data [MP] for the middle bit (middle page).

From time t118 to time t120, the recovery operation is performed. Time t118 corresponds to the specific timing TA described with reference to FIG. 19. Consequently, if a cache read command CS(3) is not input by time t118, transfer of the read data (F, D&B) from the latch circuit SDL to the latch circuit XDL is not executed at time t120. In the recovery operation, the charge pump circuit 32 (FIG. 7) is reset, voltage output to the selected word lines $WL_S$ and the unselected word lines $WL_U$ is stopped, and the selected word lines $WL_S$ and the unselected word lines $WL_U$ are converged to, for example, the ground voltage $V_{SS}$.

In FIG. 23, at time t119A after time t118, the cache read command (00h-ADD-31h) is input. The read data (F, D&B) stored in the latch circuit SDL is transferred to the latch circuit ADL at time t120. The read data (F, D&B) stored in the latch circuit ADL is transferred to the latch circuit XDL at time t121. Subsequently, although not shown in FIG. 23, the read data (F, D&B) stored in the latch circuit XDL is output to the controller die CD through the data out operation.

[Second Cache Read operation]

The second cache read operation is described with reference to FIG. 24.

In FIG. 24, operations from time t103 to time t107A and from time t112 to time t118 correspond to the read voltage supply operation described with reference to FIG. 22.

The operations from time t101 to time t105, from time t111 to time t115, and from time t116A to time t118 in FIG. 24 are similar to those described with reference to FIG. 23. Consequently, redundant description is omitted.

In FIG. 24, at time t106B before time t107A, the cache read command CS(2) is input. The read data (E&A) stored in the latch circuit SDL is transferred to the latch circuit XDL at time t111. In FIG. 24, transfer of the read data (E&A) from the latch circuit SDL to the latch circuit XDL is represented as "SDL2XDL" (i.e., meaning data transfer from SDL to XDL). It is noted that a power source required for data transfer to the latch circuit XDL is prepared at, for example, time t101.

From time t107A to time t111, the recovery operation is performed. In the recovery operation, the charge pump circuit 32 (FIG. 7) is not reset, voltage generation to the selected word line $WL_S$ and the unselected word lines $WL_U$ is maintained. At time t107A, for example, voltage supply from the charge pump circuit 32 is stopped by a switch circuit between the charge pump circuit 32 and the wiring CG, and the selected word line $WL_S$ and the unselected word lines $WL_U$ are converged to, for example, the ground voltage $V_{SS}$ using an equalizer circuit, not shown, positioned downstream of the switch circuit.

At time t111, the equalizer circuit is disconnected, the switch circuit is connected, and voltage supply from the charge pump circuit 32 (FIG. 7) to the selected word line $WL_S$ and the unselected word lines $WL_U$ is restarted. In FIG. 24, in the period of the recovery operation, the charge pump circuit 32 is not reset.

The operations from time t111 to time t115 in FIG. 24 are similar to those described with reference to FIG. 23. Consequently, redundant description is omitted.

In FIG. 24, at time t116B before time t118, the cache read command CS(3) is input. The read data (F&D&B) stored in the latch circuit SDL is transferred to the latch circuit XDL at time t120. In FIG. 24, transfer of the read data (F&D&B) from the latch circuit SDL to the latch circuit XDL is represented as "SDL2XDL". Subsequently, although not shown in FIG. 24, the read data (F&D&B) stored in the latch circuit XDL is output to the controller die CD, based on the data out operation.

[Data Transfer Operation]

Next, referring to FIG. 25, the data transfer operation is described.

FIG. 25 is a flowchart for the data transfer operation. The operations in steps S101 to S106 in FIG. 25 correspond to the operations from time t107A to time t111 and from time t118 to time t121 in FIG. 23, and the operations from time t106B to time t111 and from time t116B to time t121 in FIG. 24. It is noted that in FIG. 25, the operations in steps S102 to S106 correspond to the data transfer operation.

For example, the read operation corresponding to the cache read command CS(1) is assumed as the read operation for the page N, and the read operation corresponding to the cache read command CS(2) is assumed as the read operation for the page N+1.

When the memory die MD receives the cache read command for the page N+1 in step S101 (see time t108A in FIG. 23, and time t106B in FIG. 24), the memory die MD determines whether or not the read operation for the page N is under execution in step S102. If the read operation for the page N is under execution (YES in step S102), in step S103 the memory die MD determines whether or not the time when the cache read command for the page N+1 is input is before the recovery operation for the read operation for the page N is started (before time t107A in FIGS. 23 and 24).

If the read operation for the page N is not under execution (NO in step S102) or if the time when the cache read command for the page N+1 is input is not before the recovery operation for the read operation for the page N is started (NO in step S103), the memory die MD transfers the read data stored in the latch circuit SDL to the latch circuit ADL in step S104 (step S104). The operation corresponds to the operation from time t107A to time t109A in FIG. 23. The operation corresponds to the operation from time t109A to time t110A in FIG. 23. In step S105, the read data stored in the latch circuit ADL is transferred to the latch circuit XDL. The operation corresponds to the operation from time t109A to time t111 in FIG. 23.

If the time when the cache read command for the page N+1 is input is before the recovery operation in the read operation for the page N is started (YES in step S103), the read data stored in the latch circuit SDL is transferred to the latch circuit XDL in step S106. The operation corresponds to the operation from time t107A to time t111 in FIG. 24.

According to such process steps, in the case where the cache read operations are consecutively executed, one of the first cache read operation and the second cache read operation is automatically performed depending on the timing when the cache read command for the latter is input. Consequently, depending on the timing when the cache read command for the latter is input, the data transfer operation is optimized. As a result, the interval between the consecutively executed read operations can be reduced.

In accordance with improvement in data transfer rate at the interface between the controller die CD and the memory die MD, the time period of the data out operation Dout is being reduced. As a result, a case can occur where even though the data out operation Dout has been already finished, the data transfer operation does not start until the read operation is finished. The configuration according to the first embodiment is effective in solving the problem as described above. Furthermore, the configuration according to the first embodiment can be achieved without using a special command set for optimizing the data transfer operation.

Figure 26:
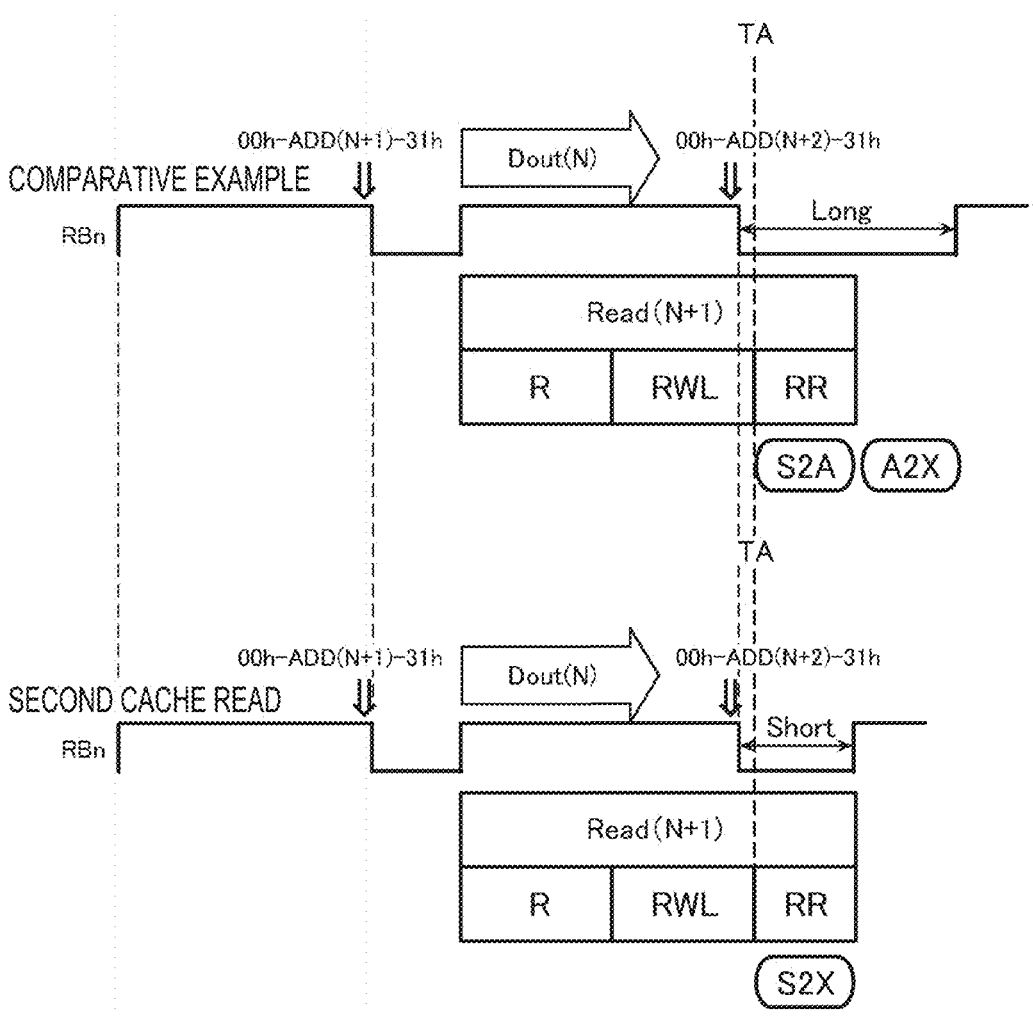
FIG. 26 is a timing chart for a cache read operation according to a comparative example and the second cache read operation according to the first embodiment.

For example, a comparison between a cache read operation according to a comparative example, and the cache read operation according to the first embodiment is described. FIG. 26 is a timing chart for a cache read operation according to the comparative example and the second cache read operation according to the first embodiment. FIG. 27 is a timing chart for the cache read operation according to the comparative example and the first cache read operation according to the first embodiment.

As shown in FIGS. 26 and 27, when the cache read command is input, the ready/busy signal RB is controlled from the "H" state to the "L" state. When the read data is transferred to the latch circuit XDL, the ready/busy signal RB is controlled from the "L" state to the "H" state.

In FIG. 26, the upper diagram shows a case where the cache read operations according to the comparative example are consecutively executed, and the lower diagram shows a case where the second cache read operations according to the first embodiment are consecutively executed.

As shown in the upper diagram of FIG. 26, in the cache read operation according to the comparative example, even if timing when the cache read command (00h-ADD(N+2)-31h) is input is before the specific timing TA, a data transfer operation from the latch circuit ADL to the latch circuit XDL is executed after the cache read operation (Read(N+1)) is finished. In this case, after the data transfer operation from the latch circuit ADL to the latch circuit XDL is executed, the next cache read operation is started. On the other hand, as shown in the lower diagram of FIG. 26, in the second cache read operation according to the first embodiment, if timing when the cache read command (00h-ADD(N+2)-31h) is input is before the specific timing TA, the data transfer operation from the latch circuit SDL to the latch circuit XDL is executed before the cache read operation (Read(N+1)) is finished. In this case, immediately after the cache read operation is finished, the next cache read operation is started.

As shown in FIG. 26, the time period from the time when the cache read command (00h-ADD(N+2)-31h) is input to the time when the data transfer operation to the latch circuit XDL is finished (the period with the ready/busy signal RB in the "L" state) is shorter in the second cache read operation according to the first embodiment (the lower diagram of FIG. 26) than in the cache read operation according to the comparative example (the upper diagram of FIG. 26).

In FIG. 27, the upper diagram shows a case where the cache read operations according to the comparative example are consecutively executed, and the lower diagram shows a case where the first cache read operations according to the first embodiment are consecutively executed.

As shown in the upper diagram of FIG. 27, in the cache read operation according to the comparative example, if timing when the cache read command (00h-ADD(N+2)-31h) is input is after the specific timing TA, a data transfer operation from the latch circuit ADL to the latch circuit XDL is executed after the cache read operation (Read(N+1)) is finished. In this case, after the data transfer operation from the latch circuit ADL to the latch circuit XDL is executed, the next cache read operation is started. As shown in the lower diagram of FIG. 27, the first cache read operation according to the first embodiment is similar to the cache read operation according to the comparative example. That is, if timing when the cache read command (00h-ADD(N+2)-

31h) is input is after the specific timing TA, the data transfer operation from the latch circuit ADL to the latch circuit XDL is executed after the cache read operation (Read(N+1)) is finished.

The time period from the time when the cache read command (00h-ADD(N+2)-31h) is input to the time when the data transfer operation to the latch circuit XDL is finished (the period with the ready/busy signal RB in the "L" state) is the same between the cache read in the comparative example (the upper diagram of FIG. 27) and the first cache read in the first embodiment (the lower diagram of FIG. 27).

The time period from the time when the cache read command (00h-ADD(N+2)-31h) is input to the time when the data transfer operation to the latch circuit XDL is finished (the period with the ready/busy signal RB in the "L" state) is longer in the first cache read operation according to the first embodiment (the lower diagram of FIG. 27) than in the second cache read operation according to the first embodiment (the lower diagram of FIG. 26). That is, if the timing when the cache read command (00h-ADD(N+2)-31h) is input is put off, the period with the ready/busy signal RB in the "L" state immediately after the cache read command (00h-ADD(N+2)-31h) is input increases, in the first embodiment.

On the other hand, in the cache read according to the comparative example, the period is shorter in the case where the timing when the cache read command (00h-ADD(N+2)-31h) is input is later (the upper diagram of FIG. 27) than in the case where the timing is early (the upper diagram of FIG. 26). That is, if the timing when the cache read command (00h-ADD(N+2)-31h) is input is put off, the period with the ready/busy signal RB in the "L" state immediately after the cache read command (00h-ADD(N+2)-31h) is input decreases, in the comparative example.

Second Embodiment

Next, a cache read operation according to a second embodiment is described.

Figure 28:
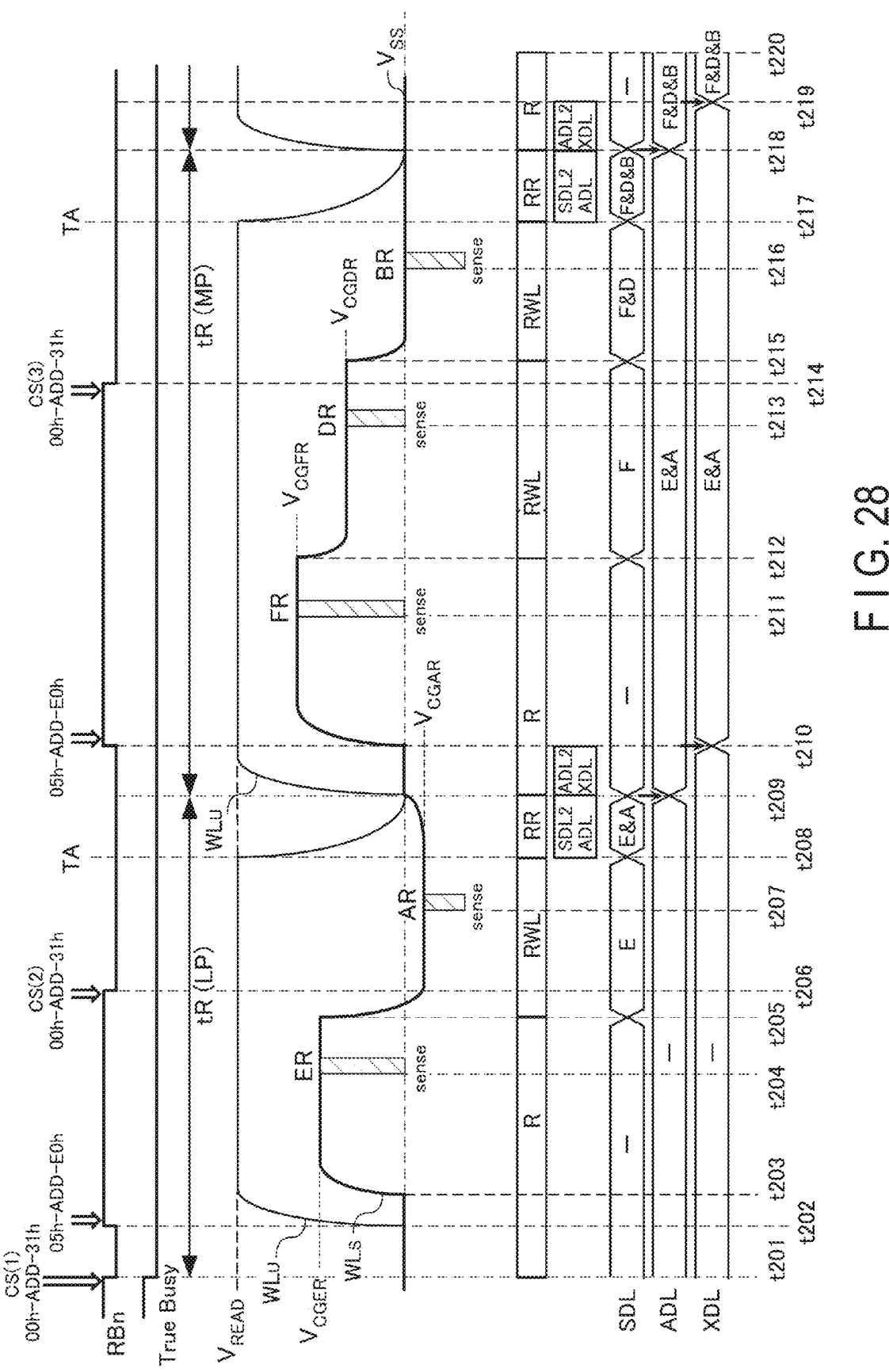
FIG. 28 is a waveform diagram for a second cache read operation according to a second embodiment.

FIG. 28 is a waveform diagram for a second cache read operation according to the second embodiment. The second cache read operation described with reference to FIG. 24 involves transfer of the read data stored in the latch circuit SDL directly to the latch circuit XDL in the recovery operation period RR (see time t107A to time t111 and time t118 to time t121 in FIG. 24). On the other hand, the second cache read operation shown in FIG. 28 involves transfer of the read data stored in the latch circuit SDL to the latch circuit ADL in the recovery operation period RR (see time t208 to time t209 and time t217 to time t218 in FIG. 28). At the beginning of the period R of the next cache read operation, the read data stored in the latch circuit ADL is transferred to the latch circuit XDL (see time t209 to time t210 and time t218 to time t219 in FIG. 28).

It is noted that the aspects of the second cache read operation shown in FIG. 28 other than those described above are similar to those of the second cache read operation described with reference to FIG. 24. That is, the operations from time t201 to time t208 and from time t210 to time t217 in FIG. 28 are similar to the operations from time t101 to time t107A and from time t112 to time t118 in FIG. 24. Consequently, redundant description is omitted.

It is noted that although not shown in FIG. 28, similarly to the second cache read operation according to the second embodiment (the cache read when the cache read command is input before the specific timing TA), the first cache read operation according to the second embodiment (the cache read when the cache read command is input after the specific timing TA) involves transfer of the read data stored in the latch circuit SDL to the latch circuit ADL in the recovery operation period RR, and transfer of the read data stored in the latch circuit ADL to the latch circuit XDL at the beginning of the period R in the next cache read operation. The details of the first cache read operation according to the second embodiment are described below (see FIG. 30).

Also according to such a configuration, in the case where the cache read operations are consecutively executed, one of the first cache read operation and the second cache read operation is automatically performed depending on the timing when the cache read command for the latter is input. Consequently, depending on the timing when the cache read command for the latter is input, the data transfer operation is optimized. As a result, the interval between the consecutively executed read operations can be reduced.

For example, a comparison between the cache read operation according to the comparative example, and the cache read operation according to the second embodiment is described. FIG. 29 is a timing chart for the cache read operation according to the comparative example and the second cache read operation according to the second embodiment. FIG. 30 is a timing chart for the cache read operation according to the comparative example and the first cache read operation according to the second embodiment.

As shown in FIGS. 29 and 30, when the cache read command is input, the ready/busy signal RB is controlled from the "H" state to the "L" state. When the read data is transferred to the latch circuit XDL, the ready/busy signal RB is controlled from the "L" state to the "H" state.

In FIG. 29, the upper diagram shows a case where the cache read operations according to the comparative example are consecutively executed, and the lower diagram shows a case where the second cache read operations according to the second embodiment are consecutively executed.

The cache read operation according to the comparative example shown in the upper diagram of FIG. 29 is the same as the cache read operation according to the comparative example shown in the upper diagram of FIG. 26. In this case, after the data transfer operation from the latch circuit ADL to the latch circuit XDL is executed, the next read operation for cache read (Read(N+2)) is started. On the other hand, as shown in the lower diagram of FIG. 29, in the second cache read operation according to the second embodiment, if timing when the cache read command (00h-ADD(N+2)-31h) is input is before the specific timing TA, the data transfer operation from the latch circuit SDL to the latch circuit ADL is executed before the cache read operation (Read(N+1)) is finished, and immediately after the cache read operation (Read(N+1)) is finished, the next cache read operation (Read(N+2)) is started. During execution of the cache read operation (Read(N+2)), the data transfer operation from the latch circuit ADL to the latch circuit XDL is executed.

As shown in FIG. 29, the time period from the time when the cache read command (00h-ADD(N+2)-31h) is input to the time when the data transfer operation to the latch circuit XDL is finished (the period with the ready/busy signal RB in the "L" state) is the same between the cache read operation according to the comparative example (the upper diagram of FIG. 29) and the second cache read operation according to the second embodiment (the lower diagram of FIG. 29).

When the cache read operation (Read(N+2)) is started, the unselected word lines $WL_U$ are charged with the read pass voltage $V_{READ}$, and data transfer is performed from the latch circuit ADL to the latch circuit XDL. Consequently, as shown in FIG. 29, the operation current $I_{CC}$ flowing through the pad electrodes Px supplied with the power source voltage $V_{CC}$ increases. This operation current $I_{CC}$ is larger than the operation current $I_{CC}$ when the read operation for cache read (Read(N+1)) is started.

In FIG. 30, the upper diagram shows a case where the cache read operations according to the comparative example are consecutively executed, and the lower diagram shows a case where the first cache read operations according to the second embodiment are consecutively executed.

The cache read operation according to the comparative example shown in the upper diagram of FIG. 30 is the same as the cache read operation according to the comparative example shown in the upper diagram of FIG. 27. In this case, after the data transfer operation from the latch circuit ADL to the latch circuit XDL is executed, the next cache read operation (Read(N+2)) is started. On the other hand, as shown in the lower diagram of FIG. 30, in the first cache read operation according to the second embodiment, if timing when the cache read command (00h-ADD(N+2)-31h) is input is after the specific timing TA, the data transfer operation from the latch circuit SDL to the latch circuit ADL is executed before the cache read operation (Read(N+1)) is finished, and immediately after the cache read operation (Read(N+1)) is finished, the next cache read operation (Read(N+2)) is started. During execution of the cache read operation (Read(N+2)), the data transfer operation from the latch circuit ADL to the latch circuit XDL is executed.

As shown in FIG. 30, the time period from the time when the cache read command (00h-ADD(N+2)-31h) is input to the time when the data transfer operation to the latch circuit XDL is finished (the period with the ready/busy signal RB in the "L" state) is the same between the cache read operation according to the comparative example (the upper diagram of FIG. 30) and the first cache read operation according to the second embodiment (the lower diagram of FIG. 30). It is noted that the period of the first cache read operation according to the second embodiment (the lower diagram of FIG. 30) is shorter than the period of the second cache read operation according to the second embodiment (the lower diagram of FIG. 29).

When the cache read operation (Read(N+2)) is started, the unselected word lines $WL_U$ are charged with the read pass voltage $V_{READ}$, and data transfer is performed from the latch circuit ADL to the latch circuit XDL. Consequently, as shown in FIG. 30, the operation current $I_{CC}$ flowing through the pad electrodes Px supplied with the power source voltage $V_{CC}$ increases. This operation current $I_{CC}$ is larger than the operation current $I_{CC}$ when the cache read operation (Read(N+1)) is started.

Third Embodiment

Next, a combined read operation according to a third embodiment is described.

Figure 31:
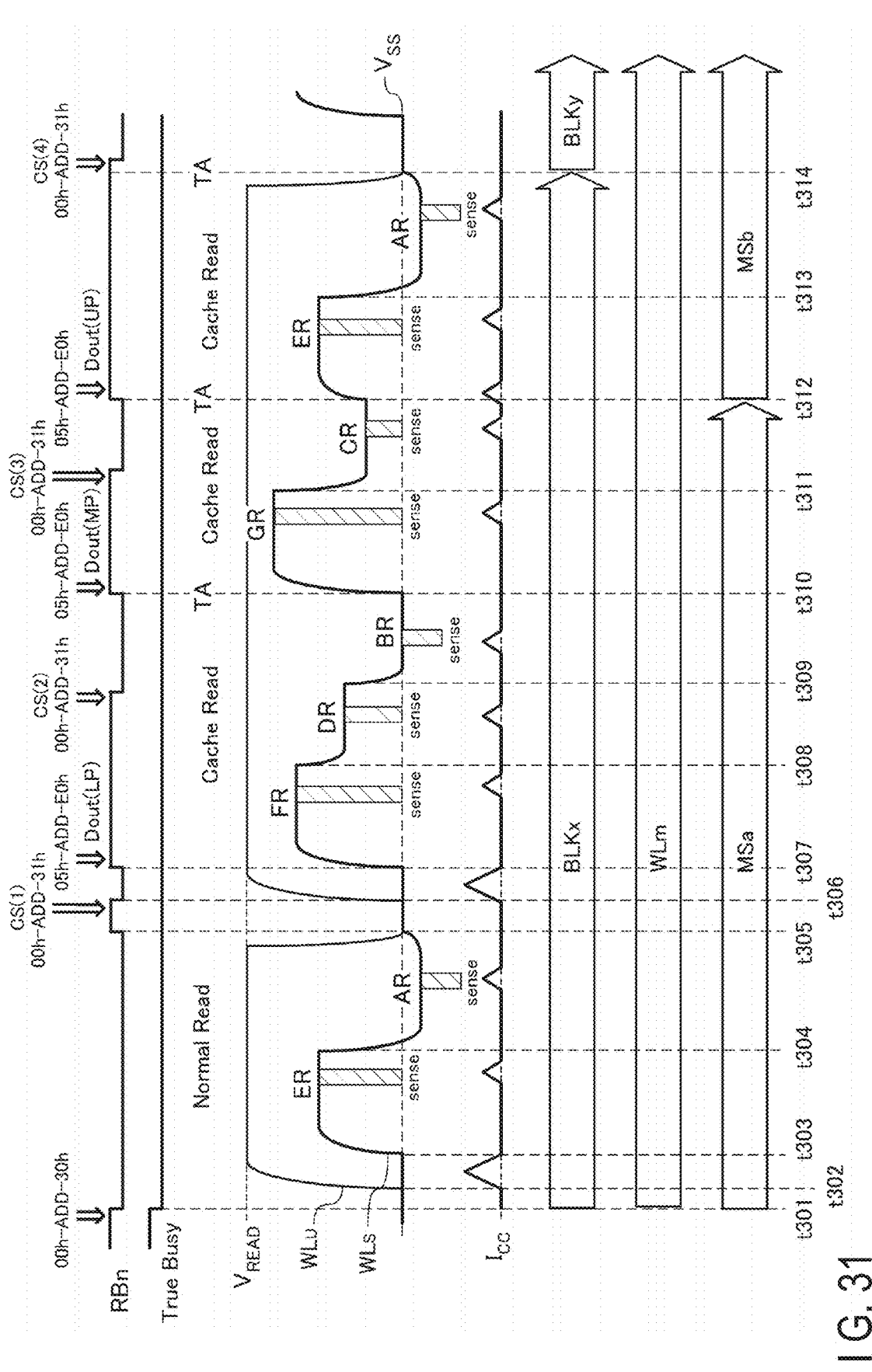
FIG. 31 is a waveform diagram for a combined read operation according to a third embodiment.
Figure 32:
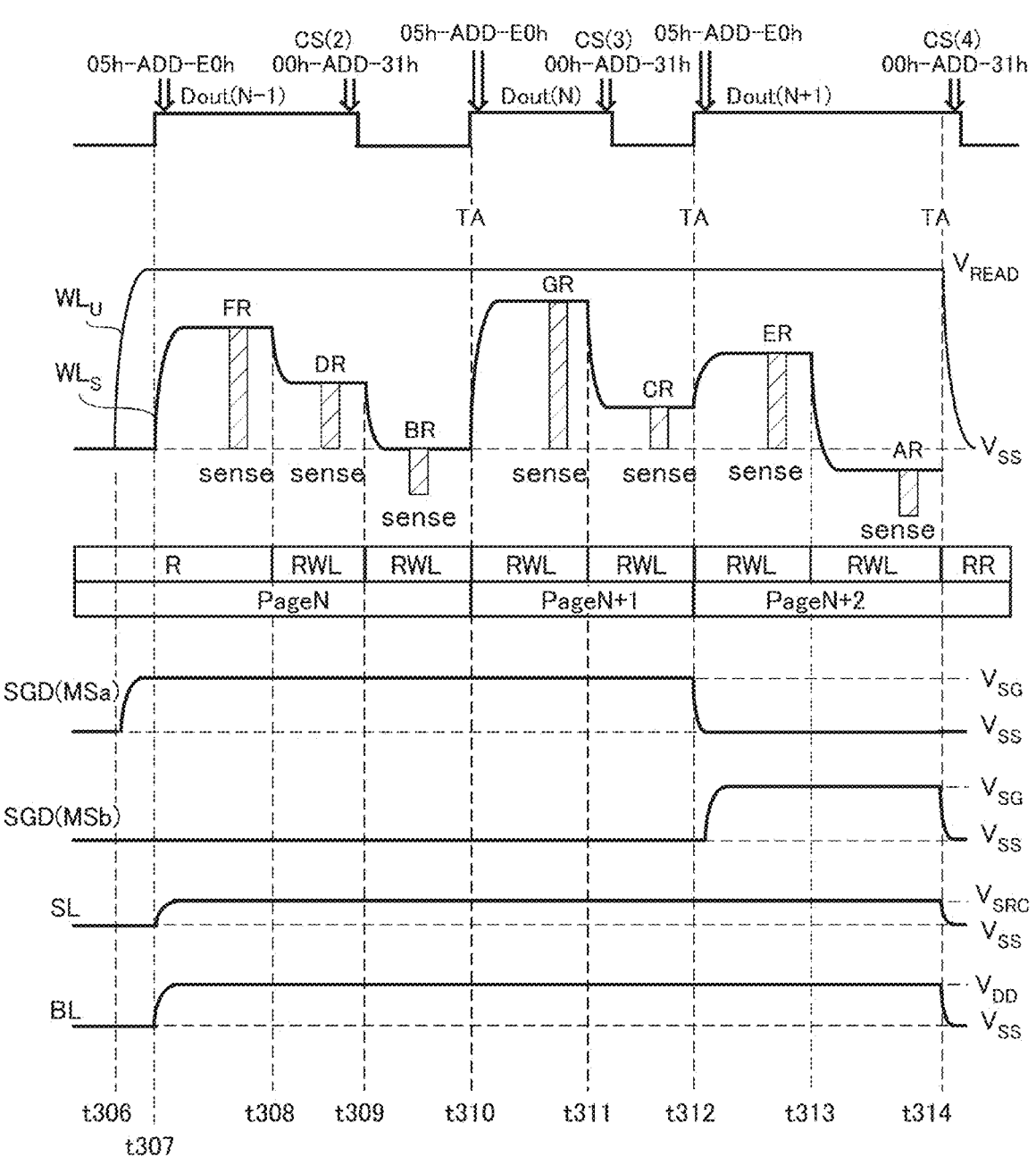
FIG. 32 is a waveform diagram illustrating parts of waveforms during the combined read operation according to the third embodiment.

FIG. 31 is a waveform diagram for the combined read operation according to the third embodiment. FIG. 32 is a waveform diagram for a part of the combined read operation according to the third embodiment. Here, in the combined read operation, cache read operations for previous and subsequent pages are combined if a specific condition is satisfied.

It is noted that in the following description, similarly to the case described with reference to FIG. 31, an example is described where data is allocated to each memory cell MC according to the method as described with reference to the part (b) of FIG. 18, and data on the lower page (LP), middle page (MP), upper page (UP), and the lower page (LP) is read.

When the combined read operation is performed, the controller die CD outputs a command set indicating the normal read operation, to the memory die MD via the data signal input/output terminals DQ0 to DQ7. As shown in FIG. 31, the command set includes data 00h, ADD, and 30h.

The data $D_{ADD}$ is defined as, for example, data identifying the lower page (LP), the memory block BLKx, the word line WLm, and the memory string MSa that are to be operated.

When the command set is input at time t301, the data 00h and 30h in the command set are held as the command data $D_{CMD}$ in the command register CMR, and the data $D_{ADD}$ in the command set is held as the address data $D_{ADD}$ in the address register ADR.

The sequencer SQC controls the terminal RBn (ready/busy signal RB) from the "H" state to the "L" state in response to input of the command set. Accordingly, access to the memory die MD is prohibited. In the memory die MD, the read operation is executed. At the time when the read operation is started, "True busy" transitions from the "H" state to the "L" state.

At time t302, the voltages of the unselected word lines $WL_U$ included in the selected memory block BLKx are charged from the ground voltage $V_{SS}$ to the read pass voltage $V_{READ}$. The voltage $V_{SG}$ is supplied to the drain-side select gate line SGD (MSa).

Here, positive charges are supplied to the charge pump circuit 32, which serves as the voltage generation unit vg2 (FIG. 6) when charging all the unselected word lines $WL_U$ included in the selected memory block BLKx with the read pass voltage $V_{READ}$ or which supplies the voltage to the voltage generation unit vg2 (FIG. 6). Accordingly, as shown in FIG. 31, the operation current $I_{CC}$ flowing through the pad electrodes Px supplied with the power source voltage $V_{CC}$ increases.

At time t303, the read voltage $V_{CGER}$ is supplied to the selected word line $WL_S$ included in the selected memory block BLKx. Accordingly, the memory cells MC corresponding to the Er state to the D state in the part (a) of FIG. 18 are placed in the ON state, and the memory cells MC corresponding to the E state to the G state are placed in the OFF state.

Although not shown in FIG. 31, at time t303, the voltages of the bit lines BL included in the selected memory block BLKx are charged from the ground voltage $V_{SS}$ to the voltage $V_{DD}$. At time t303, the voltage $V_{SRC}$ is supplied to the source line SL included in the selected memory block BLKx.

Next, the sense operation ("sense" in FIG. 31) is executed. According to the sense operation, the sense amplifier SA obtains read data (E) corresponding to the read voltage $V_{CGER}$. The read data (E) is held in the latch circuit SDL. When the sense operation is executed, the charge amount required to charge the sense node SEN and the like increases. As shown in FIG. 31, the operation current $I_{CC}$ flowing through the pad electrodes Px supplied with the power source voltage $V_{CC}$ then increases. Hereinafter, when the sense operation is executed, the operation current $I_{CC}$ flowing through the pad electrodes Px increases.

At time t304, the read voltage $V_{CGAR}$ is supplied to the selected word line $WL_S$. Accordingly, the memory cell MC corresponding to the Er state in the part (a) of FIG. 18 is placed in the ON state, and the memory cells MC corresponding to the A state to the G state are placed in the OFF state.

Next, the sense operation is executed. According to the sense operation, the sense amplifier SA obtains read data (A) corresponding to the read voltage $V_{CGAR}$. The sense amplifier SA performs a predetermined logical operation for the read data (E) and the read data (A). The latch circuit SDL holds the result of the logical operation (E&A). The result of the logical operation (E&A) indicates read data [LP] for the lower bit (lower page).

At time t305, the sequencer SQC controls the terminal RBn from the "L" state to the "H" state.

When the command set CS(1) indicating cache read is input at time t306, the data 00h and 31h in the command set CS(1) are held as the command data $D_{CMD}$ in the command register CMR, and the data $D_{ADD}$ in the command set CS(1) is held as the address data $D_{ADD}$ in the address register ADR.

The data $D_{ADD}$ is defined as, for example, data identifying the middle page (MP), the memory block BLKx, the word line WLm, and the memory string MSa that are to be operated.

The sequencer SQC controls the terminal RBn (ready/busy signal RB) from the "H" state to the "L" state in response to input of the command set CS(1). Accordingly, access to the memory die MD is inhibited. In the memory die MD, the read operation is executed.

At time t307, the sequencer SQC controls the terminal RBn from the "L" state to the "H" state.

At time t307, the voltages of the unselected word lines $WL_U$ included in the selected memory block BLKx are charged from the ground voltage $V_{SS}$ to the read pass voltage $V_{READ}$. The voltage $V_{SG}$ is supplied to the drain-side select gate line SGD (MSa). Accordingly, as shown in FIG. 31, the operation current $I_{CC}$ flowing through the pad electrodes Px supplied with the power source voltage $V_{CC}$ increases.

At time t307, the controller die CD outputs the data out command to the memory die MD via the data signal input/output terminals DQ0 to DQ7. As shown in FIG. 31, the data out command includes data 05h, ADD, and E0h.

The data 05h is the command data $D_{CMD}$ input into the command register CMR. The data 05h is input at the start of data out. The data $D_{ADD}$ is the same data as the data $D_{ADD}$ of the command set (00h-ADD-30h) indicating normal read. The data E0h is the command data $D_{CMD}$ input into the command register CMR. The data E0h is data indicating that the input of the data out command is finished. The memory die MD receives the data out command, which starts the data out operation Dout(LP) (Dout(N−1) in FIG. 32).

At time t307, the read voltage $V_{CGER}$ is supplied to the selected word line $WL_S$ included in the selected memory block BLKx. Accordingly, the memory cells MC corresponding to the Er state to the E state in the part (a) of FIG. 18 are placed in the ON state, and the memory cells MC corresponding to the F state and the G state are placed in the OFF state.

As shown in FIG. 32, at time t307, the voltages of the bit lines BL included in the selected memory block BLKx are charged from the ground voltage $V_{SS}$ to the voltage $V_{DD}$. At time t307, the voltage $V_{SRC}$ is supplied to the source line SL included in the selected memory block BLKx.

Next, the sense operation is executed. According to the sense operation, the sense amplifier SA obtains read data (F) corresponding to the read voltage $V_{CGER}$. The read data (F) is held in the latch circuit SDL.

At time t308, the read voltage $V_{CGDR}$ is supplied to the selected word line $WL_S$. Accordingly, the memory cells MC corresponding to the Er state to the C state in the part (a) of FIG. 18 are placed in the ON state, and the memory cells MC corresponding to the D state to the G state are placed in the OFF state.

Next, the sense operation is executed. According to the sense operation, the sense amplifier SA obtains read data (D) corresponding to the read voltage $V_{CGDR}$. The sense amplifier SA performs a predetermined logical operation for the read data (F) and the read data (D). The latch circuit SDL holds the result of the logical operation (F&D).

At time t309, the read voltage $V_{CGBR}$ is supplied to the selected word line $WL_S$. Accordingly, the memory cells MC corresponding to the Er state and the A state in the part (a) of FIG. 18 are placed in the ON state, and the memory cells MC corresponding to the B state to the G state are placed in the OFF state.

Next, the sense operation is executed. According to the sense operation, the sense amplifier SA obtains read data (B) corresponding to the read voltage $V_{CGBR}$. The sense amplifier SA performs a predetermined logical operation for the read data (F), the read data (D), and the read data (B). The latch circuit SDL holds the result of the logical operation (F&D&B). The result of the logical operation (F&D&B) indicates read data [MP] for the middle bit (middle page).

It is noted that as shown in FIGS. 31 and 32, when the data out operation (Dout(LP) in FIG. 31, and Dout(N−1) in FIG. 32) is finished, a state of capable of receiving the next cache read command ("00h-ADD-31h" in FIGS. 31 and 32) is achieved. Upon input of the cache read command CS(2), the sequencer SQC controls the terminal RBn from the "H" state to the "L" state.

The data $D_{ADD}$ included in the cache read command CS(2) is defined as, for example, data identifying the upper page (UP), the memory block BLKx, the word line WLm, and the memory string MSa that are to be operated.

In this case, between the middle page (the page N in FIG. 32) and the upper page (the page N+1 in FIG. 32), the memory block BLKx, the word line WLm, and the memory string MSa are common. In this case, as shown in FIGS. 31 and 32, the read operation for the middle page (the page N in FIG. 32), and the read operation for the upper page (the page N+1 in FIG. 32) are combined.

Specifically, as shown in FIG. 32, the period RR for the recovery operation for the middle page (the page N in FIG. 32) is removed, and the last period RWL for the middle page and the beginning period R for the upper page are combined. It is noted that the beginning period R for the upper page is combined with the period RWL for the middle page, thereby making the period R the period RWL. By thus combining the middle page with the upper page, the time period for the read operation is reduced. By combining the middle page and the upper page, the read pass voltage $V_{READ}$ supplied to the unselected word lines $WL_U$, the voltage $V_{SG}$ supplied to the drain-side select gate line SGD (MSa), the voltage $V_{SRC}$ supplied to the source line SL, and the voltage $V_{DD}$ supplied to the bit lines BL are not reduced to the ground voltage $V_{SS}$, and are maintained as they are. Consequently, discharge and charge of these wirings become unnecessary, and the operation current $I_{CC}$ flowing through the pad electrodes Px supplied with the power source voltage $V_{CC}$ is reduced.

It is noted that if the timing when the cache read command CS(2) is input is after the specific timing TA (time t310 in FIGS. 31 and 32), the read operation for the middle page (the page N in FIG. 32), and the read operation for the upper page (the page N+1 in FIG. 32) are not combined. In this case, at time t310, the recovery operation (period RR) is executed, and the data transfer operation from the latch circuit SDL to the latch circuit ADL is executed in this recovery operation (period RR). After the read operation for the upper page (the page N+1 in FIG. 32) is finished, the data transfer operation from the latch circuit ADL to the latch circuit XDL is executed. This also applies to a case where the timing of input of the cache read commands CS(3) and CS(4) is after the specific timing TA (times t312 and t314 in FIGS. 31 and 32).

At time t310, the sequencer SQC controls the terminal RBn from the "L" state to the "H" state. Although not shown in FIGS. 31 and 32, at time t310, the read data (F&D&B) stored in the latch circuit SDL is transferred to the latch circuit ADL. The read data (F&D&B) stored in the latch circuit ADL is then transferred to the latch circuit XDL. It is noted that at time t310, the read data (F&D&B) stored in the latch circuit SDL may be directly transferred to the latch circuit XDL.

At time t310, the read voltage $V_{CGGR}$ is supplied to the selected word line $WL_S$ included in the selected memory block BLKx. Accordingly, the memory cells MC corresponding to the Er state to F state in the part (a) of FIG. 18 are placed in the ON state, and the memory cell MC corresponding to the G state is placed in the OFF state.

It is noted that the memory die MD receives the data out command, based on which the data out operation Dout(MP) (Dout(N) in FIG. 32) is started.

Next, the sense operation is executed. According to the sense operation, the sense amplifier SA obtains read data (G) corresponding to the read voltage $V_{CGGR}$. The read data (G) is held in the latch circuit SDL.

At time t311, the read voltage $V_{CGCR}$ is supplied to the selected word line $WL_S$. Accordingly, the memory cells MC corresponding to the Er state to the B state in the part (a) of FIG. 18 are placed in the ON state, and the memory cells MC corresponding to the C state to the G state are placed in the OFF state.

Next, the sense operation is executed. According to the sense operation, the sense amplifier SA obtains read data (C) corresponding to the read voltage $V_{CGCR}$. The sense amplifier SA performs a predetermined logical operation for the read data (G) and the read data (C). The latch circuit SDL holds the result of the logical operation (G&C). The result of the logical operation (G&C) indicates read data [UP] for the upper bit (upper page).

It is noted that as shown in FIGS. 31 and 32, when the data out operation (Dout(MP) in FIG. 31, and Dout(N) in FIG. 32) is finished, a state of capable of receiving the next cache read command ("00h-ADD-31h" in FIGS. 31 and 32) is achieved. Upon input of the cache read command CS(3), the sequencer SQC controls the terminal RBn from the "H" state to the "L" state.

The data $D_{ADD}$ included in the cache read command CS(3) is defined as, for example, data identifying the lower page (LP), the memory block BLKx, the word line WLm, and the memory string MSb that are to be operated.

In this case, between the upper page (the page N+1 in FIG. 32) and the lower page (the page N+2 in FIG. 32), the memory block BLKx and the word line WLm are common. On the other hand, the memory string MSb for the lower page is different from the memory string MSa for the upper page. Also in such a case, as shown in FIGS. 31 and 32, the read operation for the middle page (the page N+1 in FIG. 32), and the read operation for the upper page (the page N+2 in FIG. 32) are combined.

Specifically, as shown in FIG. 32, the period RR for the recovery operation for the upper page (the page N+1 in FIG. 32) is removed, and the last period RWL for the upper page and the beginning period R for the lower page are combined.

It is noted that the beginning period R for the lower page is combined with the period RWL for the upper page, thereby making the period R the period RWL. By thus combining the upper page with the lower page, the time period for the read operation is reduced. Furthermore, discharge and charge of the unselected word lines $WL_U$, the source line SL, and the bit lines BL become unnecessary, and the operation current $I_{CC}$ flowing through the pad electrodes Px supplied with the power source voltage $V_{CC}$ is reduced.

Since the memory string MSa for the upper page is different from the memory string MSb for the lower page as described above, the memory string MS is switched. At time t312, the voltage $V_{SG}$ of the drain-side select gate line SGD (MSa) associated with the address of the memory string MSa is discharged and reduced to the ground voltage $V_{SS}$. Subsequently, the drain-side select gate line SGD (MSb) associated with the address of the memory string MSb is charged from the ground voltage $V_{SS}$ to the voltage $V_{SG}$.

At time t312, the sequencer SQC controls the terminal RBn from the "L" state to the "H" state. Although not shown in FIGS. 31 and 32, at time t312, the read data (G&C) stored in the latch circuit SDL is transferred to the latch circuit ADL. The read data (G&C) stored in the latch circuit ADL is transferred to the latch circuit XDL. It is noted that at time t312, the read data (G&C) stored in the latch circuit SDL may be directly transferred to the latch circuit XDL.

At time t312, the read voltage $V_{CGER}$ is supplied to the selected word line $WL_S$ included in the selected memory block BLKx. Accordingly, the memory cells MC corresponding to the Er state to the D state in the part (a) of FIG. 18 are placed in the ON state, and the memory cells MC corresponding to the E state are placed in the OFF state.

The memory die MD receives the data out command, which starts the data out operation Dout(UP) (Dout(N+1) in FIG. 32).

Next, the sense operation is executed. According to the sense operation, the sense amplifier SA obtains read data (E) corresponding to the read voltage $V_{CGER}$. The read data (E) is held in the latch circuit SDL.

At time t313, the read voltage $V_{CGAR}$ is supplied to the selected word line $WL_S$. Accordingly, the memory cell MC corresponding to the Er state in the part (a) of FIG. 18 is placed in the ON state, and the memory cells MC corresponding to the A state to the G state are placed in the OFF state.

Next, the sense operation is executed. According to the sense operation, the sense amplifier SA obtains read data (A) corresponding to the read voltage $V_{CGAR}$. The sense amplifier SA performs a predetermined logical operation for the read data (E) and the read data (A). The latch circuit SDL holds the result of the logical operation (E&A). The result of the logical operation (E&A) indicates read data [LP] for the lower bit (lower page).

It is noted that as shown in FIGS. 31 and 32, when the data out operation (Dout(UP) in FIG. 31, and Dout(N+1) in FIG. 32) is finished, a state of capable of receiving the next cache read command ("00h-ADD-31h" in FIGS. 31 and 32) is achieved. Upon input of the cache read command CS(4), the sequencer SQC controls the terminal RBn from the "H" state to the "L" state.

The data $D_{ADD}$ included in the cache read command CS(4) is defined as, for example, data identifying the middle page (MP), the memory block BLKy, the word line WLm, and the memory string MSb that are to be operated.

If the address of the memory block BLKx or the word line WLm is different between the data $D_{ADD}$ included in the aforementioned cache read command CS(3) and the data $D_{ADD}$ included in the next cache read command CS(4), the read operation for the page N+2 and the read operation for the next page are not combined. In this case, at time t314, the read pass voltage $V_{READ}$ of the unselected word lines $WL_U$, the voltage $V_{SG}$ of the drain-side select gate line SGD (MSb), the voltage $V_{SRC}$ of the source line SL, and the voltage $V_{DD}$ of the bit lines BL are discharged.

It is noted that even if the addresses of the memory blocks BLKx and the word lines WLm are the same, the read operation for normal read and the read operation for cache read are not combined.

FIG. 33 is a flowchart for the combined read operation according to the third embodiment.

In step S201, the memory die MD receives the cache read command for the page N (see time t306 in FIG. 31). In step S202, the memory die MD receives the cache read command for the page N+1 (see time t309 in FIG. 31). In step S203A, the memory die MD determines whether the read operation for the page N is under execution or not. If the read operation for the page N is under execution (YES in step S203A), in step S203B the memory die MD determines whether the time when the cache read command for the page N+1 is input is before the recovery operation for the read operation for the page N is started (before time t310 in FIGS. 31 and 32) or not.

If the timing when the cache read command for the page N+1 is input is before the recovery operation in the read operation for the page N is started (YES in step S203B), in step S204 the memory die MD determines whether or not the addresses of the memory blocks BLK for the page N and the page N+1 are the same.

If the addresses of the memory blocks BLK for the page N and the page N+1 are the same (YES in step S204), in step S205 the memory die MD determines whether or not the addresses of the word lines WL for the page N and the page N+1 are the same. If the addresses of the word lines WL for the page N and the page N+1 are the same (YES in step S205), in step S206 the memory die MD determines whether or not the addresses of the memory strings MS for the page N and the page N+1 are the same.

If the addresses of the memory strings MS for the page N and the page N+1 are the same (YES in step S206), in step S207 the memory die MD does not discharge the voltages of the wirings other than the selected word line $WL_S$ (the unselected word lines $WL_U$, the drain-side select gate lines SGD, the source-side select gate lines SGS, the source line SL, and the bit lines BL), and maintains the voltages of these wirings. On the other hand, if the addresses of the memory strings MS for the page N and the page N+1 are different (NO in step S206), in step S208 the memory die MD does not discharge the voltages of the wirings other than the selected word line $WL_S$ and the drain-side select gate lines SGD (the unselected word lines $WL_U$, the source-side select gate lines SGS, the source lines SL, and the bit lines BL), and maintains the voltages of these wirings. It is noted that for the selected word line $WL_S$, the recovery operation (period RR) is not executed, and the read voltage supply operation is combined.

If the read operation for the page N is not under execution (NO in step S203A), if the timing when the cache read command for the page N+1 is input is not before the recovery operation in the read operation for the page N is started (NO in step S203B), if the addresses of the memory blocks BLK of the page N and the page N+1 are different (NO in step S204), or if the addresses of the word lines WL for the page N and the page N+1 are different (NO in step S205), in step S209 the memory die MD discharges the voltages of all the wirings including the selected word line $WL_S$ and the drain-side select gate lines SGD (the selected word line $WL_S$, the unselected word lines $WL_U$, the drain-side select gate lines SGD, the source-side select gate lines SGS, the source line SL, and the bit lines BL), and subsequently, charges all the wirings with voltages.

According to such a configuration, in the case where the cache read operations are consecutively executed, the previous and subsequent cache read operations are combined if the specific condition (steps S203 to S206) is satisfied. Consequently, the period during which the cache read operations are executed can be reduced. The discharge and charge of the predetermined wirings become unnecessary, and the operation current $I_{CC}$ flowing through the pad electrodes Px supplied with the power source voltage $V_{CC}$ is reduced.

Fourth Embodiment

FIG. 34 is a waveform diagram for illustrating a combined read operation according to a fourth embodiment.

In the combined read operation according to the third embodiment, as shown in FIG. 32, the selected word line $WL_S$ is supplied sequentially with the read voltages $V_{CGER}$, $V_{CGDR}$, $V_{CGBR}$, $V_{CGGR}$, $V_{CGCR}$, $V_{CGER}$, and $V_{CGAR}$ in this order. On the other hand, in the combined read operation according to the fourth embodiment, as shown in FIG. 34, the selected word line $WL_S$ is supplied sequentially with the read voltages $V_{CGER}$, $V_{CGDR}$, $V_{CGBR}$, $V_{CGCR}$, $V_{CGGR}$, $V_{CGER}$, and $V_{CGAR}$ in this order. The other configuration elements are similar to those of the content described with reference to FIG. 32. Accordingly, redundant description is omitted.

According to such a configuration, the amount of transition of the read voltage level of the selected word line $WL_S$ in combined read decreases. Accordingly, the period during which the read operation for cache read is executed can be reduced, discharge and charge of the predetermined wirings become unnecessary, and the operation current $I_{CC}$ flowing through the pad electrodes Px supplied with the power source voltage $V_{CC}$ is reduced. The level of the read voltage can be smoothly switched.

It is noted that in FIG. 34, reverse read ($V_{CGFR}$, $V_{CGDR}$, and $V_{CGBR}$) with transition of the read voltage from the high level to the low level is executed, forward read ($V_{CGCR}$, and $V_{CGGR}$) with transition of the read voltage from the low level to the high level is executed, and subsequently, reverse read ($V_{CGER}$, and $V_{CGAR}$) is executed. However, the forward read ($V_{CGBR}$, $V_{CGDR}$, and $V_{CGER}$) may be executed, the reverse read ($V_{CGGR}$) and $V_{CGCR}$) may be executed, and subsequently, the forward read ($V_{CGAR}$, and $V_{CGER}$) may be executed.

FIG. 35 is a waveform diagram for a combined read operation according to a modified example of the fourth embodiment. FIG. 35 shows an example where the forward read ($V_{CGBR}$, $V_{CGDR}$, and $V_{CGER}$) is executed, the reverse read ($V_{CGGR}$, and $V_{CGCR}$) is executed, and subsequently, the forward read ($V_{CGAR}$, and $V_{CGER}$) is executed. That is, in the combined read operation according to the modified example of the fourth embodiment, as shown in FIG. 35, the selected word line $WL_S$ is supplied sequentially with the read voltages $V_{CGBR}$, $V_{CGDR}$, $V_{CGFR}$, $V_{CGGR}$, $V_{CGCR}$, $V_{CGAR}$, and $V_{CGER}$ in this order. The other configuration elements are similar to those of the content described with reference to FIGS. 32 and 34. Accordingly, redundant description is omitted.

Even with such a configuration, the amount of transition of the read voltage level of the selected word line $WL_S$ in combined read decreases. Accordingly, the period during which the cache read operation is executed can be reduced, discharge and charge of the predetermined wirings become unnecessary, and the operation current $I_{CC}$ flowing through the pad electrodes Px supplied with the power source voltage $V_{CC}$ is reduced. The level of the read voltage can be smoothly switched.

It is noted that in a case of QLC (Quad Level Cell: hex data (four bits) is stored in a memory cell), for example, the reverse read may be executed, the forward read may be executed, the reverse read may be executed, and subsequently, the forward read may be executed. Alternatively, in another case of QLC, for example, the forward read may be executed, the reverse read may be executed, the forward read may be executed, and subsequently, the reverse read may be executed.

In a case of PLC (Penta Level Cell: base-32 data (five bits) is stored in a memory cell), for example, the reverse read may be executed, the forward read may be executed, the reverse read may be executed, the forward read may be executed, and subsequently, the reverse read may be executed. Alternatively, in another case of PLC, for example, the forward read may be executed, the reverse read may be executed, the forward read may be executed, the reverse read may be executed, and subsequently, the forward read may be executed.

The cases of alternately executing the reverse read and the forward read have thus been described. However, if the amount of transition of the read voltage level of the selected word line $WL_S$ decreases, the reverse read and the forward read are not necessarily executed alternately.

Fifth Embodiment

Next, referring to FIG. 36, a sequential read operation according to a fifth embodiment is described. A method of collectively performing read operations for the lower page, the middle page, and the upper page is called a sequential read operation.

FIG. 36 is a waveform diagram for illustrating the sequential read operation according to the fifth embodiment. The sequential read operation involves collectively reading read data from a plurality of pages. As shown in FIG. 36, for example, the read voltage supplied to the selected word line $WL_S$ is sequentially switched in a stepwise manner in an order of $V_{CGAR}$, $V_{CGBR}$, $V_{CGCR}$, $V_{CGDR}$, $V_{CGER}$, $V_{CGER}$, and $V_{CGGR}$. In the latch circuit XDL of the cache memory CM, read data on the lower page, the middle page, and the upper page are sequentially stored. The data out operation is performed every time the read data is stored.

In the example in FIG. 36, the memory block BLKx and the word line WLm are assumed to be common between the first sequential read operation and the second sequential read operation. On the other hand, the memory string MSa in the first sequential read operation is different from the memory string MSb in the second sequential read operation. In such a case, as shown in FIG. 36, the first sequential read operation and the second sequential read operation can be combined with each other. In this case, the read pass voltage $V_{READ}$ for the unselected word lines $WL_U$ is combined without discharging and charging. On the other hand, the voltage $V_{SG}$ of the drain-side select gate line SGD are subjected to discharging and charging.

Even with such a configuration, the period during which the sequential read operation is executed can be reduced, discharge and charge of the predetermined wirings become unnecessary, and the operation current $I_{CC}$ flowing through the pad electrodes Px supplied with the power source voltage $V_{CC}$ is reduced.

It is noted that in the sequential read operation according to the fifth embodiment, using a command set dedicated for sequential read (e.g., 50h-00h-ADD-31h), an instruction for executing sequential read is issued. In the command set dedicated for sequential read, a prefix command, such as "50h", is added.

Although not shown, a data out command ("05h-ADD-E0h" in FIG. 19) is received from the controller die CD, thereby performing a data out operation Dout(N+1) for the read data stored in the latch circuit XDL. In the sequential read operation, for example, the data out operation is performed for the lower page (LP), the middle page (MP), and the upper page (UP) in this order.

Figure 37:
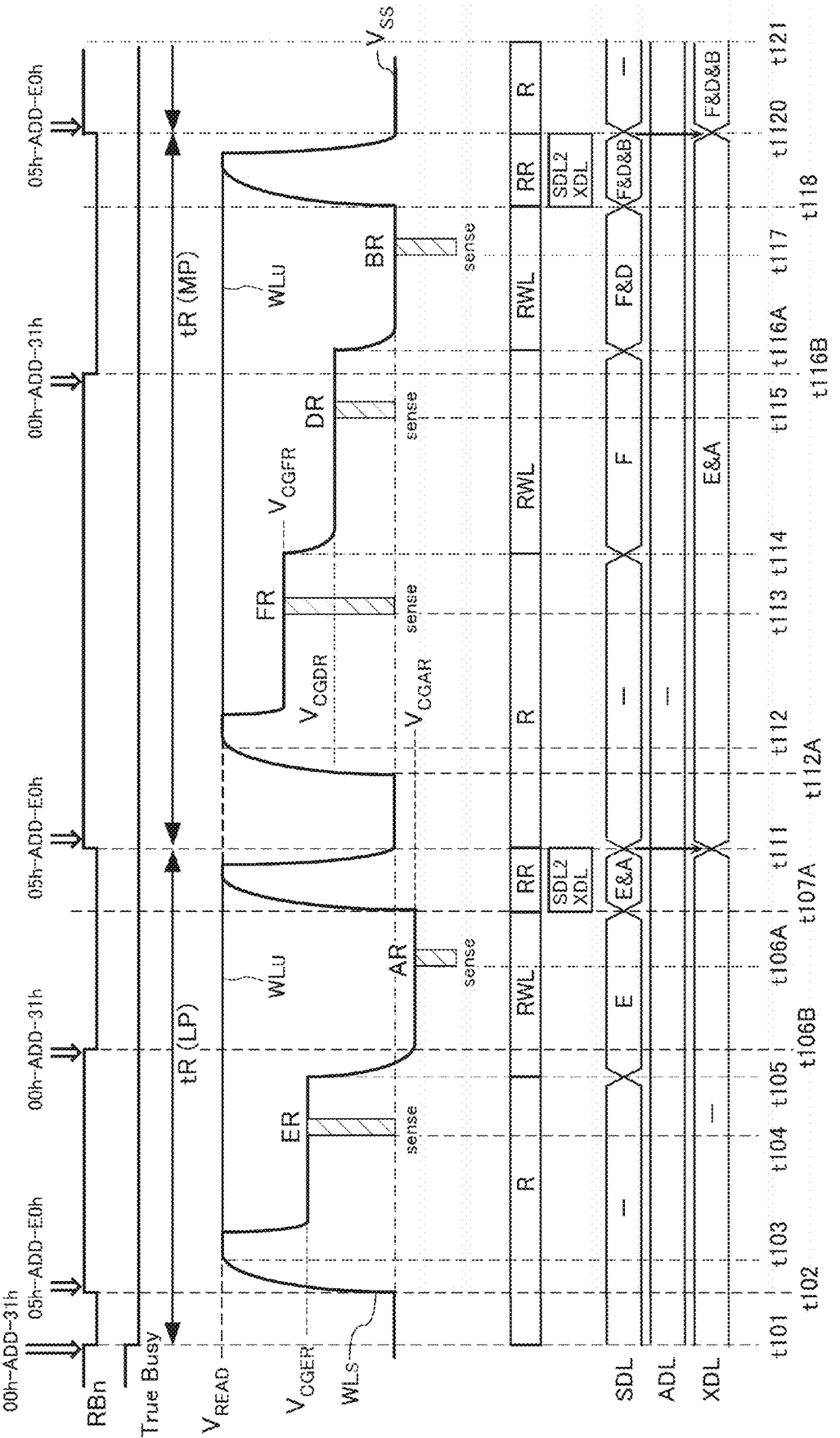
FIG. 37 is a waveform diagram showing a modified example of FIG. 24.

Next, referring to FIG. 37, modified examples of the first and second embodiments are described.

FIG. 37 is a waveform diagram showing a modified example of FIG. 24. The configuration in FIG. 37 is basically identical to the configuration in FIG. 24. Consequently, for the same configuration, redundant description is omitted.

From time t102 to time t103, the voltage of the selected word line $WL_S$ included in the selected memory block BLK is charged from the ground voltage $V_{SS}$ to the read pass voltage $V_{READ}$. From time t102 to time t103, the voltages of the unselected word lines $WL_U$ included in the selected memory block BLK are charged from the ground voltage $V_{SS}$ to the read pass voltage $V_{READ}$.

In the period from time t107A to time t111, the read pass voltage $V_{READ}$ is supplied to the selected word line $WL_S$, and subsequently, the voltage is reduced to the ground voltage $V_{SS}$. The period from time t107A to time t111 is the period RR during which the recovery operation is performed. This period is also called a channel clean period (Channel Clean). In the period from time t107A to time t111, the voltages of the unselected word lines $WL_U$ included in the selected memory block BLK are discharged from the read pass voltage $V_{READ}$ to the ground voltage $V_{SS}$. The discharge timings of the selected word line $WL_S$ and the unselected word lines $WL_U$ may be the same.

From time t112A to time t112, the voltage of the selected word line $WL_S$ included in the selected memory block BLK is charged from the ground voltage $V_{SS}$ to the read pass voltage $V_{READ}$. From time t112A to time t112, the voltages of the unselected word lines $WL_U$ included in the selected memory block BLK are charged from the ground voltage $V_{SS}$ to the read pass voltage $V_{READ}$.

In the period from time t118 to time t120, the read pass voltage $V_{READ}$ is supplied to the selected word line $WL_S$, and subsequently, the voltage is reduced to the ground voltage $V_{SS}$. The period from time t118 to time t120 is a channel clean period (Channel Clean). In the period from time t118 to time t120, the voltages of the unselected word lines $WL_U$ are discharged from the read pass voltage $V_{READ}$ to the ground voltage $V_{SS}$.

The selected word line $WL_S$ and the unselected word lines $WL_U$ may be supplied with a voltage having a waveform as shown in FIG. 37. It is noted that this similarly applies to the selected word line $WL_S$ and the unselected word lines $WL_U$ in FIGS. 23 and 28.

Next, referring to FIG. 38, modified examples of the third and fourth embodiments are described.

FIG. 38 is a waveform diagram showing the modified example of FIG. 31. The configuration in FIG. 38 is basically identical to the configuration in FIG. 31. Consequently, for the same configuration, redundant description is omitted.

From time t302 to time t303, the voltage of the selected word line $WL_S$ included in the selected memory block BLK is charged from the ground voltage $V_{SS}$ to the read pass voltage $V_{READ}$. From time t302 to time t303, the voltages of the unselected word lines $WL_U$ included in the selected memory block BLK are charged from the ground voltage $V_{SS}$ to the read pass voltage $V_{READ}$.

In the period from time t305A to time t305, the read pass voltage $V_{READ}$ is supplied to the selected word line $WL_S$, and subsequently, the voltage is reduced to the ground voltage $V_{SS}$. The period from time t305A to time t305 is the period RR during which the recovery operation is performed. This period is also called a channel clean period (Channel Clean). In the period from time t305A to time t305, the voltages of the unselected word lines $WL_U$ included in the selected memory block BLK are discharged from the read pass voltage $V_{READ}$ to the ground voltage $V_{SS}$. The discharge timings of the selected word line $WL_S$ and the unselected word lines $WL_U$ may be the same.

In the period from time t306 to time t307, the period from time t310A to time t310, and the period from time t312A to time t312, the voltage of the selected word line $WL_S$ included in the selected memory block BLK is charged from the ground voltage $V_{SS}$ to the read pass voltage $V_{READ}$. In the period from time t306 to time t307, the voltages of the unselected word lines $WL_U$ included in the selected memory block BLK are charged from the ground voltage $V_{SS}$ to the read pass voltage $V_{READ}$.

In the period from time t314A to time t314, the read pass voltage $V_{READ}$ is supplied to the selected word line $WL_S$, and subsequently, the voltage is reduced to the ground voltage $V_{SS}$. The period from time t314A to time t314 is a channel clean period (Channel Clean).

In the period from time t314A to time t314, the voltages of the unselected word lines $WL_U$ are discharged from the read pass voltage $V_{READ}$ to the ground voltage $V_{SS}$.

The selected word line $WL_S$ and the unselected word lines $WL_U$ may be supplied with a voltage having a waveform as shown in FIG. 38. It is noted that this similarly applies to the selected word line $WL_S$ and the unselected word lines $WL_U$ in FIGS. 31, 32, and 34.

Other Embodiments

The semiconductor storage devices according to the first to fifth embodiments are thus described. However, the semiconductor storage devices described above are only examples. The operations, the configurations and the like can be appropriately adjusted.

For example, in the semiconductor storage devices according to the first to fifth embodiments, three-bit data is stored in each memory cell MC as described with reference to, for example, FIG. 18. However, the data stored in the memory cell MC may be data of one bit, two bits, four bits, five bits or more.

In the third to fifth embodiments, it is determined whether or not the combined read operation is executed depending on whether or not the timing when the cache read command CS is input is before the specific timing TA. However, it may be configured so that a user can select whether or not to execute the combined read.

In this case, it may be configured so that it can be set whether or not to execute the combined read operation using SET FEATURE operation. For example, in a certain mode (enable mode), it is determined whether or not the combined read operation is executed depending on the timing when the cache read command CS is input. In another mode (disable mode), the combined read operation is not executed irrespective of the timing when the cache read command CS is input.

Alternatively, it may be configured so that it can be designated whether or not to execute the combined read, using a prefix command. The prefix command is a command added to the beginning of a typical command set. For example, in a command set (xxh-00h-ADD-31h), the prefix command is "xxh". In a certain mode (enable base mode), the combined read is not executed if the prefix command is added, and the combined read operation can be executed if the prefix command is not added. In another mode (disable base mode), the combined read operation can be executed if the prefix command is added, and the combined read operation is not executed if the prefix command is not added. The mode selection is set using, for example, SET FEATURE operation.

It is noted that according to the first embodiment, the following configuration is disclosed. A first read operation is executed in response to a first command set, and a second read operation is consecutively executed after the first read operation in response to a second command set. if the second command set is input at first timing, a first data transfer operation is executed, and if the second command set is input at second timing before the first timing, a second data transfer operation is executed. In response to the first read operation, the first data transfer operation transfers data held in the first latch circuit (e.g., the latch circuit SDL) to the second latch circuit (e.g., the latch circuit ADL), and transfers the data held in the second latch circuit (e.g., the latch circuit ADL) to the third latch circuit (e.g., the latch circuit XDL). In response to the first read operation, the second data transfer operation transfers the data held in the first latch circuit (e.g., the latch circuit SDL) to the third latch circuit (e.g., the latch circuit XDL).

Here, the first command set corresponds to, for example, the command set CS(1) input at time t101 in FIGS. 23 and 24. The second command set corresponds to, for example, the command set CS(2) input at time t108A in FIG. 23 or time t106B in FIG. 24. The first read operation corresponds to, for example, the read operation executed from time t102 to time t109A in FIG. 23 or from time t102 to time t111 in FIG. 24. The second read operation corresponds to, for example, the read operation executed from time t111 to time t120 in FIGS. 23 and 24. The first timing corresponds to, for example, time t108A in FIG. 23. The second timing corresponds to, for example, time t106B in FIG. 24. As shown in FIGS. 23 and 24, the second timing is timing before the first timing. The first data transfer operation corresponds to, for example, the data transfer operation executed from time t107A to time t111 in FIG. 23. The second data transfer operation corresponds to, for example, the data transfer operation executed from time t107A to time t111 in FIG. 24. As shown in FIGS. 23 and 24, the second data transfer operation has a shorter operation period than the first data transfer operation does.

Other

While certain embodiments have been described, these embodiments have been presented by way of example only, and are not intended to limit the scope of the inventions. Indeed, the novel devices and methods described herein may be embodied in a variety of other forms; furthermore, various omissions, substitutions, and changes in the form of the embodiments described herein may be made without departing from the spirit of the inventions. The accompanying claims and their equivalents are intended to cover such forms or modification as would fall within the scope and spirit of the inventions.

What is claimed is:

1. A semiconductor storage device, comprising:
a memory string including a plurality of memory transistors connected in series;
a bit line connected to the memory string;
a sense amplifier connected to the bit line and including a first latch circuit and a second latch circuit;
a cache memory connected to the sense amplifier and including a third latch circuit; and
a control circuit configured to perform a first read operation in response to a first command set and consecutively perform a second read operation in response to a second command set received during the first read operation, wherein
during the first read operation, data read from the memory string is stored in the first latch circuit,
when the second command set is received at a first timing, the control circuit performs a first data transfer operation of transferring the data stored in the first latch circuit to the second latch circuit, and then to the third latch circuit, and
when the second command set is received at a second timing before the first timing, the control circuit performs a second data transfer operation of transferring the data stored in the first latch circuit to the third latch circuit without storing the data in the second latch circuit.

2. The semiconductor storage device of claim 1, wherein the control circuit is configured to:
perform, during the first read operation, a data out operation of transferring data that has been read through a previous read operation before the first read operation, out of the third latch circuit; and
enable command reception upon completing the data out operation.

3. The semiconductor storage device of claim 1, wherein the control circuit performs at least part of the first data transfer operation after the first read operation, and no part of the second data transfer operation after the first read operation.

4. The semiconductor storage device of claim 1, wherein the control circuit is configured to set a ready/busy signal to a ready state, at which a command reception is enabled, or a busy state, at which the command reception is disabled.

5. The semiconductor storage device of claim 4, wherein the control circuit is configured to set the ready/busy signal to the ready state when the data stored in the first latch circuit has been transferred to the third latch circuit through the first or second data transfer operations, upon completion of the first data transfer operation or upon completion of the second data transfer operation.

6. The semiconductor storage device of claim 1, further comprising a plurality of word lines connected to gate electrodes of the plurality of memory transistors, respectively, wherein
the control circuit is configured to perform the first read operation with respect to one of the memory transistors by supplying a read voltage to a selected one of the word lines corresponding thereto and a read pass voltage higher than the read voltage to non-selected word lines,
the first timing is after a third timing when a voltage of the non-selected word lines starts to decrease from the read pass voltage during the first read operation, and
the second timing is before the third timing.

7. The semiconductor storage device of claim 1, further comprising a plurality of word lines connected to gate electrodes of the plurality of memory transistors, respectively, wherein the control is configured to perform the first read operation with respect to one of the memory transistors by supplying, to a selected one of the word lines corresponding thereto, a read voltage, and then to a read pass voltage higher than the read voltage at a fourth timing, the first timing is after the fourth timing, and the second timing is before the fourth timing.

8. A semiconductor storage device, comprising:

a memory string including a plurality of memory transistors connected in series;

a bit line connected to the memory string;

a sense amplifier connected to the bit line and including a first latch circuit and a second latch circuit;

a cache memory connected to the sense amplifier and including a third latch circuit; and a control circuit configured to perform a first read operation in response to a first command set and then perform a second read operation in response to a second command set received during the first read operation, wherein during the first read operation, data read from the memory string is stored in the first latch circuit, and the control circuit performs a data transfer operation of transferring the data stored in the first latch circuit to the second latch circuit during the first read operation and then to the third latch circuit during the second read operation.

9. A semiconductor storage device, comprising:

a plurality of memory strings, each of which includes a plurality of memory transistors connected in series;

a plurality of word lines, each of which is connected to a gate electrode of one of the memory transistors in each of the memory strings; and a control circuit configured to perform a first read operation in response to a first command set and consecutively perform a second read operation in response to a second command set received during the first read operation, wherein when the first read operation is performed with respect to a first group of memory transistors connected to a selected one of the word lines, and the second read operation is performed with respect to a second group of memory transistors connected to the selected one of the word lines, the control circuit causes voltages of word lines that are not selected during the first read operation to be maintained when transitioning from the first read operation to the second read operation.

10. The semiconductor storage device of claim 9, wherein when the first read operation is performed with respect to the first group of memory transistors connected to the selected one of the word lines, and the second read operation is performed with respect to a third group of memory transistors not connected to the selected one of the word lines, the control circuit causes voltages of word lines that are not selected during the first read operation to be dropped and raised when transitioning from the first read operation to the second read operation.

11. The semiconductor storage device of claim 9, wherein each of the memory strings includes a select gate transistor connected in series to the plurality of memory transistors thereof,

the semiconductor storage device further comprises a plurality of select gate lines connected to gate electrodes of the selection gate transistors, and when the first group of memory transistors and the second group of memory transistors are the same, the control circuit causes a voltage of the same one of the select gate lines to be maintained when transitioning from the first read operation to the second read operation.

12. The semiconductor storage device of claim 11, wherein when the first group of memory transistors and the second group of memory transistors are connected to different ones of the select gate lines, the control circuit causes a voltage of one of the select gate lines connected to the first group of memory transistors to be changed when transitioning from the first read operation to the second read operation.

13. The semiconductor storage device of claim 9, further comprising a source line connected to an end of each of memory strings in which the first group of memory transistors are included, wherein the control circuit causes a voltage supplied to the source line to be maintained when transitioning from the first read operation to the second read operation.

14. The semiconductor storage device of claim 9, further comprising a plurality of bit lines connected to ends of memory strings in which the first group of memory transistors are included, wherein the control circuit causes a voltage supplied to the bit lines is maintained when transitioning from the first read operation to the second read operation.

15. The semiconductor storage device of claim 9, wherein during the first read operation, the control circuit causes a voltage supplied to the selected one of the word lines from a first read voltage to a second read voltage lower than the first read voltage, and during the second read operation, the control circuit causes the voltage supplied to the selected one of the word lines from a third read voltage to a fourth read voltage higher than the third read voltage.

16. The semiconductor storage device of claim 9, wherein during the first read operation, the control circuit causes a voltage supplied to the selected one of the word lines form a first read voltage to a second read voltage higher than the first read voltage, and during the second read operation, the control circuit causes the voltage supplied to the selected one of the word lines from a third read voltage to a fourth read voltage lower than the third read voltage.

17. The semiconductor storage device of claim 9, wherein the control circuit is configured to:

supply, during a first period of time in the first read operation, a plurality of read voltages to the selected one of the word lines for reading different bit values; and enable command reception at a first timing during the first period of time.

18. The semiconductor storage device of claim 9, wherein the control circuit is configured to, during the first read operation:

supply, to the selected one of the word lines, a plurality of read voltages to the selected one of the word lines for reading different bit values, and then a read pass voltage higher than the read voltages at a second timing; and; and enable command reception before the second timing.

19. The semiconductor storage device of claim 9, wherein each of the first command set and the second command set is a command instructing to read data of one page.

20. The semiconductor storage device of claim 9, wherein each of the first command set and the second command set is a command instruction to sequentially read data of a plurality of pages from a same group of memory transistors.

\* \* \* \* \*